US012736898B2

(12) United States Patent
Takayama et al.

(10) Patent No.: US 12,736,898 B2

(45) Date of Patent: Sep. 15, 2026

(54) DETERMINATION METHOD AND RECOVERY METHOD

(71) Applicant: CANON KABUSHIKI KAISHA, Tokyo (JP)

(72) Inventors: Toshihiko Takayama, Kanagawa (JP); Yuichiro Hirata, Shizuoka (JP); Shuichi Tetsuno, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 19/053,683

(22) Filed: Feb. 14, 2025

(65) Prior Publication Data

US 2025/0264827 A1 Aug. 21, 2025

(30) Foreign Application Priority Data

Feb. 19, 2024 (JP) ................................. 2024-022814
Mar. 18, 2024 (JP) ................................. 2024-042752

(51) Int. Cl.
*G03G 15/08* (2006.01)
*G03G 15/095* (2006.01)
*H04N 1/405* (2006.01)

(52) U.S. Cl.
CPC ....... *G03G 15/0894* (2013.01); *G03G 15/095* (2013.01); *H04N 1/4057* (2013.01)

(58) Field of Classification Search
CPC ........... G03G 15/1675; G03G 15/5041; G03G 15/5058; G03G 15/0856; G03G 15/5062
See application file for complete search history.

(56) References Cited

U.S. PATENT DOCUMENTS

2003/0219266 A1* 11/2003 Itagaki ............... G03G 15/5041 399/49
2010/0329711 A1* 12/2010 Ishikawa ............ G03G 15/5041 399/72

FOREIGN PATENT DOCUMENTS

JP 2009-128679 A 6/2009
JP 2017-204786 A 11/2017
JP 2019-184769 A 10/2019
JP 2020-154302 A 9/2020

* cited by examiner

*Primary Examiner* — Jessica L Eley
(74) *Attorney, Agent, or Firm* — Venable LLP

(57) ABSTRACT

A determination method includes outputting a pattern image including a first region where a halftone image is formed and a second region where another halftone image is formed, the halftone image of the second region being constituted by dots of an average dot size smaller than an average dot size of dots constituting the halftone image of the first region, comparing a density of the first region with a density of the second region in the pattern image output on the recording material, and determining that the plurality of kinds of toner are mixed within the toner storage portion in a case where a visual density of the halftone image of the first region is higher than a visual density of the second region.

37 Claims, 25 Drawing Sheets

NON-MIXING STATE

MIXING STATE

DIFFERENT TONERS MIXED
(VERTICAL STREAK ON INNER SIDE WITH RESPECT TO REFERENCE VERTICAL LINES)

DIFFERENT TONERS NOT MIXED
(VERTICAL STREAK ON OUTER SIDE WITH RESPECT TO REFERENCE VERTICAL LINES OR NO VERTICAL LINE)

FIG.17

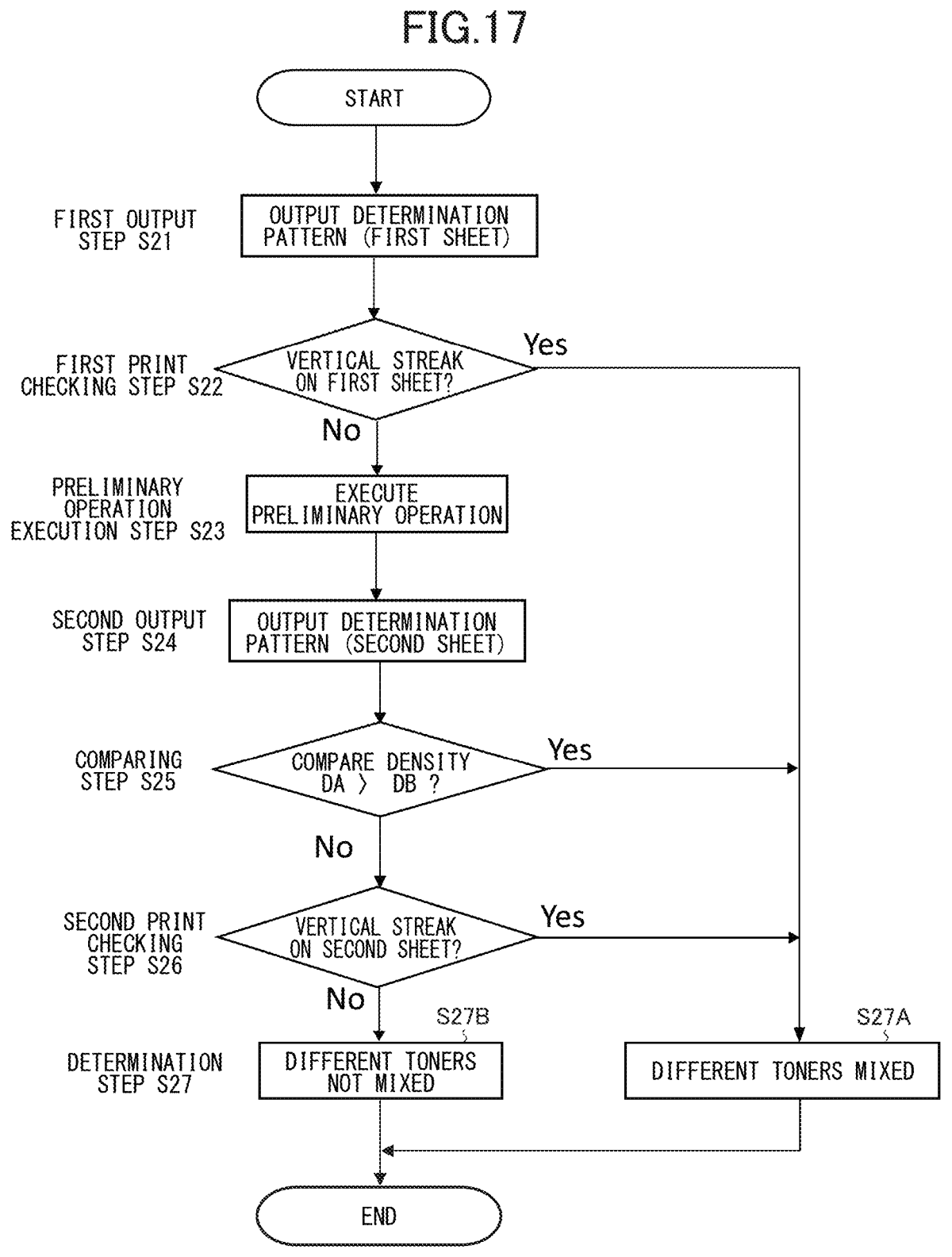

START
FIRST OUTPUT STEP S21
OUTPUT DETERMINATION PATTERN (FIRST SHEET)
FIRST PRINT CHECKING STEP S22
VERTICAL STREAK ON FIRST SHEET?
Yes
No
PRELIMINARY OPERATION EXECUTION STEP S23
EXECUTE PRELIMINARY OPERATION
SECOND OUTPUT STEP S24
OUTPUT DETERMINATION PATTERN (SECOND SHEET)
COMPARING STEP S25
COMPARE DENSITY DA 〉 DB ?
Yes
No
SECOND PRINT CHECKING STEP S26
VERTICAL STREAK ON SECOND SHEET?
Yes
No
S27B
S27A
DETERMINATION STEP S27
DIFFERENT TONERS NOT MIXED
DIFFERENT TONERS MIXED
END

FIG.18

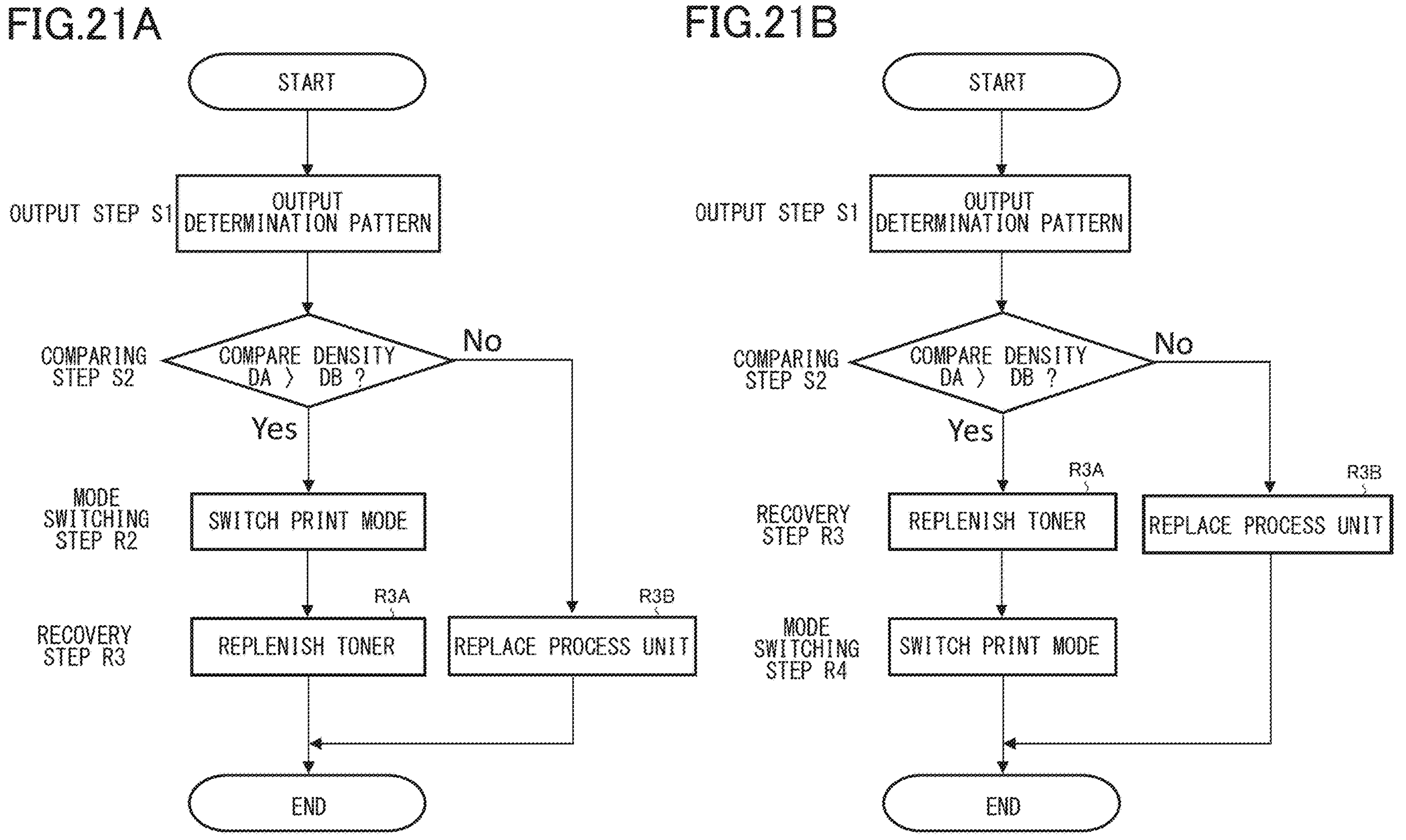
FIG.21A
START
OUTPUT STEP S1
OUTPUT DETERMINATION PATTERN
COMPARING STEP S2
COMPARE DENSITY DA 〉 DB ?
Yes
No
MODE SWITCHING STEP R2
SWITCH PRINT MODE
RECOVERY STEP R3
R3A
REPLENISH TONER
R3B
REPLACE PROCESS UNIT
END
FIG.21B
START
OUTPUT STEP S1
OUTPUT DETERMINATION PATTERN
COMPARING STEP S2
COMPARE DENSITY DA 〉 DB ?
Yes
No
RECOVERY STEP R3
R3A
REPLENISH TONER
R3B
REPLACE PROCESS UNIT
MODE SWITCHING STEP R4
SWITCH PRINT MODE
END

FIG.23

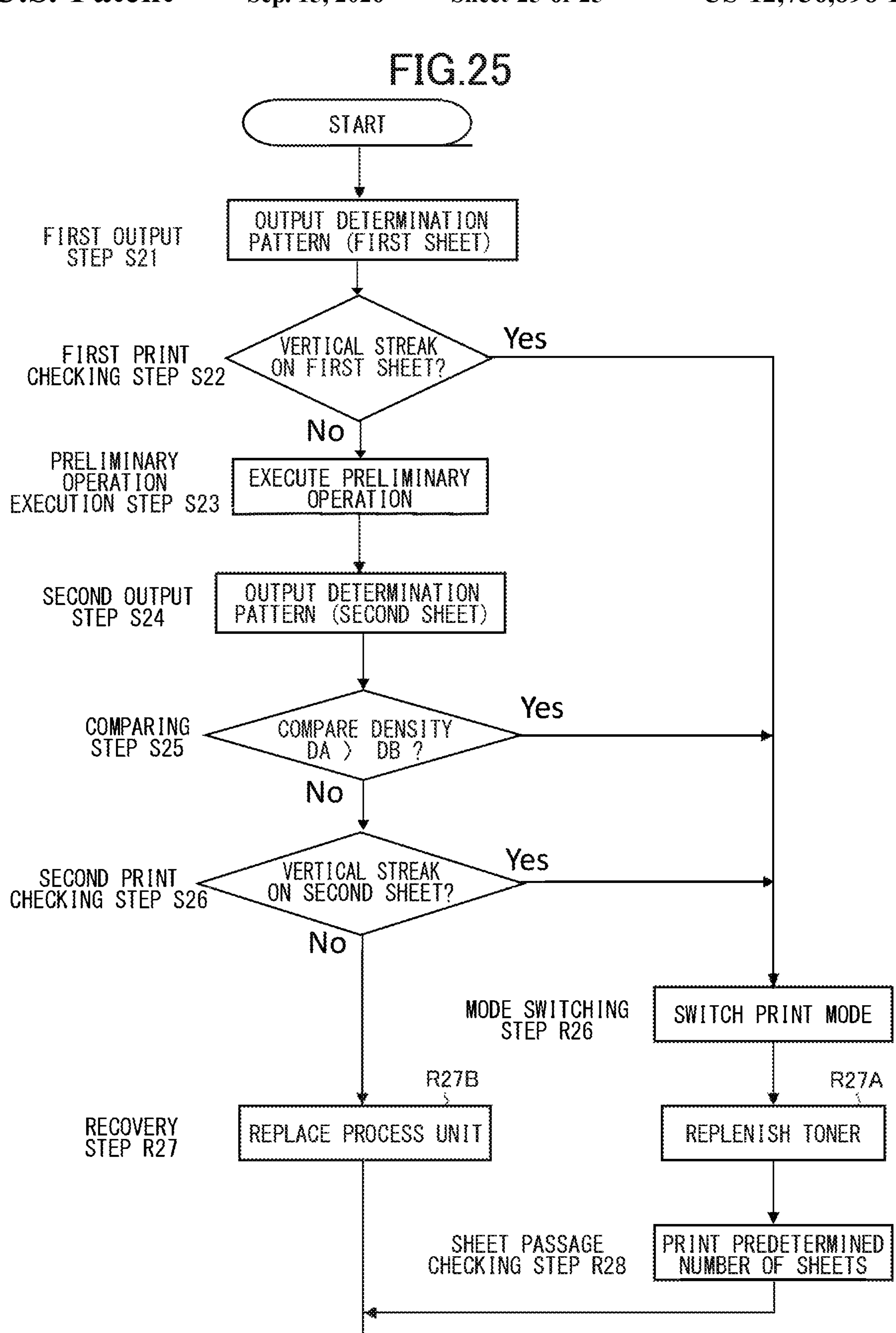
FIG.25
START
FIRST OUTPUT STEP S21
OUTPUT DETERMINATION PATTERN (FIRST SHEET)
FIRST PRINT CHECKING STEP S22
VERTICAL STREAK ON FIRST SHEET?
Yes
No
PRELIMINARY OPERATION EXECUTION STEP S23
EXECUTE PRELIMINARY OPERATION
SECOND OUTPUT STEP S24
OUTPUT DETERMINATION PATTERN (SECOND SHEET)
COMPARING STEP S25
COMPARE DENSITY DA ＞ DB ?
Yes
No
SECOND PRINT CHECKING STEP S26
VERTICAL STREAK ON SECOND SHEET?
Yes
No
MODE SWITCHING STEP R26
SWITCH PRINT MODE
R27B
R27A
RECOVERY STEP R27
REPLACE PROCESS UNIT
REPLENISH TONER
SHEET PASSAGE CHECKING STEP R28
PRINT PREDETERMINED NUMBER OF SHEETS
END

DETERMINATION METHOD AND RECOVERY METHOD

BACKGROUND OF THE INVENTION

Field of the Invention

The present invention relates to a determination method for determining whether or not a plurality of kinds of toner are mixed within a toner storage portion in an image forming apparatus, and a recovery method for the image forming apparatus to recover from an image defect.

Description of the Related Art

Examples of a method of replenishing an image forming apparatus with a developer (toner) include a cartridge system and an external replenishment system. In the cartridge system, a process cartridge or a toner cartridge attachable to and detachable from an apparatus body of the image forming apparatus is used, and the cartridge is replaced with a brand-new cartridge when the remaining amount of the developer in the cartridge is small. In the external replenishment system, when the remaining amount of the developer in the toner storage portion of the image forming apparatus is small, the toner storage portion is replenished with developer from the outside of the image forming apparatus by using a replenishment container storing developer. Japanese Patent Laid-Open No. 2020-154302 discloses a configuration in which the image forming apparatus is replenished with toner from the outside by using a toner pack as a replenishment container.

SUMMARY OF THE INVENTION

The present invention provides a determination method to determine whether or not mixing of a plurality of kinds of toner occurred, and a recovery method with which recovery from an image defect caused by mixing of a plurality of kinds of toner can be achieved.

According to an aspect of the invention, a determination method is for determining whether or not a plurality of kinds of toner are mixed within a toner storage portion in an image forming apparatus which is capable of being replenished with toner by using a replenishment container, and the determination method includes outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region, comparing a density of the first region with a density of the second region in the pattern image output on the recording material, and determining that the plurality of kinds of toner are mixed within the toner storage portion in a case where a visual density of the halftone image of the first region is higher than a visual density of the second region in the comparing in a condition of an illuminance of 30 lux or more.

According to another aspect of the invention, a determination method is for determining whether or not a plurality of kinds of toner are mixed within a toner storage portion in an image forming apparatus which is capable of being replenished with toner by using a replenishment container, and the determination method includes outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region, comparing a density of the first region with a density of the second region in the pattern image output on the recording material, and determining that the plurality of kinds of toner are mixed within the toner storage portion, in a case where, in the comparing, the density of the first region is higher than the density of the second region and a difference between the density of the first region and the density of the second region satisfies a predetermined condition.

According to another aspect of the invention, a determination method is for determining whether or not a plurality of kinds of toner are mixed within a toner storage portion in an image forming apparatus which is capable of being replenished with toner by using a replenishment container, and the determination method includes outputting a first pattern image on a first recording material by using the image forming apparatus, the first pattern image including a boundary line indicating a boundary of a predetermined region in a main scanning direction of image formation, checking whether or not there is an image other than the first pattern image in the predetermined region on the first recording material, and determining, on a basis of a result of the checking, whether or not the plurality of kinds of toner are mixed within the toner storage portion.

According to another aspect of the invention, a recovery method is for causing an image forming apparatus to recover from an image defect, the image forming apparatus including a toner storage portion capable of being replenished with toner by using a replenishment container, and the recovery method includes outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region, comparing a density of the first region with a density of the second region in the pattern image output on the recording material, and replenishing the toner storage portion with toner, wherein the replenishing is executed in a case where a visual density of the halftone image of the first region is higher than a visual density of the second region in the comparing in a condition of an illuminance of 30 lux or more.

According to another aspect of the invention, a recovery method is for causing an image forming apparatus to recover from an image defect, the image forming apparatus including a toner storage portion capable of being replenished with toner by using a replenishment container, and the recovery method includes outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region, comparing a density of the first region with a density of the second region in the pattern image output on the recording material, and replenishing the toner storage portion with toner, wherein the replenishing is executed in a case where, in the comparing, the density of the first region is higher than the density of the second region and a difference between the density of the first region and the density of the second region satisfies a predetermined condition.

According to another aspect of the invention, a recovery method is for causing an image forming apparatus to recover from an image defect, the image forming apparatus including a toner storage portion capable of being replenished with toner by using a replenishment container, and the recovery method includes outputting a first pattern image on a first recording material by using the image forming apparatus, the first pattern image including a boundary line indicating a boundary of a predetermined region in a main scanning direction of image formation, checking whether or not there is an image other than the first pattern image in the predetermined region on the first recording material, and replenishing the toner storage portion with toner, wherein the replenishing is executed in a case where there is the image other than the first pattern image in the predetermined region in the checking.

Further features of the present invention will become apparent from the following description of exemplary embodiments with reference to the attached drawings.

BRIEF DESCRIPTION OF THE DRAWINGS

FIG. 5A is a diagram illustrating the toner pack according to Example 1, FIG. 5B is a diagram illustrating a first modification example of the toner pack, and FIG. 5C is a diagram illustrating a second modification example of the toner pack.

FIG. 17 illustrates a flowchart of a determination method according to Example 3.

FIG. 18 illustrates a flowchart of a determination method according to a modification example of Example 3.

FIGS. 21A and 21B each illustrate a flowchart of a recovery method according to a modification example of Example 4.

FIG. 23 illustrates a flowchart of a recovery method according to Example 5.

FIG. 25 illustrates a flowchart of a recovery method according to a modification example of Example 5.

DESCRIPTION OF THE EMBODIMENTS

Embodiments of the present disclosure will be described below with reference to drawings.

Example 1

Figure 1:
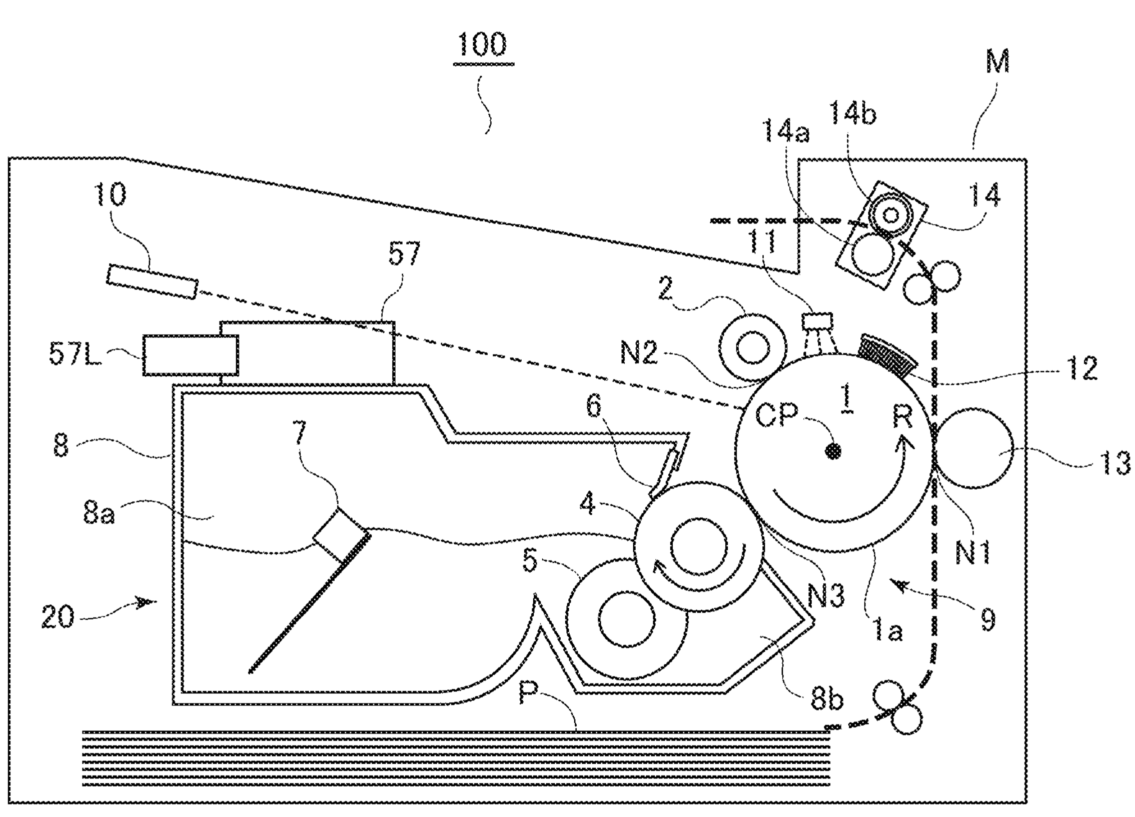
FIG. 1 is a schematic view of an image forming apparatus according to Example 1.

Example 1 will be described. FIG. 1 is a schematic diagram illustrating a cross-section of an image forming apparatus 100 according to Example 1. The image forming apparatus 100 is a monochromatic laser beam printer of an electrophotographic system. For example, the image forming apparatus 100 forms an image on a recording material P by using toner serving as developer on the basis of image information received from an external device while conveying the recording material P of the A4 size by longitudinal feeding. As the recording material P (recording medium), a wide variety of sheet materials of different sizes and materials can be used. Examples of the sheet materials include surface-treated sheet materials serving as coated paper sheets, sheet materials of irregular shapes such as envelopes and index paper sheets, plastic films, and cloths. In addition, the longitudinal feeding refers to conveying the recording material P in an orientation in which the long side of the recording material P is parallel to the conveyance direction of the recording material P (long-side feeding).

As illustrated in FIG. 1, the image forming apparatus 100 includes a process unit 9, and an apparatus body M accommodating the process unit 9. The process unit 9 includes a photosensitive drum 1, a plurality of process portions disposed around the photosensitive drum 1. In the present example, the plurality of process portions include a charging roller 2, a developing unit 20, a charge removing unit 11, and a brush member 12. In addition, the image forming apparatus 100 includes a mount portion 57 and a locking mechanism 57L. The locking mechanism 57L will be described in Example 4.

In the present example, the process unit 9 is configured to be attachable to and detachable from the apparatus body M. The configuration is not limited to this, and the process unit 9 may be configured to be not detachable from the apparatus body M. In addition, a configuration in which only part of the process unit 9 (for example, the developing unit 20 or a developing container 8) is attachable to and detachable from the apparatus body M may be employed.

In addition, the apparatus body M includes a scanner unit 10 serving as an exposing unit and a transfer roller 13 serving as a transfer member. The transfer roller 13 abuts a surface 1*a* of the photosensitive drum 1, and thus forms a transfer nip N1 serving as a transfer portion between the transfer roller 13 and the photosensitive drum 1.

The photosensitive drum 1 functions as an image bearing member that bears an electrostatic latent image and a developer image. The photosensitive drum 1 is a rotatable photosensitive member formed in a cylindrical shape (drum shape). The photosensitive drum 1 of the present example includes an aluminum base body formed in a drum shape, and a photosensitive layer formed from a negatively-chargeable organic photoconductor on the base body. More specifically, the photosensitive drum 1 is a rigid body formed by sequentially applying a resistor layer, an undercoat layer, and a photosensitive layer on the outer peripheral surface of an aluminum cylinder having a diameter of 24 mm by a dipping coating method. The photosensitive layer includes a charge generation layer and a charge transfer layer. The film thickness of the charge transfer layer is, for example, 22 μm. In addition, the photosensitive drum 1 is rotationally driven by a driving motor at a predetermined peripheral speed in a rotational direction indicated by an arrow R about a rotation axis CP. The peripheral speed of the photosensitive drum 1 defines the speed of image formation by the image forming apparatus 100, and is also referred to as a process speed.

The charging roller 2 serving as a charging member comes into contact with the photosensitive drum 1 at a predetermined pressure contact force, and thus forms a charging portion N2. In the present example, a configuration in which there is a certain speed difference between the surface speed of the photosensitive drum 1 and the surface speed of the charging roller 2 is employed. The charging roller 2 receives application of a charging voltage that is a direct current voltage from a charging voltage application portion 55*a* (FIG. 6), and thus uniformly charges the surface 1*a* of the photosensitive drum 1 to a predetermined potential (referred to as a dark potential VD). The dark potential VD is a negative potential, which is of the same polarity as the toner.

The charging roller 2 of the present example is a roller member having an outer diameter of 12 mm and including a core metal having a diameter of 6 mm, a base layer formed from hydrin rubber, and a surface layer formed from urethane. In addition, the resistance of the charging roller 2 is $1\times10^6\Omega$ or less, and the hardness thereof is 70° as measured by an MD-1 rubber hardness meter. To be noted, although a direct current voltage is used as the charging voltage in the present example, the configuration is not limited to this, and the charging voltage may be a voltage in which an alternate current voltage is superimposed on a direct current voltage.

The scanner unit 10 irradiates the photosensitive drum 1 with laser light corresponding to image information input from an external device by using a polygon mirror, and thus exposes the surface 1*a* of the photosensitive drum 1 in a scanning manner. As a result of this exposure, an electrostatic latent image corresponding to the image information is formed on the surface 1*a* of the photosensitive drum 1. The scanner unit 10 includes a semiconductor laser light source, and is capable of emitting laser light of a wavelength of 800 nm and changing the light amount of the laser light. To be noted, the scanner unit 10 is not limited to a laser scanner unit, and for example, a light-emitting diode (LED) exposing unit including an LED array in which a plurality LEDs are arranged in a longitudinal direction of the photosensitive drum 1 may be employed as the scanner unit 10.

The developing unit 20 includes a developing container 8 serving as a frame body of the developing unit 20, a developing roller 4, and a supply roller 5 that supplies toner to the developing roller 4. The developing container 8 functions as a toner storage portion (developer storage portion) that stores toner serving as developer. A storage chamber 8*a* that is a space for storing the toner, and a developing chamber 8*b* including the developing roller 4 are formed inside the developing container 8. The developing roller 4 and the supply roller 5 are rotatably supported by the developing container 8. In addition, the developing roller 4 is disposed at an opening portion of the developing container 8 so as to oppose the photosensitive drum 1. The supply roller 5 is in contact with the developing roller 4, and toner accommodated in the developing container 8 is applied on the surface of the developing roller 4 by the supply roller 5.

Figure 6:
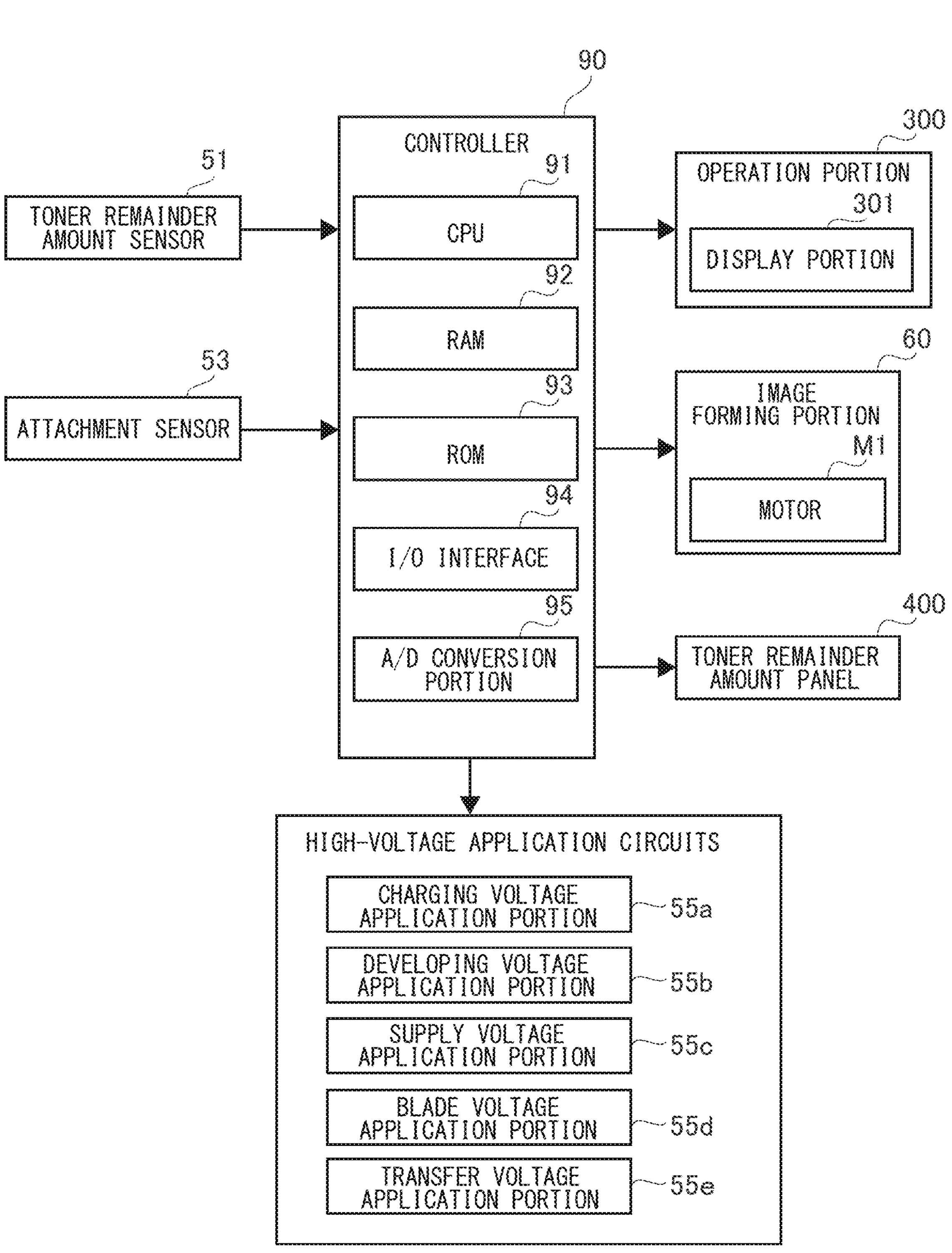
FIG. 6 is a block diagram illustrating a control system of the image forming apparatus according to Example 1.

The developing unit 20 of the present example employs a contact developing system as the developing system. That is, the toner layer borne on the developing roller 4 comes into contact with the photosensitive drum 1 at a developing portion N3 where the photosensitive drum 1 and the developing roller 4 oppose each other. In other words, the developing roller 4 serving as a developing member forms the developing portion N3 between the developing roller 4 and the photosensitive drum 1. A developing voltage that is a direct current voltage is applied to the developing roller 4 from a developing voltage application portion 55*b* (FIG. 6). Under the developing voltage, the toner borne on the developing roller 4 transfers from the developing roller 4 onto the surface 1*a* in accordance with the potential distribution of the surface 1*a* of the photosensitive drum 1, and thus the electrostatic latent image is developed into a toner image.

To be noted, in the present example, a reversal development system is employed. That is, in the surface of the photosensitive drum 1 charged to the dark potential VD in a charging step, a region where the toner image is to be formed is irradiated with light in an exposing step. As a result of this, the surface potential of the exposed region attenuates to a potential (referred to as a light potential VL) having a smaller absolute value than the dark potential VD. Meanwhile, the developing voltage is set to a value between the dark potential VD and the light potential VL. That is, the developing voltage is of the same polarity as the normal polarity of the toner with respect to the light potential VL, and is of a polarity opposite to the normal polarity of the toner with respect to the dark potential VD. Therefore, at the developing portion N3, whereas toner attaches to the exposed region that is a region of the light potential VL on the photosensitive drum 1 from the developing roller 4, the toner does not attach from the developing roller 4 to a non-exposed region that is a region of the dark potential VD. As a result of this, the potential distribution on the surface 1*a* of the photosensitive drum 1 is visualized by the toner, and thus the electrostatic latent image is developed into a toner image.

The developing roller 4 of the present example is a roller member including a core metal having a diameter of 6 mm and formed by applying a base layer formed from silicone rubber and a surface layer formed from urethane rubber thereon such that the overall outer diameter of the roller is 15 mm. The resistance of the developing roller 4 is $1\times10^4\Omega$ or more and $1\times10^{12}\Omega$ or less. The supply roller 5 is an elastic sponge roller that is conductive and formed by forming a foam body layer on the outer peripheral surface of a core metal having a diameter of 6 mm. The resistance of the supply roller 5 is, for example, $1\times10^4\Omega$ or more and $1\times10^8\Omega$ or less, and the hardness of the supply roller 5 is, for example, 200 gf. To be noted, the hardness of the supply roller 5 in the present example is a value obtained by measuring a load in the case where a flat plate having a longitudinal width of 50 mm is stuck into the surface of the supply roller 5 to a depth of 1 mm.

An agitation member 7 is provided inside the developing container 8. The agitation member 7 pivots by being driven by a motor M1 (FIG. 6) serving as a drive source and thus agitates the toner in the developing container 8 and conveys the toner toward the developing roller 4 and the supply roller 5. In addition, the agitation member 7 has a role of circulating the toner having been not used for development and having been peeled off from the developing roller 4 in the developing container 8, and thus uniformizing the toner in the developing container 8.

A developing blade 6 that regulates the amount of toner borne on the developing roller 4 is disposed in an opening portion of the developing container 8 in which the developing roller 4 is disposed. The toner supplied to the surface of the developing roller 4 passes through a portion where the developing roller 4 and the developing blade 6 oppose each other in accordance with the rotation of the developing roller 4, is thus shaped into an even thin layer, and is charged to a negative polarity by frictional charging.

The developing blade 6 is, for example, a metal plate (for example, a metal plate formed from stainless steel (SUS)) having a thickness of 0.1 mm. One end (fixed end) of the metal plate of the developing blade 6 is fixed, and another end (free end) thereof is in contact with the developing roller 4. The developing blade 6 is disposed such that a direction from the fixed end toward the free end is a direction (counter direction) inclined toward the upstream side in the rotational direction of the developing roller 4. The developing blade 6 used in the present example is obtained by performing cutting on the distal end of an SUS metal plate from the side that abuts the developing roller 4. The distal end portion of the developing blade 6 is bent in a cutting direction by the cutting.

The transfer roller 13 functions as a transfer member (transfer unit). The transfer roller 13 includes a core metal having a diameter of 5 mm. In addition, the transfer roller 13 includes a base layer formed from ion-conductive sponge on the outer peripheral surface of the core metal such that the overall outer diameter of the transfer roller 13 is 12.5 mm. The resistance of the transfer roller 13 is, for example, $4\times10^7\Omega$ in an environment of a temperature of 22° C., and the hardness thereof is, for example, 30° as measured by an Asker C rubber hardness meter manufactured by KOBUNSHI KEIKI CO., LTD.

When a command to form an image is output to the image forming apparatus 100, a series of operations (image forming operation) of forming an image on the recording material P on the basis of image information input from an external computer connected to the image forming apparatus 100, a recording medium, or the like is started. When the image forming operation is started, the photosensitive drum 1 is driven by an unillustrated drive source, and is thus rotated in the arrow R direction of FIG. 1 at a predetermined process speed. In the present example, the process speed of the photosensitive drum 1 is 140 mm/sec.

In the process unit 9, the charge removing unit 11 that removes electrical charges from the photosensitive drum 1 is provided at a position downstream of the transfer nip N1 and upstream of the charging portion N2 in the rotational direction of the photosensitive drum 1. More specifically, the charge removing unit 11 serving as a charge removing portion is disposed between the brush member 12 and the charging roller 2 in the rotational direction of the photosensitive drum 1. The charge removing unit 11 removes the surface potential of the photosensitive drum 1 before reaching the charging portion N2, so as to cause stable electrical discharge at the charging portion N2.

The charging roller 2 uniformly charges the surface of the rotating photosensitive drum 1 to the dark potential VD. The scanner unit 10 emits laser light toward the photosensitive drum 1 on the basis of the input image information. As a result of this, an electrostatic latent image is formed on the surface 1*a* of the photosensitive drum 1.

Meanwhile, a toner layer charged to a predetermined polarity is formed on the surface of the developing roller 4. Further, as a result of application of a developing voltage to the developing roller 4, the electrostatic latent image on the photosensitive drum 1 is developed at the developing portion N3, and thus a toner image is formed on the photosensitive drum 1. The effective pixel number of the toner image formed by the image forming apparatus 100 according to the present example in the process described above is 400 dpi.

In parallel with the formation of the toner image described above, recording materials P stored in a lower portion of the image forming apparatus 100 are fed one by one. The recording material P is conveyed to the transfer nip N1 at a timing matching a timing at which the toner image formed on the photosensitive drum 1 reaches the transfer nip N1. In addition, a direct current transfer voltage is applied to the transfer roller 13 from a transfer voltage application portion 55*e* (FIG. 6) at a timing matching the timing at which the toner image formed on the photosensitive drum 1 reaches the transfer nip N1. As a result of this, the toner image borne on the photosensitive drum 1 is transferred onto the recording material P passing through the transfer nip N1. The transfer voltage in the present example is set to, for example, +1,500 V.

The recording material P onto which the toner image has been transferred is conveyed to a fixing unit 14. The fixing unit 14 is of a thermal fixation type that fixes an image by heating and melting the toner on the recording material P. The fixing unit 14 includes, for example, a fixing film 14*a*, a heat source (heater) such as a ceramic heater that heats the fixing film 14*a*, and a pressurizing roller 14*b* that is in pressure contact with the fixing film 14*a*. The toner image is heated and pressurized when the recording material P passes through the nip portion between the fixing film 14*a* and the pressurizing roller 14*b*. As a result of this, toner particles melt and then solidify to adhere to the recording material P, and thus the toner image is fixed to the recording material P. The recording material P having passed through the fixing unit 14 is discharged to the outside of the image forming apparatus 100 by an unillustrated discharge roller pair.

In addition, the image forming apparatus 100 includes an unillustrated environment detection portion. The environment detection portion is disposed in the image forming apparatus 100 and detects the temperature and humidity of the surroundings thereof. The voltage applied to the charging roller 2 and the developing roller 4, the scanner unit 10, the transfer roller 13, the fixing unit 14, and the like are controlled on the basis of the detection result of the environment detection portion.

Collection of Transfer Residual Toner

Transfer residual toner remaining on the photosensitive drum 1 without being transferred onto the recording material P is removed by the following process. The surface potential of the photosensitive drum 1 after a transfer step is generally lower than the dark potential VD. This is because the surface of the photosensitive drum 1 is affected by the transfer voltage applied to the transfer roller 13 when passing through the transfer nip N1. The surface potential of the photosensitive drum 1 after the transfer step in the present example is about −150 V.

The surface of the photosensitive drum 1 after the transfer step moves toward the charging portion N2 after being subjected to charge removal by the charge removing unit 11 such that the remaining surface potential becomes 0 V. Here, the transfer residual toner is a mixture of toner charged to the positive polarity that is opposite to the normal polarity (negative polarity in the present example) and toner that is charged to the negative polarity but does not have enough charges. The charges of the photosensitive drum 1 are removed by the charge removing unit 11 after the transfer, uniform electrical discharge by the charging roller 2 is generated, and thus the transfer residual toner is charged to the negative polarity again. The transfer residual toner charged to the negative polarity again in the charging portion N2 moves toward the developing portion N3 in accordance with the rotation of the photosensitive drum 1. In addition, the surface region of the photosensitive drum 1 having passed through the charging portion N2 is exposed by the scanner unit 10 in a state in which the transfer residual toner is still attached thereto, and thus an electrostatic latent image is drawn thereon.

Here, the behavior of the transfer residual toner having reached the developing portion N3 will be respectively described for the exposed region and the non-exposed region of the photosensitive drum 1. The transfer residual toner attached to the non-exposed region of the photosensitive drum 1 is transferred onto the developing roller 4 at the developing portion N3 as a result of the potential difference between the dark potential VD of the non-exposed region of the photosensitive drum 1 and the developing voltage, and is thus collected into the developing container 8. This is because the developing voltage applied to the developing roller 4 is relatively a voltage of a positive polarity with respect to the dark potential VD of the non-exposed region. To be noted, the toner collected into the developing container 8 is agitated by the agitation member 7 together with the toner in the developing container 8, and is used again for a developing step by being borne on the developing roller 4.

In contrast, the transfer residual toner attached to the exposed region of the photosensitive drum 1 remains on the surface 1*a* of the photosensitive drum 1 without being transferred from the photosensitive drum 1 onto the developing roller 4 at the developing portion N3. This is because the developing voltage applied to the developing roller 4 is at a potential of a negative polarity with respect to the light potential VL of the exposed region. The transfer residual toner remaining on the surface 1*a* of the photosensitive drum 1 is borne on the photosensitive drum 1 together with other toner transferred from the developing roller 4 to the exposed region to move to the transfer nip N1, and is transferred onto the recording material P at the transfer nip N1.

As described above, the process unit 9 of the present example is configured to have a cleanerless configuration (simultaneous development-cleaning configuration) in which transfer residual toner is collected into the developing unit 20 to be reused. As a result of employing the cleanerless configuration for the process unit 9, an installation space for a collecting container for collecting the transfer residual toner and the like is not needed, and thus the image forming apparatus 100 can be further miniaturized. In addition, the printing cost can be reduced by reusing the transfer residual toner.

Configuration of Developing Container and Toner Pack

Figures 2A, 2B:
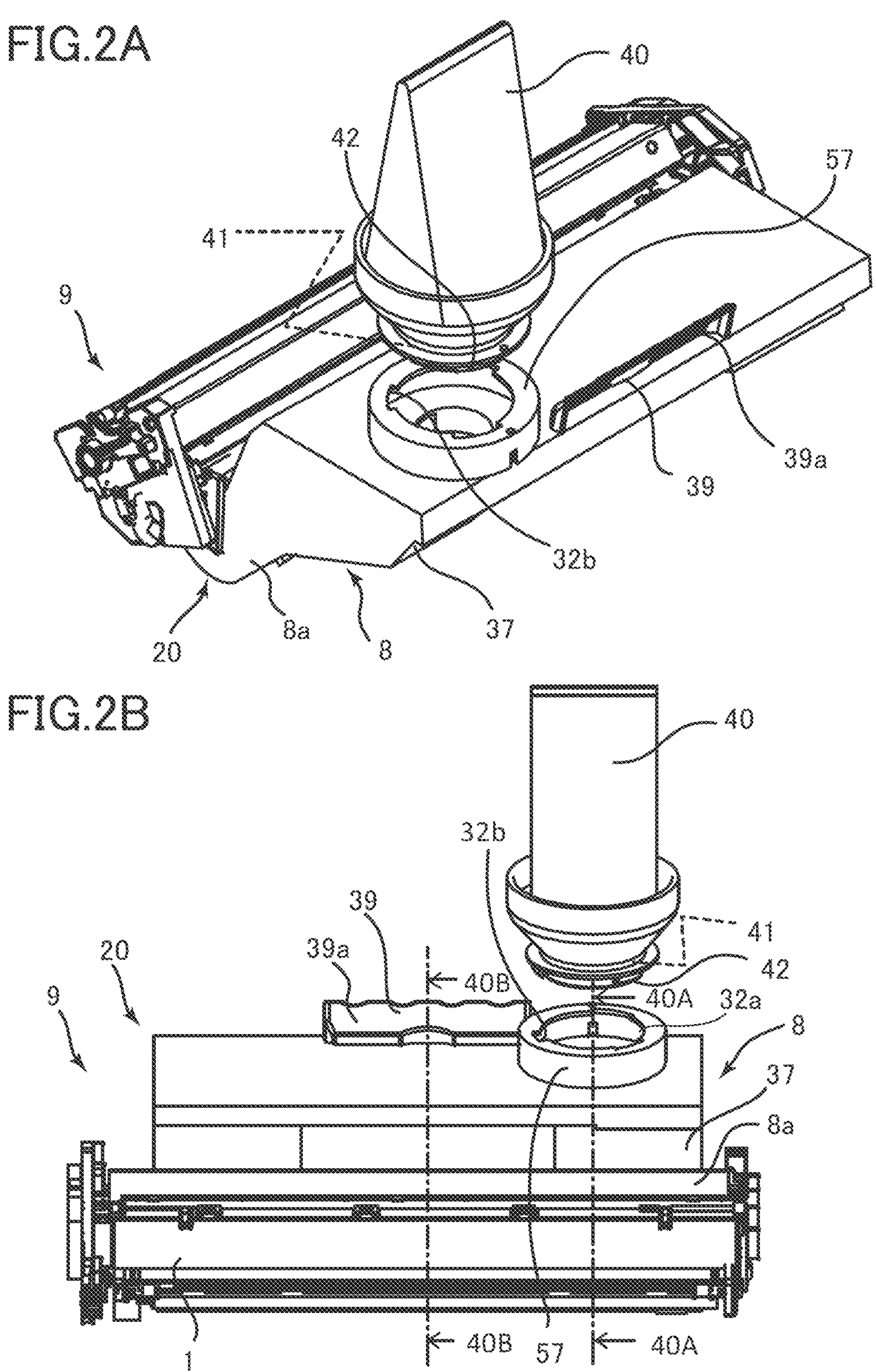
FIG. 2A is a perspective view of a process unit and a toner pack according to Example 1.
FIG. 2B is a front view of the process unit and the toner pack according to Example 1.
Figure 3A:
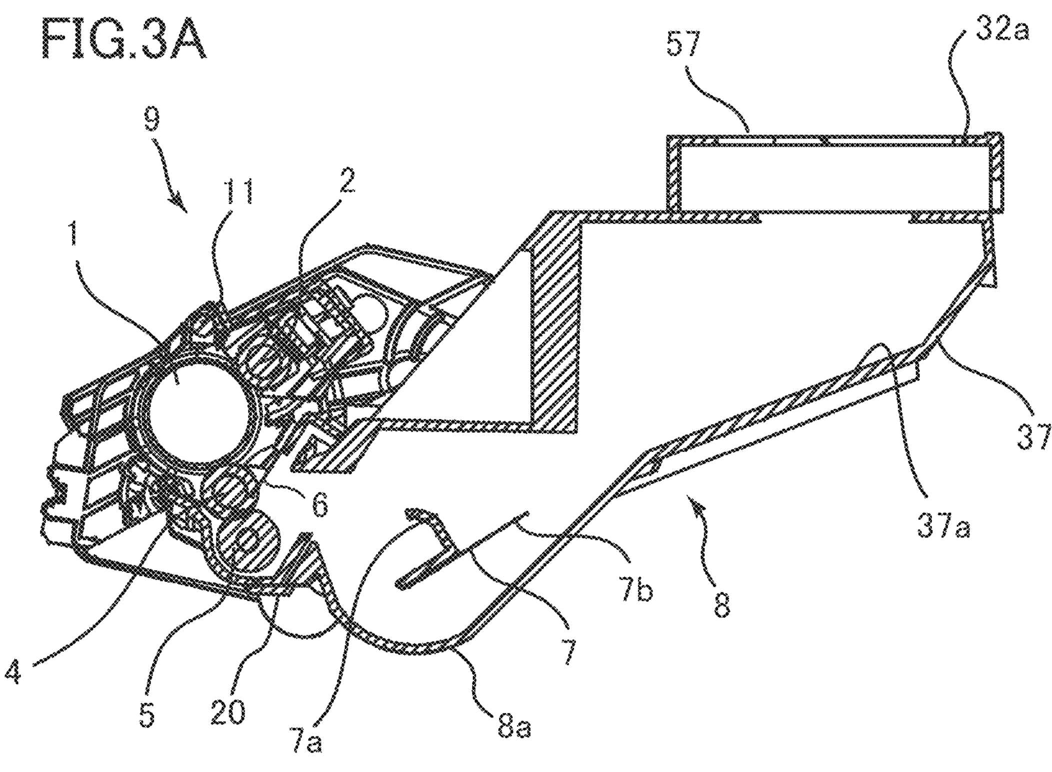
FIGS. 3A and 3B are each a section view of the process unit according to Example 1.
Figure 3B:
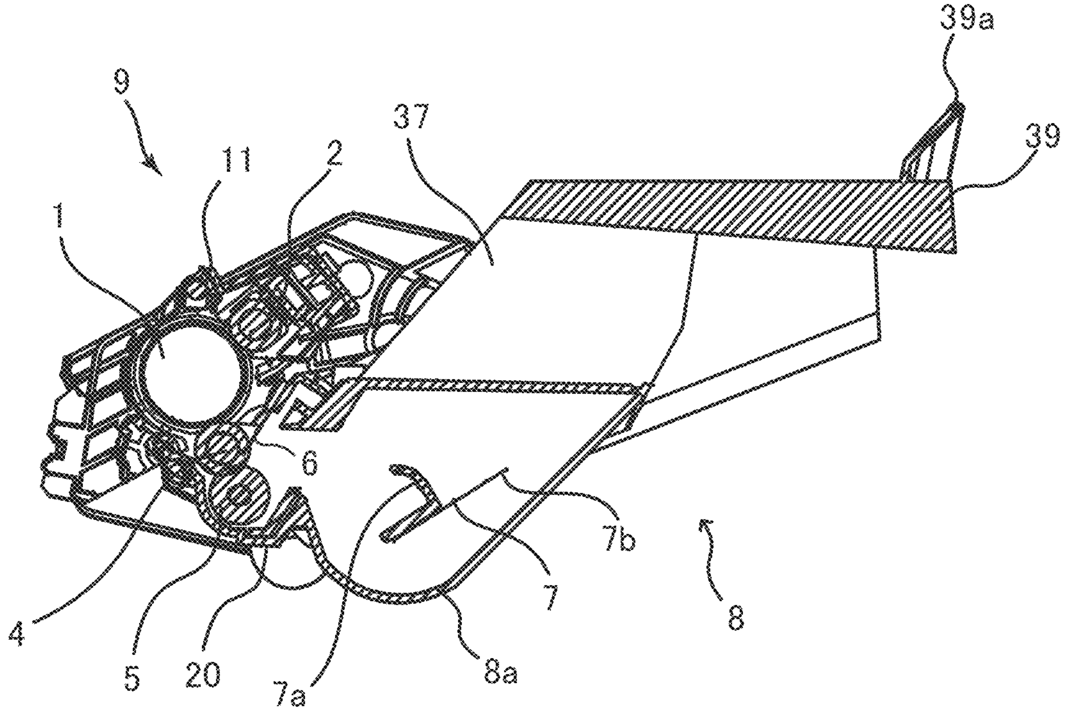

Next, the configuration of the developing container 8 and the toner pack 40 will be described. FIG. 2A is a perspective view of the process unit 9 and the toner pack 40, and FIG. 2B is a front view of the process unit 9 and the toner pack 40. FIG. 3A is a section view taken along a line 40A-40A of FIG. 2B, and FIG. 3B is a section view taken along a line 40B-40B of FIG. 2B.

As illustrated in FIGS. 2A to 3B, the developing container 8 includes a storage chamber 8*a* accommodating the agitation member 7. The storage chamber 8*a* serving as a storage space for storing toner extends approximately to the total length of the developing container 8 in the longitudinal direction (left-right direction). The inner wall of the storage chamber 8*a* is integrally formed with the frame body rotatably supporting the developing roller 4 and the supply roller 5. Toner serving as developer to be borne on the developing roller 4 is stored in the storage chamber 8*a*.

In addition, the developing container 8 includes a first protrusion portion 37 serving as a protrusion portion protruding upward from one end portion of the storage chamber 8*a* in the longitudinal direction and communicating with the storage chamber 8*a*, and a second protrusion portion 38 protruding upward from the other end portion of the storage chamber 8*a* in the longitudinal direction. The mount portion 57 to which a toner pack 40 is attachable is provided at an upper end portion (distal end portion) of the first protrusion portion 37. A replenishment port 32*a* for replenishment of the storage chamber 8*a* with developer from the toner pack 40 is provided in the mount portion 57. The toner pack 40 can be attached to the mount portion 57 in a state in which at least part of the toner pack 40 serving as a replenishment container is exposed to the outside of the image forming apparatus 100.

The developing container 8 is configured such that the toner supplied through the replenishment port 32*a* reaches the agitation member 7 by just the weight thereof. Here, "by just the weight thereof" means that a configuration in which the toner reaches the agitation member 7 by the weight thereof although an agitation member (conveyance member) that rotates or swings to convey the toner is not provided between the replenishment port 32*a* of the developing container 8 and the agitation member 7 is employed. In addition, in the developing container 8, the agitation member 7 is a rotary member closest to the replenishment port 32*a*, and is disposed such that the toner in the storage chamber 8*a* reaches the developing roller 4 or the supply roller 5 by the rotation thereof.

A handle portion 39 includes a hooking portion 39*a* that the user can grip by hooking a finger thereon. The hooking portion 39*a* is formed to protrude upward from a top surface of the handle portion 39. The first protrusion portion 37 is formed to have a hollow inside, and the replenishment port 32*a* is formed in the upper surface thereof. The replenishment port 32*a* is configured to be capable of being coupled to the toner pack 40.

The toner pack 40 is configured to be attachable to and detachable from the mount portion 57 of the first protrusion portion 37. In addition, the toner pack 40 includes a bag body, a shutter member 41 provided at an opening portion of the bag body and configured to be openable and closable, and a plurality (three in the present example) of protrusions 42 formed in correspondence with a plurality (three in the present example) of groove portions 32*b* formed in the mount portion 57. In the case of replenishing the developing container 8 with toner, the user positions the toner pack 40 such that the protrusions 42 pass through the groove portions 32*b* of the mount portion 57, and couples the toner pack 40 to the mount portion 57. Then, when the toner pack 40 is rotated by 180° in this state, the shutter member 41 of the toner pack 40 abuts an unillustrated abutment portion of the mount portion 57, thus rotates with respect to the body of the toner pack 40, and is opened. As a result of this, the toner stored in the toner pack 40 drops from the toner pack 40, and the dropped toner enters the first protrusion portion 37 having a hollow inside through the replenishment port 32*a*. To be noted, the shutter member 41 may be provided on the replenishment port 32*a* side.

The first protrusion portion 37 includes an inclined surface 37*a* (FIG. 3A) at a position opposing the opening of the replenishment port 32*a*. The inclined surface 37*a* is inclined downward toward the storage chamber 8*a*. Therefore, the toner supplied through the replenishment port 32*a* is guided to the storage chamber 8*a* by the inclined surface 37*a*. The agitation member 7 includes an agitation shaft 7*a* extending in the longitudinal direction and a blade portion 7*b* fixed to the agitation shaft 7*a* and extending radially outward from the agitation shaft 7*a* as illustrated in FIGS. 3A and 3B. The blade portion 7*b* is a sheet having flexibility. The agitation member 7 rotates about the agitation shaft 7*a*. Toner supplied through the replenishment port 32*a* disposed upstream of the agitation member 7 in the conveyance direction is conveyed toward the developing roller 4 and the supply roller 5 by the rotation of the agitation member 7.

Figure 4:
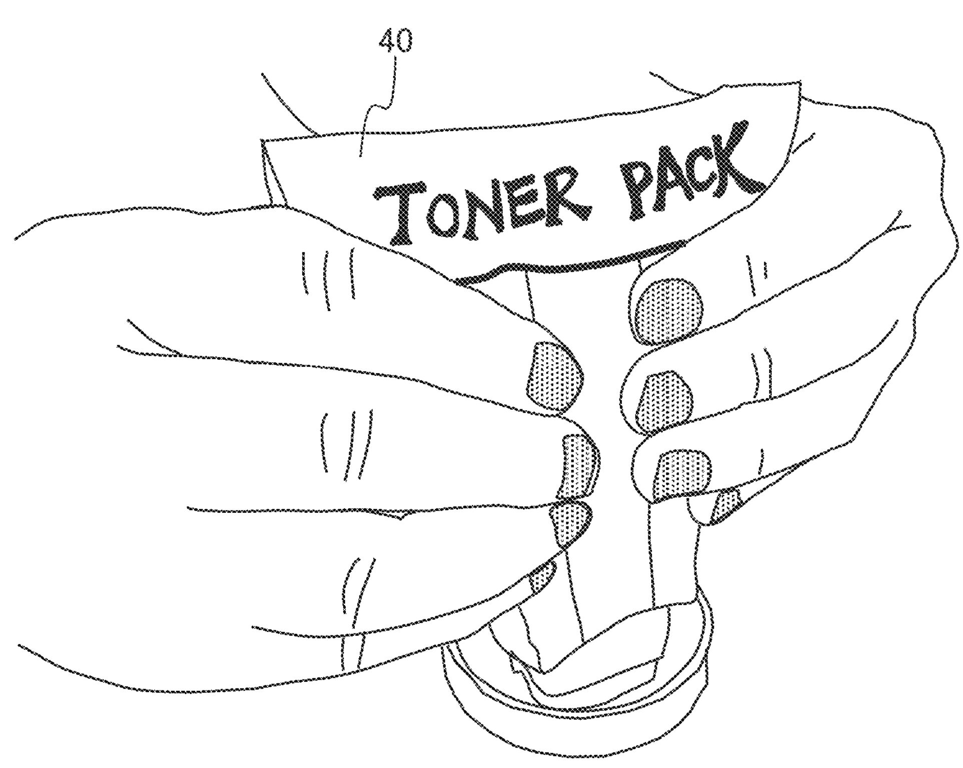
FIG. 4 is an explanatory diagram of the toner pack according to Example 1.
Figures 5A, 5B, 5C:
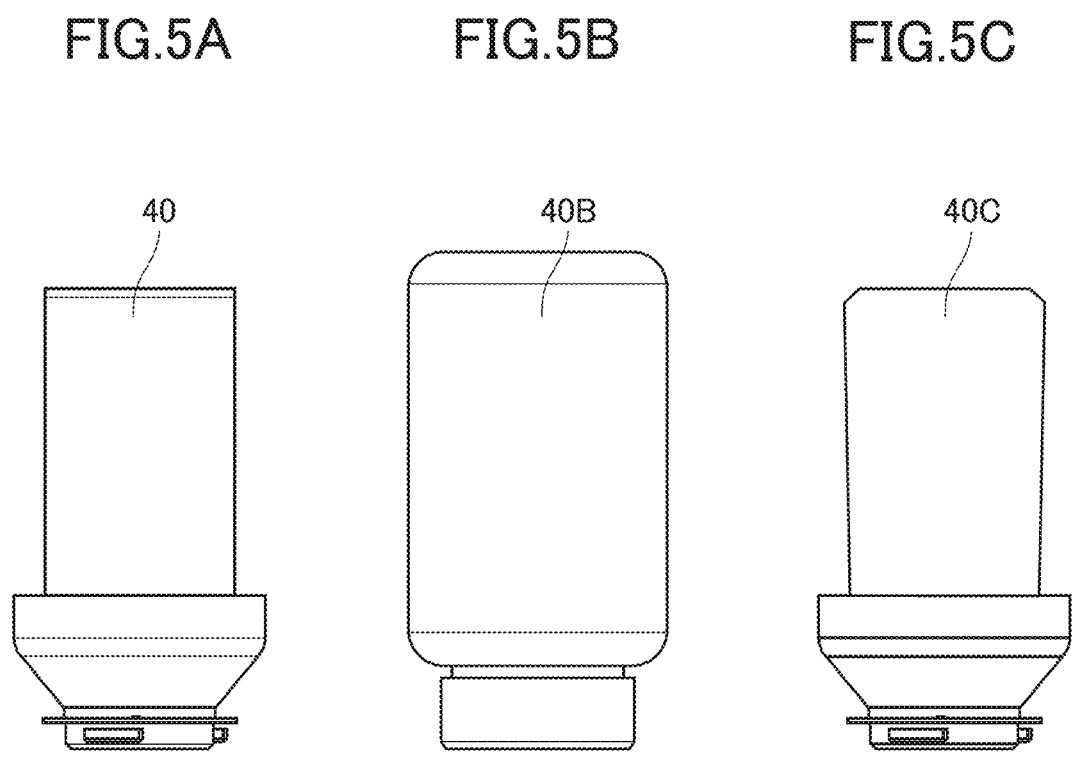

Although the toner pack 40 is constituted by an easily deformable plastic bag body as illustrated in FIGS. 4 and 5A in the present example, the configuration is not limited to this. For example, the toner pack may be constituted by a bottle container 40B having an approximate cylindrical shape as illustrated in FIG. 5B, or may be constituted by a paper container 40C formed from paper as illustrated in FIG. 5C. In either case, the toner pack may be formed from any material or in any shape. In addition, as a method for ejecting toner from the toner pack, squeezing the toner pack by the fingers of the user is preferable in the case of the toner pack 40 and the paper container 40C, and dropping the toner from the container while the user vibrates the container by hitting the container or the like is preferable in the case of the bottle container 40B. In addition, a discharge mechanism may be provided in the bottle container 40B to discharge toner from the bottle container 40B. Further, the discharge mechanism may be configured to engage with the image forming apparatus 100 and receive a driving force from the image forming apparatus 100.

In addition, the shutter member 41 may be omitted in any of the toner packs, and a shutter member of a slide type may be employed instead of the shutter member 41 of a rotary type. In addition, the shutter member 41 may be configured to be broken by, for example, attaching the toner pack to the replenishment port 32*a* or rotating the toner pack in an attached state, or may have a detachable lid structure such as a sticker.

Control System of Image Forming Apparatus

FIG. 6 is a block diagram illustrating a control system of the image forming apparatus 100. A controller 90 serving as a control means of the image forming apparatus 100 includes a central processing unit (CPU) 91 serving as a calculation device, a random access memory (RAM) 92 used as a work area for the CPU 91, and a read-only memory (ROM) 93 that stores various programs. In addition, the controller 90 includes an I/O interface 94 serving as an input/output port connected to an external device, and an A/D conversion portion 95 that converts an analog signal into a digital signal.

A toner remainder amount sensor 51 and an attachment sensor 53 are connected to the input side of the controller 90. The toner remainder amount sensor 51 is configured such that the detection signal thereof changes in accordance with the remaining amount of toner in the developing container 8. The toner remainder amount sensor 51 may be, for example, an optical sensor disposed such that the optical path thereof passes through the inside of the developing container 8, and configured such that the detection signal thereof changes while the optical path is blocked by toner struck up by the agitation member 7. The attachment sensor 53 detects that the toner pack 40 is attached to the mount portion 57 (replenishment port 32*a*) of the developing container 8. For example, the attachment sensor 53 may be a pressure sensor provided at the replenishment port 32*a* and configured to output a detection signal in response to being pressed by a protrusion 42 of the toner pack 40.

In addition, an operation portion 300, an image forming portion 60, and a toner remainder amount panel 400 serving as a notification means capable of notifying information about the toner remainder amount are connected to the controller 90. The operation portion 300 includes a display portion 301 capable of displaying various setting screens, physical keys, and the like. The display portion 301 is constituted by, for example, a liquid crystal panel. The image forming portion 60 includes the motor M1 serving as a drive source that drives the photosensitive drum 1, the developing roller 4, the supply roller 5, the agitation member 7, and the like. To be noted, the photosensitive drum 1, the developing roller 4, the supply roller 5, and the agitation member 7 may be each configured to be driven by a different motor.

The toner remainder amount panel 400 displays information about the toner remainder amount in the developing container 8. The toner remainder amount panel 400 is, for example, one or several lamps, and is controlled such that the illumination state thereof changes stepwise on the basis of the detection signal of the toner remainder amount sensor 51. The user replenishes the developing container 8 with toner by using the toner pack 40 on the basis of the illumination state of the lamp(s) of the toner remainder amount panel 400 and/or the information displayed on the display portion 301. In addition, the controller 90 controls the output of various high-voltage application circuits (55*a* to 55*e*) incorporated in the image forming apparatus 100.

Latent Image Settings

Next, the latent image settings of the process unit 9 in the case of printing a determination pattern that will be described later will be described. A charging voltage of −1350 V is applied to the charging roller 2 of the present example such that the surface potential (dark potential VD) of the photosensitive drum 1 is −780 V. Then, the scanner unit 10 emits laser light toward the photosensitive drum 1 on the basis of the input image information. As a result of this, an electrostatic latent image is formed on the surface 1*a* of the photosensitive drum 1 that is uniformly charged. In the present example, such a light amount setting (0.35 $\mu J/cm^2$ in the present example) that the potential (light potential VL) of a region (solid black portion) that is a wide region continuously exposed by the scanner unit 10 is −100 V. An electrostatic latent image based on the image information of the determination pattern that will be described later is formed by using this light amount setting.

In contrast, the developing voltage of the present example is set to −380 V. In addition, a voltage of −580 V is applied to the supply roller 5 and the developing blade 6, respectively, from a supply voltage application portion 55$c$ and a blade voltage application portion 55$d$ (FIG. 6).

Determination Pattern

Incidentally, there is a case where a plurality of kinds of toner are mixed within the toner storage portion to cause an image defect, such as a case where toner already stored in the toner storage portion of the image forming apparatus and toner newly supplied from a replenishment container such as a toner pack or a toner cartridge are of different kinds. In the case where an image defect has occurred, it is preferable that a determination method for determining whether or not the image defect is caused by the mixing of the plurality of kinds of toner is provided. In addition, in the case where an image defect is caused by mixing of a plurality of kinds of toner, it is preferable that there is a recovery method for recovering from the image defect by an appropriate method. In the present example, a determination method and a recovery method using a pattern image (determination pattern) including a predetermined halftone is proposed.

Figure 7:
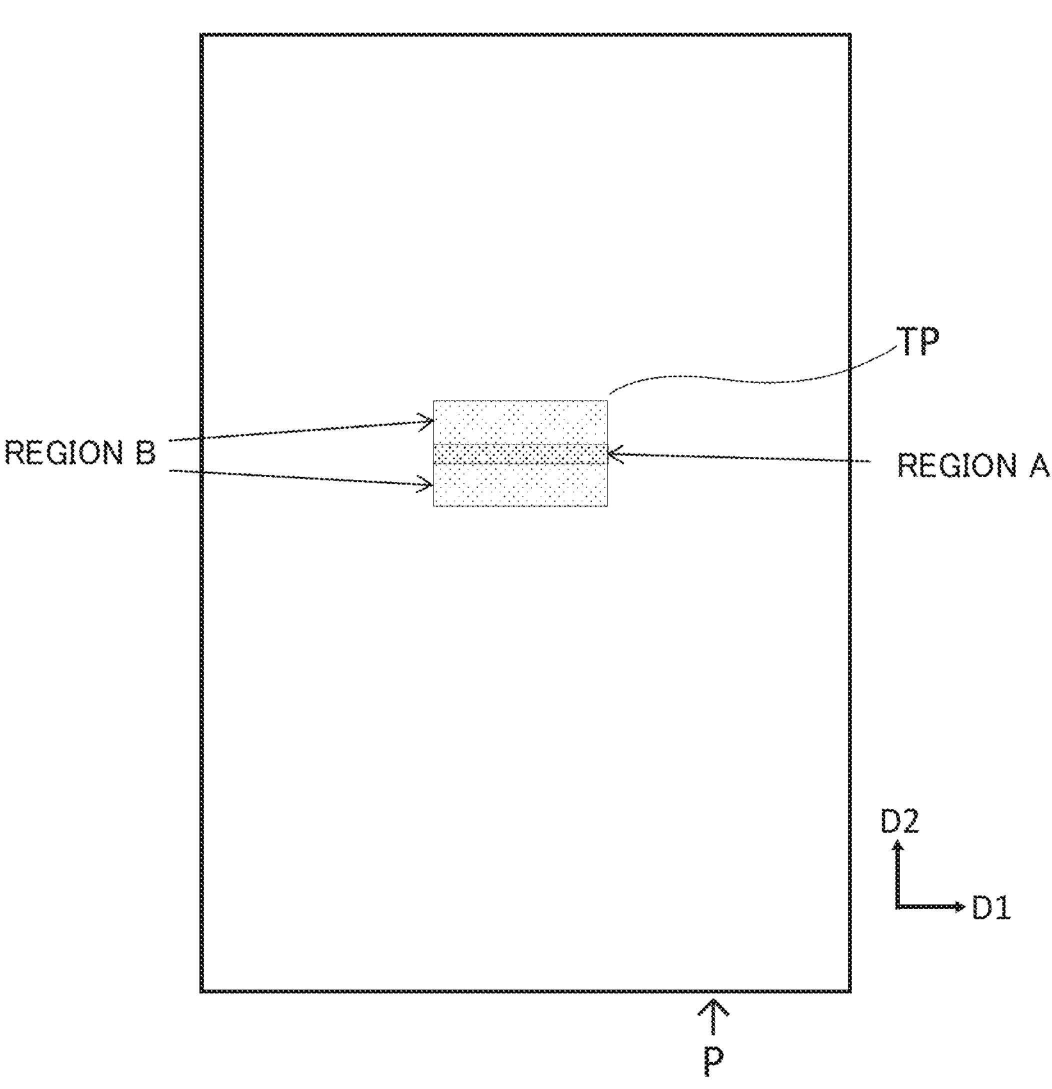
FIG. 7 illustrates a determination pattern according to Example 1.

A determination pattern used in the present example will be described. FIG. 7 is a diagram illustrating a determination pattern TP of the present example printed on a recording material P of the A4 size. In the present example, whether or not a plurality of kinds of toner having different natures are mixed within the developing container 8 is determined by using the determination pattern TP as will be described later. A case where a plurality of kinds of toner are mixed within the developing container 8 may be referred to as a different toner mixing state, and a case where a plurality of kinds of toner do not are mixed within the developing container 8 may be referred to as a different toner non-mixing state.

The determination pattern TP is a pattern image (test chart) including a plurality of regions (A and B) in each of which a halftone image is formed. The determination pattern TP of the present example includes a region A constituted by a first dot pattern and a region B constituted by a second dot pattern. In other words, the determination pattern TP serving as a pattern image used for determination includes the region A serving as a first region in which a halftone image is formed, and the region B serving as a second region in which a halftone image constituted by dots having a smaller average dot size than the dots of the first region. The first dot pattern and the second dot pattern differ from each other in the average dot size (average value of the number of pixels constituting a dot) of the dots constituting the halftone image.

Figure 8A:
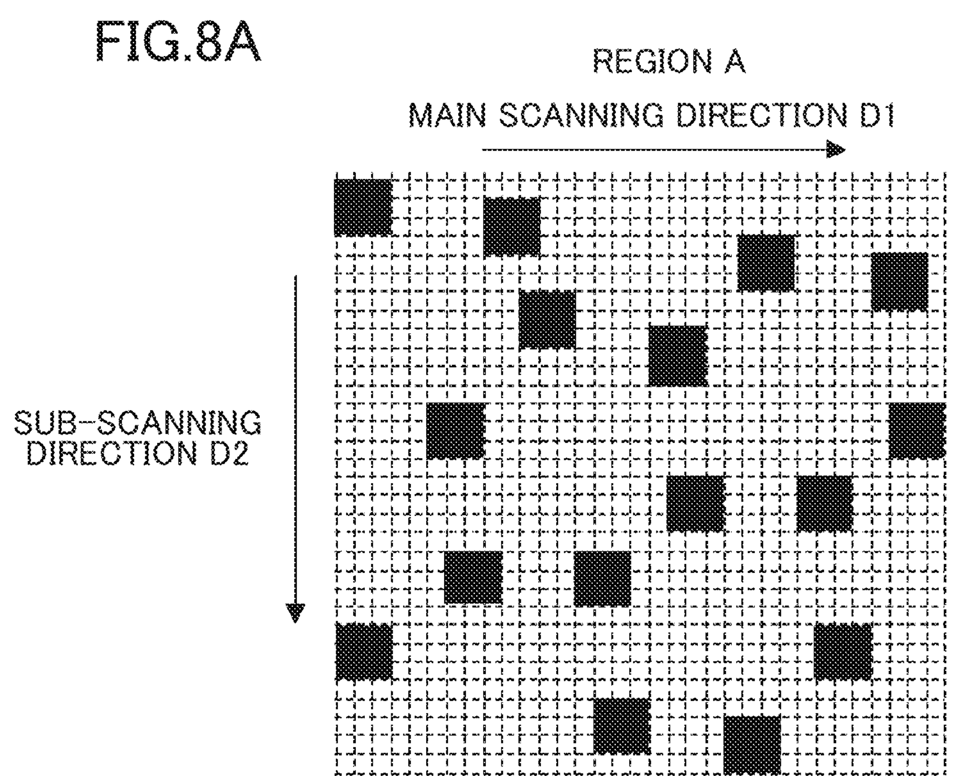
FIGS. 8A and 8B are explanatory diagrams of a dot structure of each region of the determination pattern according to Example 1.
Figure 8B:
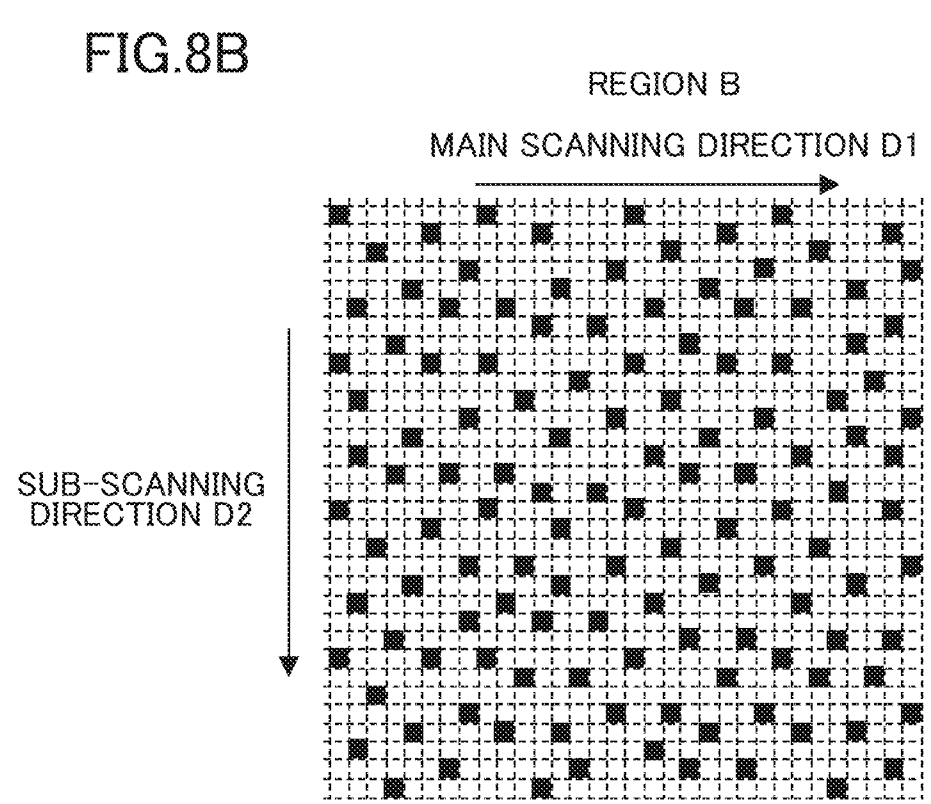

FIGS. 8A and 8B are schematic diagrams illustrating the dot structure of the regions A and B. In FIGS. 8A and 8B, each square represented by a dot lattice indicates one pixel of 400 dpi. In addition, a colored pixel is a pixel (printed pixel) that is developed with toner to form a dot.

In the region A, each dot is formed from a plurality of connected pixels. In the present example, the dots in the region A each have a square shape of 3×3 pixels, and thus the dot size thereof is 9 pixels. In contrast, in the region B, each dot is constituted by a single pixel (1×1 pixel). That is, in the present example, the dot size of the region B is 1 pixel.

The halftone images of the regions A and B are formed by repetition of the patterns of FIGS. 8A and 8B. In addition, the density of halftone in each region is preferably uniform. The dots are preferably periodically arranged, or random arrangement in which the intervals between dots are as constant as possible such that there is no portion where dots are sparse or dense is preferably employed as illustrated in FIGS. 8A and 8B.

In the present example, the ratio (image coverage, coverage ratio) of the number of printed pixels to the total number of pixels in the pattern is set to 0.136 in the region A, and to 0.124 in the region B. This means that the average inter-dot distance is larger in the region A than in the region B. The image coverage of each region is set such that the visual density is approximately equal between the region A and the region B in the different toner non-mixing state in the image forming apparatus 100 of the present example. This setting is employed such that the criteria of determination by visual observation is clear in the determination flow that will be described later. To be noted, the image coverage is not limited to that described above as long as mixing of different kinds of toner can be determined. In addition, the image coverages of the region A and the region B are based on the latent image settings described above, and can change also in accordance with latent image settings of the image forming apparatus to be used, the laser characteristics of the scanner unit, and the like.

In the present example, the determination pattern TP in which the region A and the region B are adjacent to each other as illustrated in FIG. 7 is used. As a result of this, a state in which there is a density difference between the regions A and B can be easily visually recognized. In addition, visual recognition of the density difference can be facilitated by using the determination pattern TP in which one region (region A herein) is sandwiched by the other region (region B herein) as illustrated in FIG. 7. To be noted, the determination pattern TP in which one of the regions A and B is sandwiched by the other of the regions A and B may be in a form in which the entire periphery of the one of the regions A and B is surrounded by the other of the regions A and B.

In the present example, a pattern in which the region A having a width of 3 mm in a sub-scanning direction D2 is interposed between two regions B, each having a width of 9 mm in the sub-scanning direction D2, is employed. In addition, the regions A and B are each printed to have a width of 50 mm in a main scanning direction D1. The determination pattern TP having a rectangular shape is printed at the center portion of the recording material P (center portion of a region where the process unit 9 can form an image) in the main scanning direction D1. This is because the stability of the determination can be improved by forming the determination pattern TP at the center portion in the main scanning direction D1 that is not likely to be affected by various causes of variations.

Modification Examples of Determination Pattern

Figure 9:
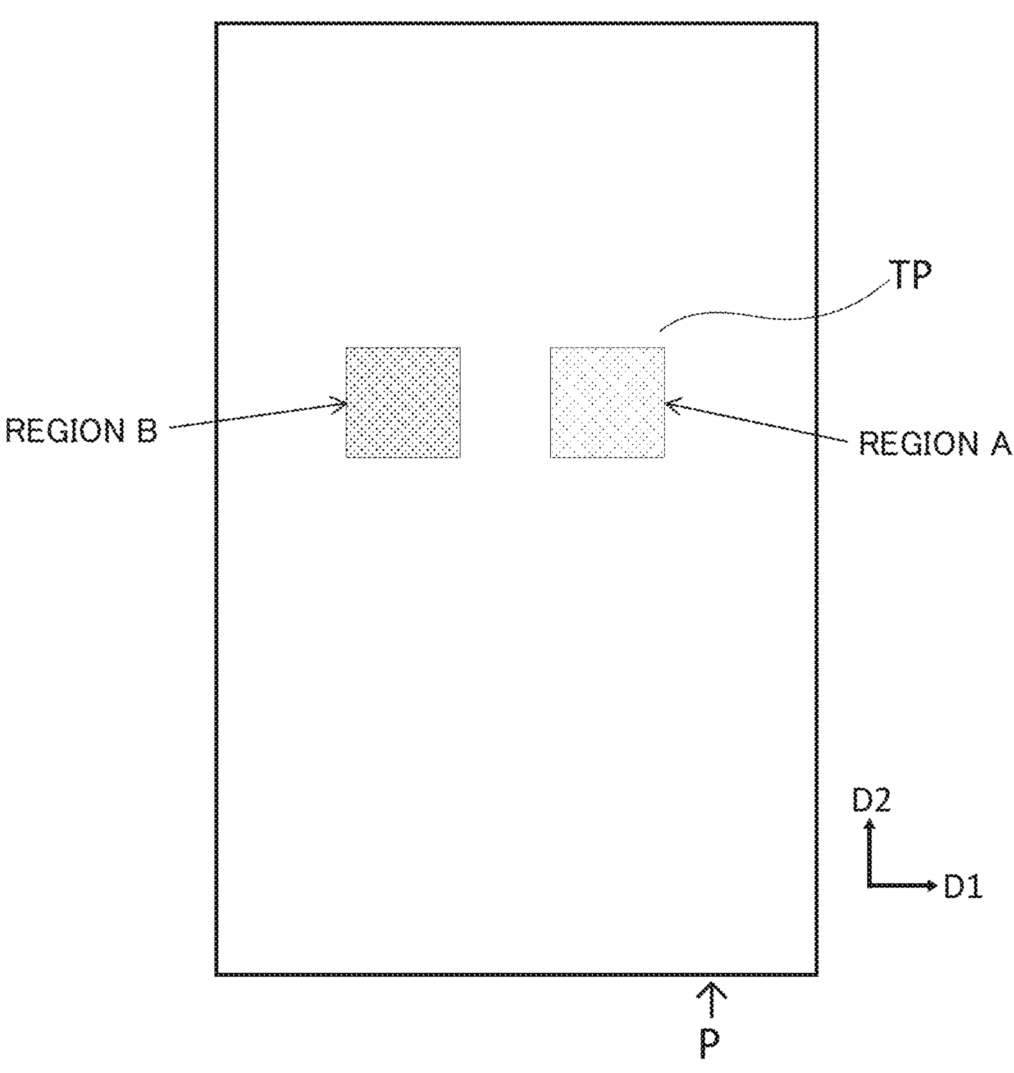
FIG. 9 illustrates a modification example of the determination pattern according to Example 1.

To be noted, although a pattern in which the regions A and B are adjacent to each other and one is sandwiched by the other is employed from the viewpoint of visual recognizability in the present example, the configuration is not limited to this as long as determination can be made on the basis of density difference. For example, the region A and the region B that are not adjacent to each other as in FIG. 9 may be compared. In addition, the region A may be printed on a first sheet of the recording material P, the region B may be printed on a second sheet of the recording material P, and the density on the first sheet and the density on the second sheet may be compared. In addition, a reference sample serving as a standard density for determination may be prepared, a determination pattern including only the region B may be printed on the recording material P, and the determination pattern may be compared with the reference sample.

In addition, although an example in which the regions A and B are each constituted by one kind of dots has been described in the present example, one or both of the regions A and B may be constituted by a plurality of kinds of dots having different dot sizes. For example, the region A may be constituted by dots each side of which has a length of 1 or 2 pixels, and the region B may be constituted by dots each side of which has a length of 3 or 4 pixels. In addition, the shape of the dot is not limited to the square shape illustrated in FIG. 8, and may be a different shape. The case described above may be employed as long as the average dot size of the region A is larger than the average dot size of the region B.

In addition, in the present example, an image coverage PA of the region A is set to be equal to or higher than an image coverage PB of the region B. In other words, the ratio of pixels where dots are formed to all the pixels of the region A (first region) is equal to or higher than the ratio of pixels where dots are formed to all the pixels of the region B (second region). In the present example, PA is set to 0.136, and PB is set to 0.124. This is because in the region A, the inter-dot distance between dots is large, thus the reflection component from a region where toner scattering around the dots are not present is large, and the printed halftone image is likely to appear brighter (the density is likely to be recognized as lower). Therefore, to equalize the visual densities of the regions A and B in the different toner non-mixing state, it is preferable that the image coverage PA of the region A is set to a value equal to or slightly higher than the image coverage PB of the region B (PA≥PB). To be noted, the magnitude relationship between PA and PB can change in accordance with the latent image settings, the effective pixel number, and the like, and is therefore not limited to this.

In addition, although a determination pattern TP in which the region A having a larger average dot size is sandwiched by the region B having a smaller average dot size is used in the present example, a determination pattern in which this relationship is reversed may be used.

Determination Flow

Figure 10:
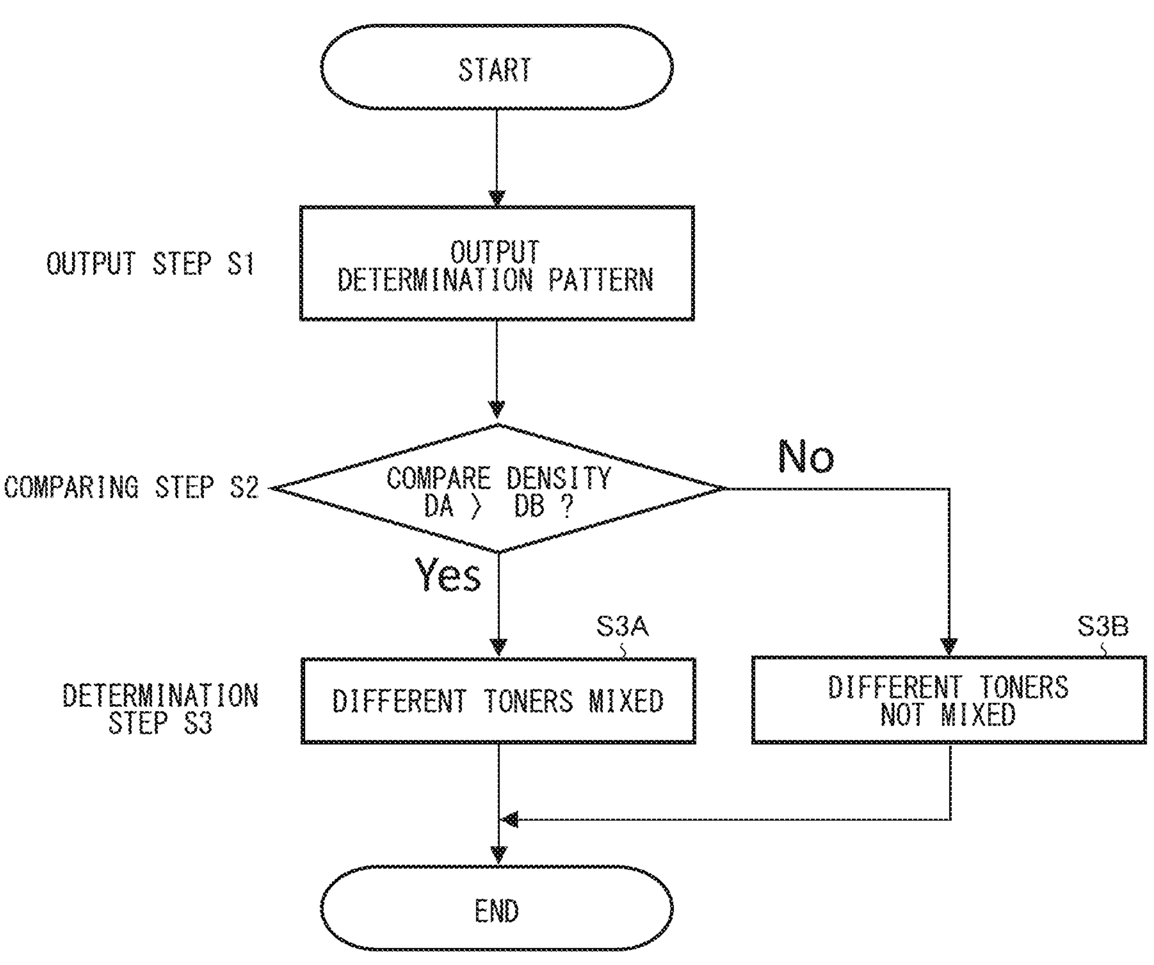
FIG. 10 is a flowchart of a determination method according to Example 1.

The determination flow of the present example will be described with reference to FIG. 10. Description will be given assuming that the present determination flow is executed by a service worker. To be noted, the person that executes the present determination flow is not limited to a service worker, and the user may execute the determination flow.

First, as an output step (S1), the service worker prints the determination patter TP. In the present example, the information of the determination pattern TP is stored in a storage device (ROM 93) in the image forming apparatus 100. In the case where execution of a determination mode is instructed, the controller 90 of the image forming apparatus 100 executes an image forming operation on the basis of the information of the determination pattern TP read out from the ROM 93, and prints the determination pattern TP on the recording material P. The determination mode may be executed by, for example, displaying an operation screen on a computer screen connected to the image forming apparatus 100 and clicking an execution button on the screen. In addition, the determination mode may be executed by operating a button of the operation portion 300 of the image forming apparatus 100.

Next, as a comparing step (S2), the density DA of the region A and the density DB of the region B in the determination pattern TP output on the recording material P are visually compared. That is, in the comparing step, the density of the first region and the density of the second region in the pattern image output on the recording material P are compared. Here, although Copy Kid paper (manufactured by UPM, A4 size, grammage: 70 g/m2) was used as the recording material in the comparing step of the present example, the configuration is not limited to this. In addition, in the present example, the density comparison of the determination pattern TP was performed in a state in which the line of sight of the service worker serving as an observer was orthogonal to the surface of the recording material and the distance between the eyes of the service worker and the determination pattern TP on the recording material was about 30 cm. To be noted, this angle and this distance are merely an example of an expected observation conditions, and the conditions are not limited to these. In addition, it is preferable that the comparing step is executed in an environment of an illuminance of 500 lux or more, and the comparing step was executed at about 800 lux in the present example. Actually, the determination in the determination step in the present example can be performed if the illuminance is 30 lux or more.

Next, as a determination step (S3), it is determined that different kinds of toner are mixed within the developing container 8 (S3A) in the case where the comparison result by visual observation is DA>DB (density of the region A is higher), and it is determined that different kinds of toner are not mixed (S3B) in other cases. That is, in the determination step, it is determined that a plurality of kinds of toner are mixed within the toner storage portion in the case where the density of the first region is higher than the density of the second region in the comparing step. Particularly, in the present example, it is determined that a plurality of kinds of toner are mixed within the toner storage portion in the case where the visual density of the halftone image of the first region is higher than the visual density of the halftone image of the second region.

Figure 11:
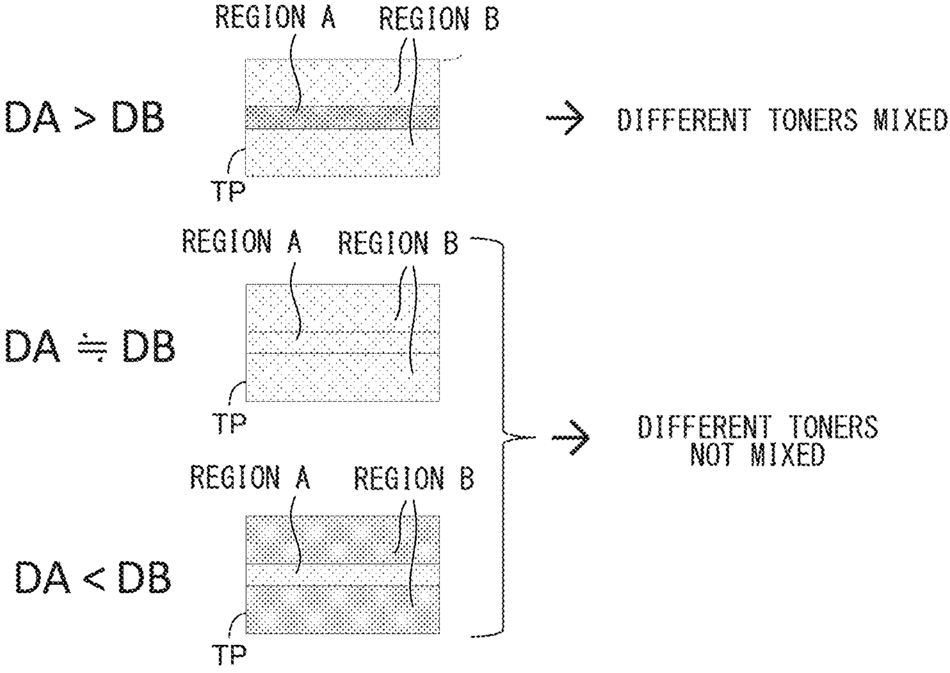
FIG. 11 illustrates an example of a state and determination result of the determination pattern according to Example 1.

FIG. 11 illustrates an example of a density relationship and determination result of the determination pattern. As described above, in the present example, the determination pattern TP in which the region A is disposed at the center and the region A is sandwiched by the region B from both sides is used. The upper part of FIG. 11 illustrates a case where the density DA of the region A is higher than the density DB of the region B, and in this case, it is determined in the determination step S3 that different kinds of toner are mixed within the developing container 8 (S3A). The middle portion of FIG. 11 illustrates a case where the densities DA and DB of the regions A and B are approximately equal, the lower portion illustrates a case where the density DA of the region A is lower than the density DB of the region B, and in these cases, it is determined in the determination step S3 that different kinds of toner are not mixed within the developing container 8 (S3B). The comparison of density is not limited to be performed by visual observation, and may be performed by density measurement by a density meter. In consideration of the workload and the like, determination by visual observation by which the service worker and the user can easily make the determination is preferable. In other words, in the present example, in the determination step, it is determined that a plurality of kinds of toner are mixed within the toner storage portion in the case where it can be visually recognized that the density of the first region is higher than the density of the second region.

As a response to the determination, the following can be performed. In the case where it has been determined that different kinds of toner are mixed, it can be estimated that the cause of the image defect is the mixing of different kinds of toner, and therefore, for example, the developing container 8 is replaced. In the case where it is difficult to replace just the developing container 8, the process unit 9 may be replaced. Toner replenishment may be performed to change the ratio of different kinds of toner mixedly present in the developing container 8 to recover from the image defect. For example, first toner described below is toner that has been used previously, and the second toner is toner different from the first toner, the developing container 8 may be replenished with the first toner to reduce the ratio of the second toner.

In addition, in the case where it has been determined that different kinds of toner are not mixed, it is estimated that the cause of the image defect is not the mixing of different kinds of toner, and therefore search for a different cause is continued. For example, in the case where the cause of the image defect is a damage to a member, such as a case where the photosensitive drum 1 is damaged for some reason, the photosensitive drum 1 is replaced. In addition, in the case where the photosensitive drum 1 cannot be individually replaced, the process unit 9 may be replaced.

Toner

To describe a reason why whether or not different kinds of toner are mixed within the developing container 8 can be determined by the determination flow described above, an example of two kinds of toner will be described below. The two kinds of toner described below are merely an example, and a similar phenomenon can occur in the case where a plurality of kinds of toner having different charging performance are mixed within the developing container 8.

The first toner is polymerized toner that is non-magnetic one-component toner whose normal polarity is a negative polarity. The average particle diameter of the first toner is 7 μm. A known method such as a kneading grinding method or a wet manufacturing method can be used as the manufacturing method for the toner particles. The wet manufacturing method is preferable from the viewpoint of uniformization of the particle diameter and the shape controllability. Further, as the wet manufacturing method, a suspension polymerization method, a dissolution suspension method, an emulsion polymerization aggregation method, an emulsion aggregation method, or the like can be used. The suspension polymerization method is employed for the first toner. The core particles of the first toner are formed from binder resin containing styrene-acrylic resin as a main component and have a surface layer containing an organic silicon polymer, and the organic silicon polymer has a structure expressed by the following formula (A).

$$R\text{—}SiO_{3/2} \qquad (A)$$

(where R represents a hydrocarbon group having 1 or more and 6 or less carbon atoms.)

Since the surface layer of the first toner has a negative charging polarity, deterioration of the charging performance caused by long-term use can be suppressed as compared with toner not having the surface layer. In addition, it is preferable that the surface layer containing the organic silicon polymer and the toner core particle are in contact with each other without any gap therebetween. As a result of this, bleeding caused by a resin component on the inner side of the surface layer of the toner particle, a releasing agent, and the like can be suppressed, and toner having excellent storage stability, environmental stability, and development durability can be obtained. In addition, an external additive may be added to secure fluidity of the toner particles and improve the chargeability of the toner particles.

Similarly to the first toner, the second toner is polymerized toner that is non-magnetic one-component toner whose normal polarity is a negative polarity. The average particle diameter of the second toner is 7 μm. Inorganic particle externally-added toner in which inorganic silicon is externally added to mother particles to secure fluidity and improve chargeability is used. The emulsion polymerization aggregation method is employed for the second toner. The core particles of the second toner are formed from binder resin containing styrene-acrylic resin as a main component and do not have a surface layer containing an organic silicon polymer.

Although toner having a surface layer containing organic silicon polymer has been described as an example of the first toner and toner not having a surface layer containing organic silicon polymer has been described as an example of the second toner herein, any toner can be used as long as the first toner has higher charging performance than the second toner. The first toner does not necessarily contain organic silicon polymer, and may have a core-shell structure in which core particles are covered by a surface layer of a different material. According to the determination flow of the present example, whether or not a plurality of kinds of toner containing the first toner and the second toner having lower charging performance than the first toner are mixed within the developing container 8 can be determined regardless of the specific configuration of the toner.

The “charging performance” mentioned herein indicates chargeability of the toner particles, and for example, a q/d value (charge amount/toner particle diameter) is used as the index thereof. The charging performance of toner can be defined by a peak of the q/d value measured in a state in which a plurality of kinds of toner are not mixed.

A specific example of the measurement method for the charging performance of the toner is as follows. Toner on the developing roller 4 is collected after performing an image forming operation of outputting a plain (solid white) image by using the image forming apparatus 100 and the process unit 9 of the present example. The toner collecting position on the developing roller 4 is set to a position downstream of the contact position with the developing blade 6 and upstream of the developing portion in the rotational direction of the developing roller 4. The charge amount (q/d value) of the collected toner was measured by using E-SpartAnalyzer manufactured by HOSOKAWA MICRON CORPORATION, and a distribution of FIG. 12A was obtained.

Figure 12A:
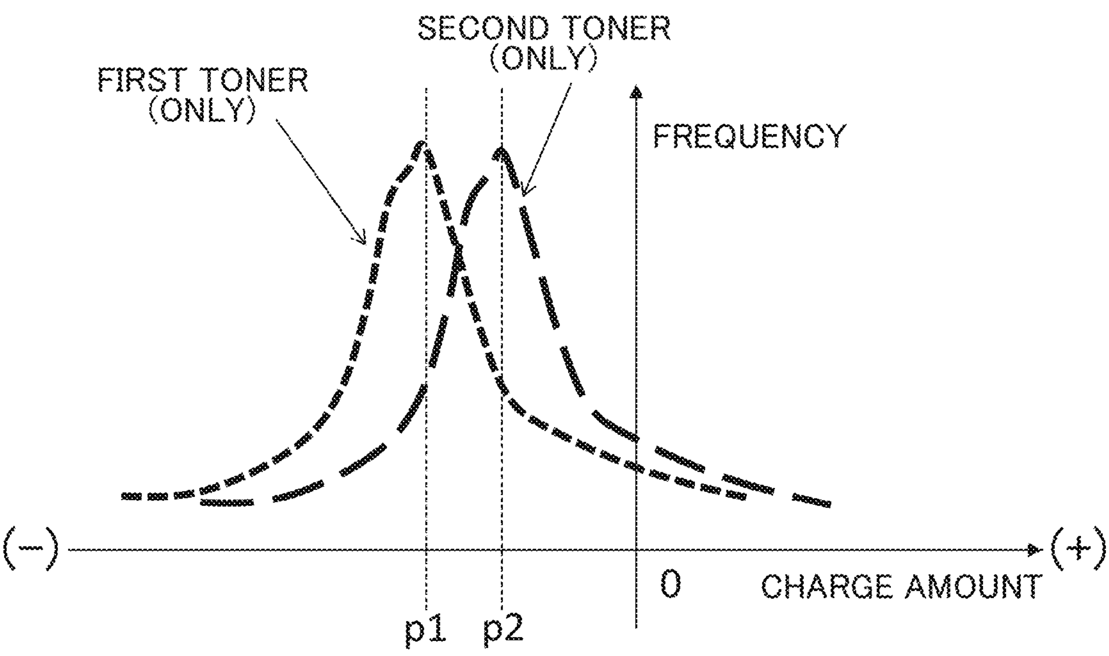
FIG. 12A is a conceptual diagram illustrating a toner charge distribution in a case where different kinds of toner are mixed.

In FIG. 12A, the distribution of the q/d value obtained in a state in which only the first toner is stored in the developing container 8 and the distribution of the q/d value obtained in a state in which only the second toner is stored in the developing container 8 are plotted in the same graph. It can be said that the first toner has a higher charging performance than the second toner in the case where a peak p1 of the q/d value of the first toner has a larger absolute value than a peak p2 of the q/d value of the second toner as illustrated in FIG. 12A.

As a method to make the charging performance of the first toner higher than that of the second toner, for example, there is a method of increasing the amount of the external additive having a function of increasing the charging performance in addition to a method of forming the surface layer of the first toner from organic silicon polymer. In addition, the charging performance may be increased by increasing the amount of a charge control agent dispersed in the binder resin of the first toner. In addition, as a material for forming the surface of the first toner, a material positioned on the normal polarity side of the toner (negative polarity side in the present example) in the triboelectric series with respect to the material constituting the surface of the second toner may be selected. In addition, the charging performance of the first toner is higher than that of the second toner also in the case where the amount of an external additive that lowers the charging performance of the second toner (to adjust performance other than the charging performance) is increased or the case where the core particles of the second toner are formed from a less chargeable material.

Further, as in a modification example that will be described later, there is a possibility that a similar phenomenon is caused by difference in the charging performance even in the case of toners formed by the same manufacturing method, such as a case where brand-new toner just supplied to the developing container 8 and old toner repetitively used for image formation are mixed. That is, in the present example, the plurality of kinds of toner are not limited to kinds of toner distinguished by the material of the toner particles, layer structure of the toner particles, kinds and amount of external additives, and the like, and may be kinds distinguished by change in the nature (particularly the charging performance) of toner that has happened after production.

Image Defect Caused by Mixing of Different Kinds of Toner and Determination Pattern The relationship between the determination pattern and the image defect that occurs in the case where the first toner and the second toner are mixed within the developing container will be described.

The first toner has a surface layer containing organic silicon polymer having the structure expressed by the formula (A), and since the surface layer itself is likely to be charged to the negative polarity and is bonded to the core particles, the charging performance thereof is good and the stability thereof is excellent. In contrast, the second toner does not have the surface layer containing organic silicon polymer, and is therefore inferior to the first toner in terms of the charging performance.

FIG. 12A is a conceptual diagram illustrating the distribution of charge amount (q/d value) of toner particles borne on the developing roller 4 in the case where just the first toner or just the second toner is present in the developing container 8. In either of the case where just the first toner is present in the developing container 8 and the case where just the second toner is present in the developing container 8, there is only one peak (p1 or p2) in the distribution of the charge amount.

Figure 12B:
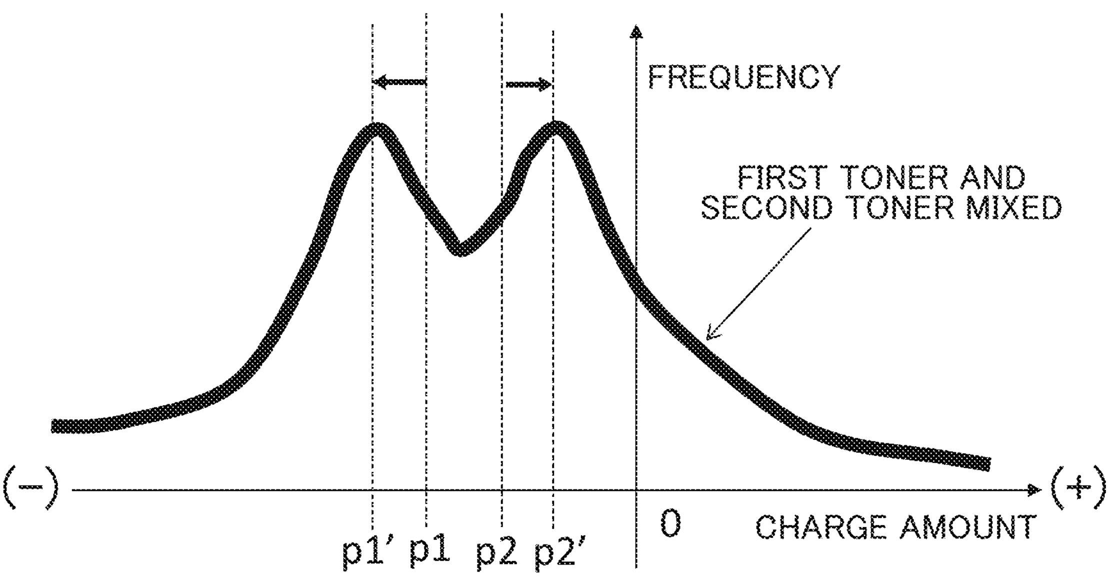
FIG. 12B is a conceptual diagram illustrating a toner charge distribution in a case where different kinds of toner are not mixed.

FIG. 12B is a conceptual diagram illustrating the distribution of charge amount (q/d value) of toner particles borne on the developing roller 4 in the case where the first toner and the second toner are mixed within the developing container 8. In the case where the first toner and the second toner are mixed within the developing container 8, charges are transferred by friction between different kinds of toner, thus the amount of negative charges of the first toner increases, and the charge amount of the second toner decreases. As a result of this, the toner particles borne on the developing roller 4 are polarized into a group with a larger charge amount and a group with a smaller charge amount, and as illustrated in FIG. 12B, two peaks p1' and p2' can appear in the distribution of the charge amount of the toner particles.

The peak p1' of the group with a larger charge amount is mainly derived from the first toner, but as a result of the transfer of charges between the first toner and the second toner, the peak p1' is shifted to the high-charge side from the peak p1 (FIG. 12A) of the case where just the first toner is present. The peak p2' of the group with a smaller charge amount is mainly derived from the second toner, but as a result of the transfer of charges between the first toner and the second toner, the peak p2' is shifted to the low-charge side from the peak p2 (FIG. 12A) of the case where just the second toner is present. To be noted, in the case where a plurality of kinds of toner having different charging performance are mixed, an image defect described below can occur even in the case where the two peaks p1' and p2' as clear as in FIG. 12B do not appear.

The second toner whose charge amount has decreased can be transferred as a fogging toner onto the non-exposed region on the photosensitive drum 1 during development, and can be further transferred from the photosensitive drum 1 onto the recording material P. As a result of this, an image defect (fog image) in which a thin layer of toner attaches to a region where an image is not supposed to be formed on the recording material P can occur.

In addition, in a cleanerless configuration as in the present example, there is a possibility that this fogging toner contaminates the charging roller 2 to cause deterioration of the charging performance and lower the dark potential VD, which can cause the fog image to be more prominent.

Next, the relationship between the mixing of different kinds of toner and the determination pattern will be described. In the region A of the determination pattern TP, the dot size is large, and toner in the surface region of the developing roller 4 corresponding to each dot is approximately completely developed on the photosensitive drum 1. Therefore, in the region A, the amount of toner to be developed is less likely to be different between the different toner mixing state and the different toner non-mixing state, and thus the density of the halftone is less likely to be affected by the mixing of different kinds of toner.

In contrast, in the region B of the determination pattern TP, the dot size is small, and only toner in part of the surface region of the developing roller 4 corresponding to each dot is transferred onto the photosensitive drum 1. Therefore, if the charge amount distribution of the toner is polarized as illustrated in FIG. 2B in the different toner mixing state, the first toner that is more negatively charged is selectively transferred onto the photosensitive drum 1 first, and part of the second toner having a small charge amount remains on the developing roller 4. As a result of this, the total amount of toner transferred onto the photosensitive drum 1 is reduced in the different toner mixing state than in the different toner non-mixing state even if the surface potential (latent image potential) of the photosensitive drum 1 lowered by the exposure is the same, and thus the density of the halftone in the region B is lowered. As a result of this, the density of the region B is relatively lower than in the region A in the different toner mixing state.

As described above, by using the determination pattern TP including a plurality of halftone regions of different dot sizes, the change in the charging state of the toner caused by the mixing of different kinds of toner in the developing container 8 can be visualized as the density of the halftone. As a result of this, in the case where an image defect has occurred, whether or not the image defect has been caused by the mixing of different kinds of toner can be determined.

Dot Sizes of Regions A and B

To visualize the mixing of different kinds of toner as the density difference of the halftone as described above, it is preferable that the dot sizes of the regions A and B are each set in an appropriate range. As will be described below, in the present example, the halftone image of the region A (first region) is constituted by dots each having a size of 3×3 pixels or more, and the halftone image of the region B (second region) is constituted by dots each having a size of 2×2 pixels or less.

First, if the dot size of the region B is large, the potential (latent image potential) of the surface region of the photosensitive drum 1 corresponding to the dots is lowered to the light potential VL, and the difference from the region A is less likely to be exhibited. Therefore, the dot size may be set such that the latent image potential of the surface region of the photosensitive drum 1 corresponding to the dots is a value between the developing voltage and the light potential VL.

Specifically, in the image forming apparatus 100 of the present example, the latent image potential of the region exposed for one pixel or two continuous pixels is a value between the developing voltage and the light potential VL, and the latent image potential of a region exposed for three or more continuous pixels is lowered to the light potential VL. Therefore, it is preferable to set the dot size of the region B in a range of 1×1 pixel to 2×2 pixels. To be noted, in the range described above, 1×2 pixels, 2×1 pixels, and 2×2 pixels with one missing pixel are included.

In the case where the ratio of the dots of 1×1 pixel is set to be higher in the region B, the density change of the halftone in the different toner mixing state is more likely to be exhibited, and thus the determination of the mixing of different kinds of toner becomes easier. However, in an image forming apparatus of a higher resolution than the present example, an appropriate latent image potential becomes more difficult to form because the size of each pixel is smaller. That is, in the case of a dot of 1×1 pixel, there is a case where the latent image potential is not sufficiently lowered by exposure, thus the halftone image is not developed and the sheet becomes blank regardless of the presence or absence of the different kinds of toner, and the mixing of different kinds of toner cannot be determined. Therefore, in the case of using an image forming apparatus of a higher resolution than the present example, the dot size of the region B is preferably set to a pixel number that achieves an appropriate latent image potential.

In contrast, in the region A, dots of a stable density can be formed by lowering the potential (latent image potential) of the surface region of the photosensitive drum 1 corresponding to the dots to the light potential VL. As described above, the latent image potential is lowered to the light potential VL when three or more pixels are continuously exposed in the image forming apparatus 100 of the present example. Therefore, it is preferable that dots of 3×3 pixels or more are formed in the region A.

To be noted, if the dots are excessively increased in size, the distance between dots is also increased to maintain the density relationship with the region B, and therefore the dot structure visually stands out and it becomes difficult to determine the density. In the present example, the dot structure visually stood out in the case where the dot size was set to 5×5 pixels or more in the present example. Therefore, the dot size of the region A is preferably set to 4×4 pixels or less. To address such a visual problem, small dots may be arranged between large dots to make the gaps less noticeable while increasing the average dot size. To be noted, the range from 3×3 pixels to 4×4 pixels include dots in which an arbitrary pixel or pixels are removed from the 12 pixels in the outer peripheral portion of 4×4 pixels.

Although the image forming apparatus 100 of a resolution of 400 dpi is used in the present example, the dot sizes of the regions A and B may be changed in accordance with the resolution of the image forming apparatus. For example, the upper limit (4×4 pixels) of the dot size in the region A described above is determined on the basis of visual roughness of dots printed on the recording material P. The 4×4 pixels in 400 dpi correspond to about 0.01×0.01 $inch^2$ (0.254×0.254 $mm^2$). Therefore, for example, in the case of using the image forming apparatus 100 of a resolution of 600 dpi, the dot size of the region A may be set to equal to or less than 6×6 pixels corresponding to about 0.01×0.01 $inch^2$ (0.254×0.254 $mm^2$). In contrast, although the lower limit and upper limit of the dot size in the region B and the lower limit of the dot size in the region A are mainly determined on the basis of the relationship with the latent image potential, these may be also changed in accordance with the resolution of the image forming apparatus. For example, the dot size of the region B may be set to a size corresponding to 1×1 pixel or more and 2×2 pixels or less (area equal to or larger than 63.5×63.5 $\mu m^2$ and equal to or smaller than 127×127 $\mu m^2$) in 400 dpi.

Modification Example

To be noted, although a case where a plurality of kinds of toner formed by different manufacturing methods are mixed have been described as an example, for example, a similar thing can occur also in the case where new toner is additionally supplied for replenishment. In the case where there is a large difference in the charging performance of the toner between before and after the replenishment, an image defect (fog image) similar to the above-described state in which the first toner and the second toner are mixed can occur even though the added toner is originally the same toner. Such a case can be also referred to as a state in which a plurality of kinds of toner are mixed. According to the determination method of the present example, whether or not an image defect has been caused by mixing of new toner and old toner which has deteriorated can be determined.

In addition, although the information of the determination pattern TP is stored in a storage device in the image forming apparatus 100 in the present example, the information of the determination pattern TP does not have to be stored in the image forming apparatus 100. For example, an image file of the determination pattern TP may be transmitted to be printed from an external device such as a personal computer connected to the image forming apparatus 100. In addition, in the case where a dedicated determination mode is not set, the determination pattern TP may be manually printed by transmitting an image file of the determination pattern TP to the image forming apparatus 100 similarly to the case of normal printing.

In addition, although the determination is performed by comparing the densities of the regions A and B in the present example, the comparison is not limited to between two regions. For example, a region C serving as a third region of a dot size between the regions A and B may be provided, and the density comparison may be additionally performed between the regions A and C or between the regions B and C.

In addition, although a case where the service worker compares the density of halftone of the regions A and B by visual observation in the comparing step (S3) has been described in the present example, the following may be performed to improve the determination precision. As illustrated in FIG. 11, a determination chart including standard images (sample images, reference images) of three density levels in which the magnitude relationship between the densities DA and DB of the halftone of the regions A and B are different is prepared in advance, and the service worker performs the comparison to determine which level of the standard images is the closest to the determination pattern TP that has been actually output.

To be noted, the density difference between the regions A and B obtained by actually measuring the determination pattern TP of the present example by using a density meter (for example, spectral density meter 500 series manufactured by X-rite, model number: 504) and visual recognizability of the density difference as viewed from eyes were compared. In this case, the density difference was hardly visually recognizable when the density difference was smaller than 0.01 in the case of DA>DB. Therefore, in the present example, it is determined that different kinds of toner are mixed within the case where the halftone of the region A is denser than the halftone of the region B and the density difference thereof is larger than 0.01.

As described above, the comparison of density in the determination method of the present example is not limited to visual observation, and may be performed by comparison with a standard image of a determination chart prepared in advance, or by density measurement by a density meter. That is, it may be determined that a plurality of kinds of toner are mixed within the toner storage portion in the case where the density of the first region is higher than the density of the second region in the comparing step and the difference between the density of the first region and the density of the second region satisfies a predetermined condition, in addition to the case where the density difference between the first region and the second region can be visually recognized.

In the case of using the determination chart, the predetermined condition is, for example, that there is at least one-level difference in density level between the standard image closest to the first region in density and the standard image closest to the second region in density among the plurality of standard images in the determination chart. In the case of using a density meter, the predetermined condition is, for example, that the difference in the measured value of density between the first region and the second region obtained by the above-described density meter (spectral density meter 500 series, model number: 504) manufactured by X-rite is 0.01 or more.

Example 2

Next, Example 2 will be described. Example 2 has a configuration in which the determination pattern is changed from Example 1. In the description below, it is assumed that elements denoted by the same reference signs as in Example 1 basically have the same configurations and functions as those described in Example 1 unless otherwise described, and parts different from Example 1 will be mainly described. In the present example, the fact that there is a case where whether or not different kinds of toner are mixed cannot be determined with the determination pattern of Example 1 will be described, and a determination method with which mixing of different kinds of toner can be correctly determined even in this case will be described.

Determination Pattern

Figure 13:
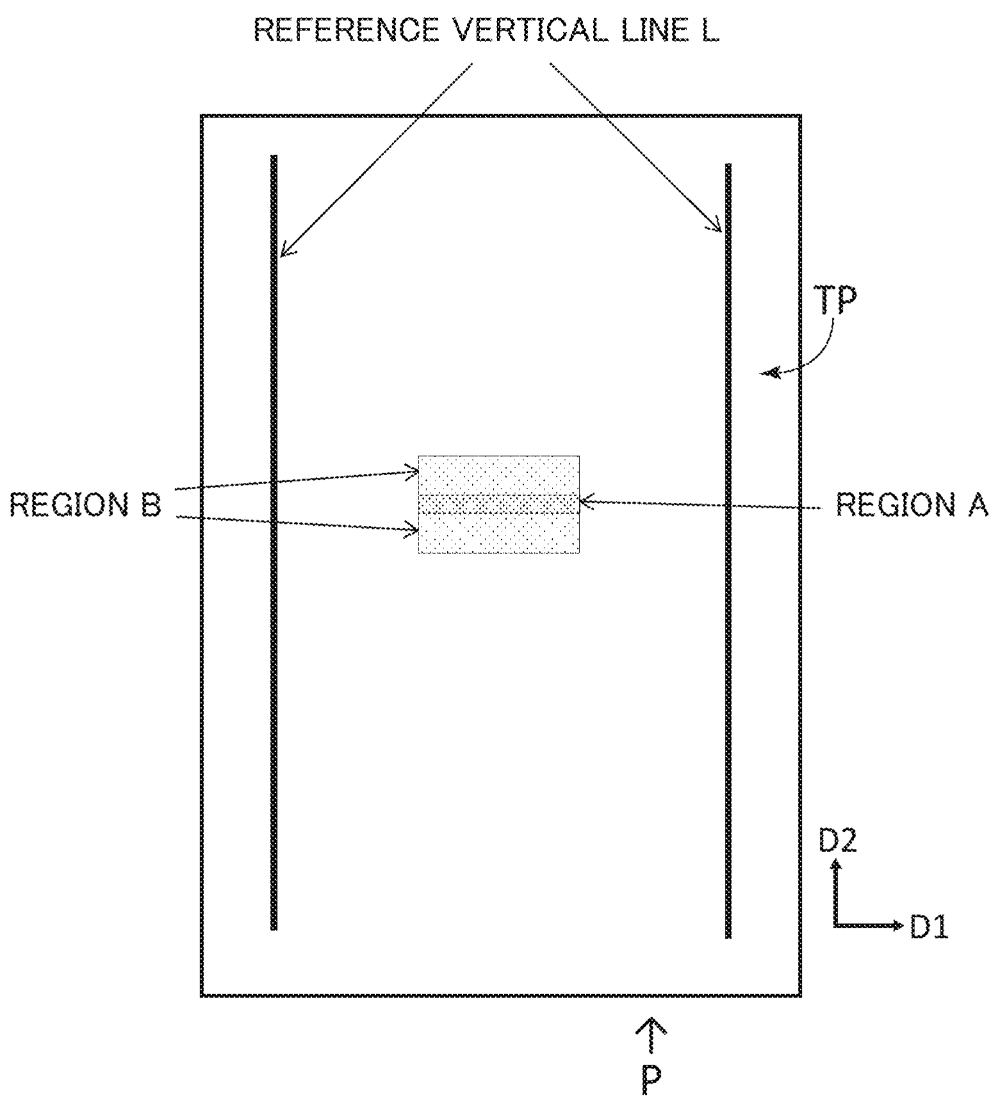
FIG. 13 illustrates a determination pattern according to Example 2.

The determination pattern TP of the present example will be described with reference to FIG. 13. The determination pattern TP of the present example has a configuration in which two reference vertical lines L are added on the outside of the pattern of the first example. The two reference vertical lines L are an example of boundary lines indicating the boundary of a predetermined region in the main scanning direction of the image formation.

In the present example, the determination pattern TP in which the reference vertical lines L are added to positions in a distance of 60 mm from respective outer sides of the determination pattern TP (FIG. 7) of Example 1 in the main scanning direction D1 is used. By using this determination pattern TP, the state of the toner can be determined in accordance with a determination criterion different from Example 1.

Determination Flow

Figure 14:
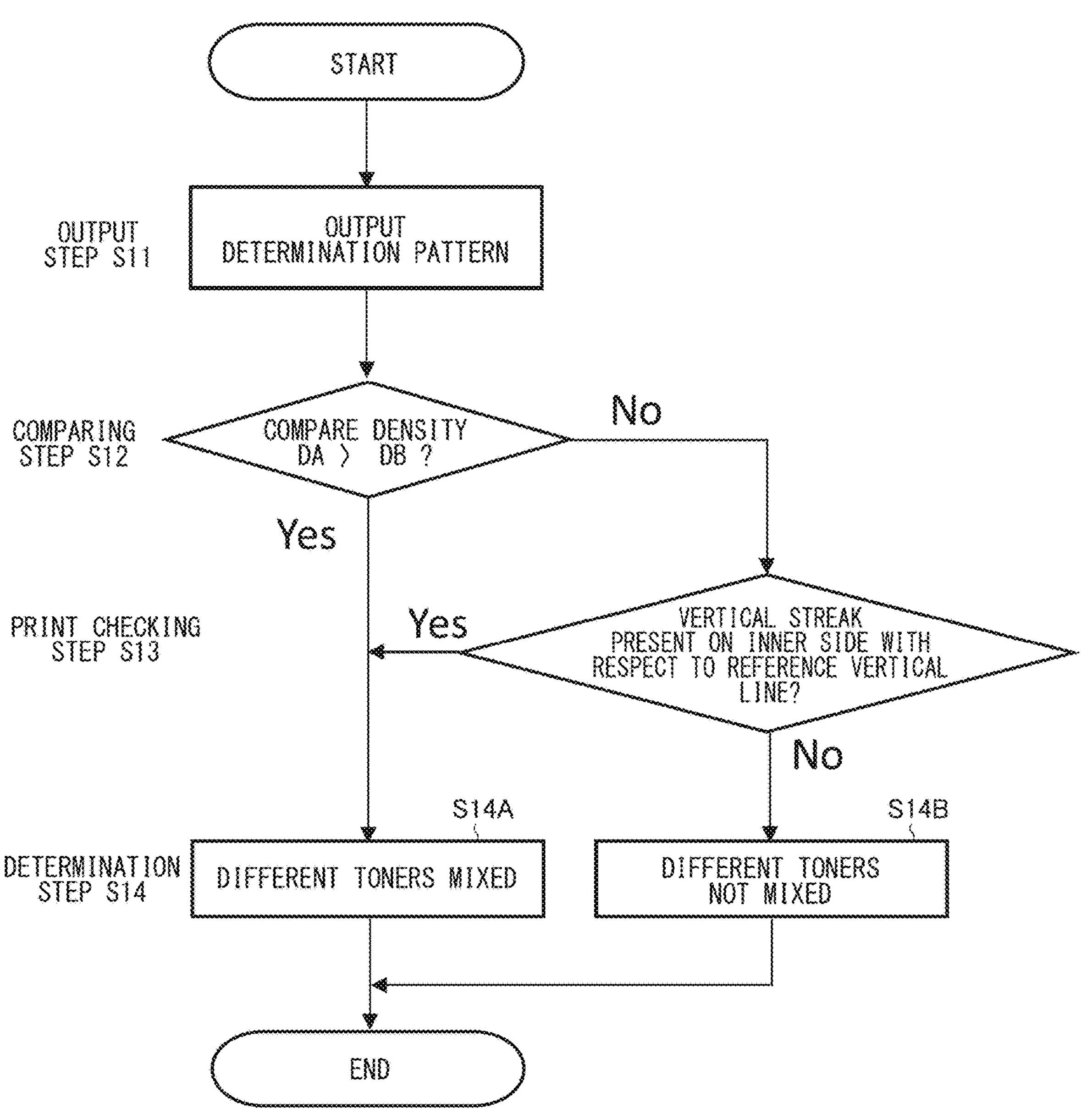
FIG. 14 illustrates a flowchart of a determination method according to Example 2.

The determination flow of the present example will be described with reference to FIG. 14. Similarly to Example 1, description will be given assuming that the present determination flow is executed by a service worker.

First, as an output step (S11), the service worker prints the determination patter TP on the recording material P. Next, as a comparing step (S12), the density DA of the region A and the density DB of the region B in the determination pattern TP output on the recording material P are compared by visual observation. In the case where the result of comparison by visual observation is DA>DB (density of the region A is higher), the process proceeds to a determination step (S14), and it is determined that different kinds of toner are mixed within the developing container 8 (S14A). In contrast, in the case other than DA>DB, the determination is suspended, and the process proceeds to a print checking step (S13).

In the print checking step (S13), whether or not something other than the determination pattern is printed on the inner side with respect to the two reference vertical lines L of the determination pattern TP output on the recording material P is checked. Examples of the something other than the determination pattern in the present example include a vertical line as illustrated in FIG. 15. FIG. 15 illustrates a determination example in the print checking step.

Figure 15A:
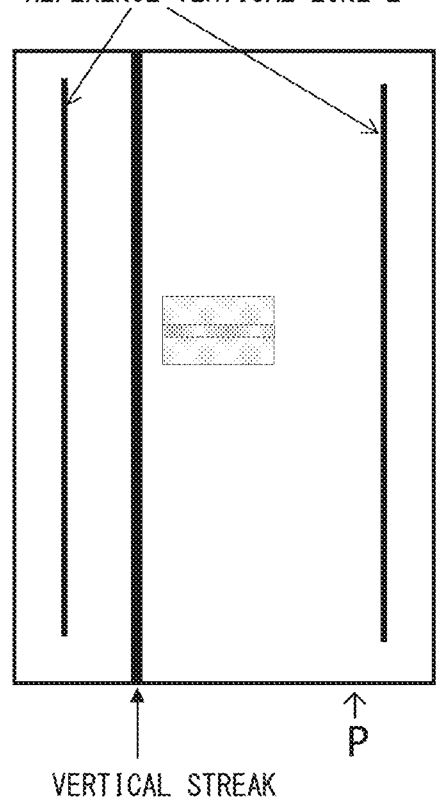
FIGS. 15A and 15B each illustrate an example of an image defect and determination result when the determination pattern according to Example 2 is output.
Figure 15B:
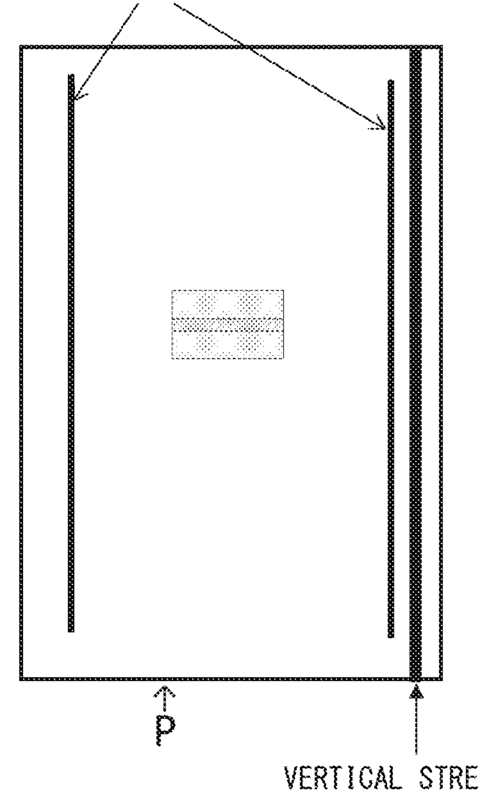

Next, as a determination step (S14), it is determined that different kinds of toner are mixed (S14A) in the case where there is a vertical line on the inner side with respect to the two reference vertical lines L as illustrated in FIG. 15A. That is, in the present example, in the case where it is determined that something other than the pattern image is printed in a predetermined region in the print checking step, it is determined that a plurality of kinds of toner are mixed within the toner storage portion. In the case where the vertical line is on the outer side with respect to the two reference vertical lines as illustrated in FIG. 15B or where there is no vertical line, it is determined that different kinds of toner are not mixed (S14B). In addition, in the present example, it is determined that different kinds of toner are mixed (S14A) in the case where there is a vertical line on both the inner side and the outer side with respect to the two reference vertical lines L. The response after the determination is the same as in Example 1.

Although description has been given above with reference to the flowchart, a table that can be referred to for a determination result corresponding to a combination of results of the density comparing step and the print checking step as in Table 1 may be prepared in advance, and the determination may be made by referring to the table to see which case the printed determination pattern TP corresponds to.

TABLE 1

| CASE | DA > DB? | VERTICAL STREAK ON INNER SIDE? | DETERMINATION RESULT |
|---|---|---|---|
| 1 | Yes | Yes | MIXED |
| 2 | Yes | No | MIXED |
| 3 | No | Yes | MIXED |
| 4 | No | No | NOT MIXED |

Toner

To describe the reason why whether or not different kinds of toner are mixed within the developing container 8 can be determined by using the two reference vertical lines L added in the present example, an example of two kinds of toner will be described below. The two kinds of toner described below are merely an example, and the kinds of toner are not limited to these as long as these toners are different in shape.

The first toner is the same as in Example 1. A third toner is a non-magnetic one-component toner that is negatively chargeable. The core particles of the third are formed from binder resin containing styrene-acrylic resin as a main component, and have an average particle diameter of 10 μm. As a manufacturing method for this toner, a method of mixing the raw material, melting, cooling, and solidifying the raw material, and then subjecting the solidified material to a pulverizing process and surface treatment while adjusting the temperature in a mechanical pulverizer was used. As the third toner, an inorganic particle externally-added toner obtained by externally adding inorganic silicon to mother particles to secure fluidity and improve chargeability is used.

Due to how the pulverized toner is manufactured, the third toner that is a pulverized toner varies more greatly in the particle diameter thereof than the first toner that is a polymerized toner, and the upper limit of the particle diameter distribution is more likely to be large than the difference in the average particle diameter. Further, whereas the average circularity of the first toner is about 0.99, the average circularity of the third toner of the present example is about 0.92, and the third toner includes particles that are large and uneven in shape. To be noted, there is a case where difference in circularity occurs due to difference in the manufacturing method or the like even between polymerized toners or between pulverized toners, and toner of low circularity is likely to be fused to the developing blade 6 as will be described later.

The average circularity in the present example is used as a simple quantitative expression of the shape of particles, and was calculated by the following method. First, the particle shape of the toner particles was measured by using a flow-type particle image analysis apparatus FPIA-2100 manufactured by TOA MEDICAL ELECTRONICS CO., LTD., and the circularity was obtained by the following formula (1).

$$Ci = Pi/Qi \tag{1}$$

In the formula (1), Ci represents the circularity of the i-th toner particle, Pi represents a peripheral length of a circle having the same area as a projection image of the i-th toner particle, and Qi represents a peripheral length of the projection image of the i-th toner particle.

Further, as expressed by the following formula (2), a value (C-bar) obtained by dividing the sum of the circularity of all the particles that are measured by the total number of measured particles (m) is defined as an average circularity.

$$\bar{C} = \sum_{i=1}^{m} \frac{Ci}{m} \tag{2}$$

Image Defect Caused by Mixing of Different Kinds of Toner and Determination Pattern The relationship between the determination pattern and the image defect that occurs in the case where the first toner and the third toner are mixed within the developing container 8 will be described.

First, an image defect caused by the third toner will be described. The third toner has a large particle diameter and an uneven shape due to the manufacturing method thereof. Therefore, there is a case where, when the toner supplied onto the developing roller 4 passes through the portion where the developing roller 4 opposes the developing blade 6, part of the toner is bitten by (strongly pressed against) the developing blade 6 to be fused to the developing blade 6. In this part where the fusion has occurred, the developing blade 6 cannot sufficiently charge the toner on the developing roller 4, and thus a fog image of a vertical black streak can occur as illustrated in FIG. 15.

Particularly, in the cleanerless configuration of the present example, the fogging toner of this vertical black streak can contaminate the charging roller 2, and thus the image defect of the vertical black streak can be more noticeable.

Here, although a vertical black streak that is continuous is illustrated in FIG. 15, an image defect looking like a vertical dot line that is not continuous in the sub-scanning direction D2 can appear at a period corresponding to each rotation of the charging roller 2. In the determination flow described above, this vertical black streak is regarded as a vertical streak for determining whether or not different kinds of toner are mixed, and the determination is made in the print checking step.

Next, the characteristic of occurrence of vertical black streak that occurs in the case where the first toner and the third toner are mixed will be described. Although the toner that is mixed with the third toner is the first toner herein, the configuration is not limited to this as long as the toner is a polymerized toner having uniform particle diameters. The first toner includes a surface layer containing organic silicon polymer, and has a good charging performance and excellent stability as described in Example 1. In contrast, the third toner has an uneven shape due to the manufacturing method thereof, and has a lower charging performance than the second toner of Example 1. In the case where the difference in the charging performance is larger, the first toner is selectively electrostatically used for development and consumed earlier when the toners mixed within the developing container 8 are supplied from the supply roller 5 to the developing roller 4. Then, when the remaining amount of the first toner in the developing container 8 is small, the third toner starts to be supplied onto the developing roller 4 at a high ratio.

As described above, in the case of a toner combination as in the present example, one of the toners selectively coats the developing roller 4 even if different kinds of toner are mixed within the developing container 8. Therefore, the state in which different kinds of toner coexist on the developing roller 4 as illustrated in FIG. 12B is temporary, and there is a case where the mixing of different kinds of toner cannot be determined by using the determination pattern TP of Example 1.

When the third toner starts to be supplied to the developing roller 4, the vertical black streak starts appearing as described above. At this time, the vertical black streak starts appearing within a range of the largest region (image region) in which the developing roller 4 can develop a toner image in the main scanning direction D1. The reason for this is as follows.

Although toner is consumed by development of the toner image in the image region, toner is hardly consumed in a non-image region that is at an end portion and that includes at least a margin portion. Therefore, the toner supplied to the developing roller 4 transitions from the first toner to the third toner in the image region in accordance with the toner consumption, but the first toner remains in the non-image region on the developing roller 4. That is, it can be said that the image defect caused by biting of toner is a phenomenon that is more likely to occur in the image region than in the non-image region and that occurs in the case where toners are mixed.

To be noted, in the non-image region, the vertical black streak is relatively less likely to occur than in the image-region, but it does not mean that the vertical black streak does not occur at all in the non-image region. Therefore, in the determination flow described above, a case where the vertical black streak has occurred both on the inner side and outer side with respect to the two reference vertical lines L is determined as a case where different kinds of toner are mixed. To be noted, the method of determination is not limited to this, and the determination may be made on the basis of ratio of occurrence of the vertical black streak between the inner side and the outer side with respect to the two reference vertical lines L in consideration of the possibility of occurrence of the vertical black streak. In addition, in the case where the vertical black streak has occurred on the outer side with respect to the two reference vertical lines L, it may be determined that different kinds of toner are not mixed, regardless of the presence or absence of the vertical black streak on the inner side with respect to the two reference vertical lines L.

The two reference vertical lines L of the present example are printed slightly on the inner side with respect to the boundary between the non-image region (margin portion) and the image region. In other words, a predetermined region indicated by the boundary line (reference vertical lines L) of the pattern image is a region included in the largest region in which the image forming apparatus can form an image in the main scanning direction. Therefore, whether or not the image defect is caused by mixing of different kinds of toner can be determined on the basis of the presence or absence of the image defect (vertical black streak) on the inner side with respect to the two reference vertical lines L.

In the present example, the positions of the two reference vertical lines L are set slightly on the inner side with respect to the boundary between the non-image region and the image region in consideration of a case where part of the first toner remaining in the non-image region in the developing container 8 flows into the image region. The configuration is not limited to this, and for example, the two reference vertical lines L may be formed at boundary positions between the non-image region and the image region.

Figure 16:
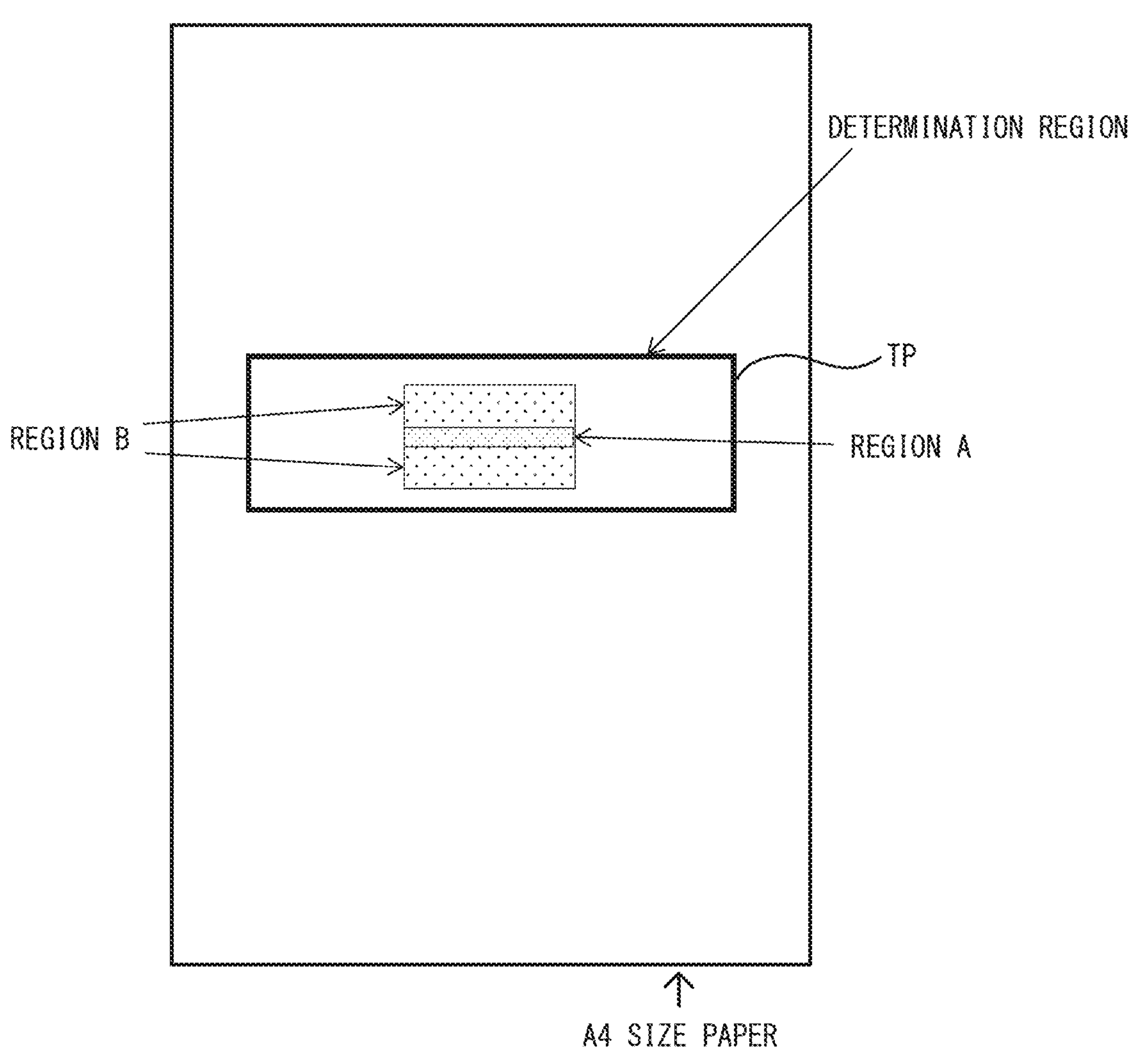
FIG. 16 illustrates a modification example of the determination pattern according to Example 2.

In addition, although the boundary of an occurrence region of an image defect (vertical black streak) is expressed by the two reference vertical lines L in the present example, the configuration is not limited to this. For example, determination may be made by performing the print checking step in a determination region by using a pattern including a determination region surrounded by a quadrangle having two side at the same positions as the two reference vertical lines L as illustrated in FIG. 16. In addition, the two reference vertical lines L are not necessarily needed for determination, and the service worker may perform the print checking step on the inner side with respect to positions serving as a boundary by using a ruler. It is more preferable to print the reference vertical lines L or a substitute thereof in the determination pattern to facilitate the determination step for the service worker.

As described above, according to the present example, mixing of different kinds of toner can be determined more appropriately even in the case where whether or not different kinds of toner are mixed cannot be correctly determined by using the determination pattern of Example 1.

Example 3

Next, Example 3 will be described. Example 3 has a configuration in which the determination flow of Example 2 is changed. In the description below, it is assumed that elements denoted by the same reference signs as in Example 2 basically have the same configurations and functions as those described in Example 2 unless otherwise described, and parts different from Example 2 will be mainly described.

Preliminary Operation

In the present example, to improve the precision of determination using the determination pattern TP, the determination pattern TP is printed on two sheets of the recording material P. In addition, in the present example, a step to execute a preliminary operation is provided between the printing on the first sheet and the printing on the second sheet.

The reason why the preliminary operation is executed in the present example will be described. Since the determination pattern TP of Example 1 is used mainly for determining only the state of the toner in the developing container 8 on the basis of the density difference of the halftone, the determination can be difficult in the case where the surface potential of the photosensitive drum 1 changes due to a secondary factor as described below. For example, since the image forming apparatus 100 of the present example has a cleanerless configuration, part of the fogging toner attached to the non-exposed region on the photosensitive drum 1 attaches to the charging roller 2. In a condition in which a large amount of fogging toner is generated, the amount of toner that attaches to the charging roller 2 also increases, thus the charging performance changes, and the dark potential VD also changes. If the dark potential VD is on the further negative side, the overall density of the halftone becomes lower, and particularly the density of the region B of the determination pattern TP is likely to be lower because the dot size thereof is small. Therefore, even in the case where different kinds of toner actually are not mixed within the developing container 8, there is a possibility that it is erroneously determined that different kinds of toner are mixed.

Such a phenomenon is likely to occur in a high-humidity environment. Particularly, in a condition such as the first time in the morning when the user starts using the image forming apparatus 100, the charges in the toner in the developing container 8 have attenuated due to the effect of moisture in the air, and more fogging toner is likely to occur. Therefore, in the present example, a preliminary operation as follows is executed to improve the precision of determination.

The preliminary operation of the present example is an operation of removing the fogging toner by cleaning the charging roller 2 while rotationally driving the developing roller 4, and is constituted by a combination of the following two operations.

The first operation will be described. In the first operation, the charging roller 2, the transfer roller 13, and the developing roller 4 are idled (rotationally driven without forming an image) by applying −600 V to the charging roller 2 and the transfer roller 13 and +150 V to the developing roller 4. At this time, the surface potential of the photosensitive drum 1 is about −50 V. By applying a voltage of a positive polarity to the developing roller 4, the present operation suppresses the occurrence of fogging toner caused by a charging failure on the charging roller 2. In addition, by the present operation, the polarity of the toner attached to the charging roller 2 is changed to a negative polarity by being rubbed due to the peripheral speed difference between the charging roller 2 and the photosensitive drum 1, and the toner whose polarity has been changed to a negative polarity is discharged onto the photosensitive drum 1 by the potential difference. The toner discharged onto the photosensitive drum 1 is collected by the developing roller 4 in the developing portion.

As described above, in the first operation, the charging roller 2 and the photosensitive drum 1 are rotated to rub each other while a voltage of the same polarity as the normal polarity of the toner is applied to the charging roller 2 and a voltage of a polarity opposite to the normal polarity of the toner is applied to the developing roller 4.

Next, the second operation will be described. In the second operation, the voltage applied to the charging roller 2 is switched between ON and OFF at a predetermined period while idling the developing roller 4 by applying a voltage of +150 V to the developing roller 4. The applied voltage in the ON state in the present example is set to −900V, and ON and OFF are repeatedly switched from each other to form a surface potential for one rotation of the photosensitive drum, at an interval of 900 ms which is equal to or longer than a time corresponding to one rotation of the photosensitive drum. The surface potential of the photosensitive drum 1 at this time is about −350V, and the toner attached to the charging roller 2 is discharged onto the photosensitive drum 1 by ON/OFF of the voltage application to the charging roller 2. In addition, although an operation of switching ON/OFF the voltage application to the charging roller 2 is employed in the present example, the voltage application does not have to be turned off, and the toner of the same polarity as in the OFF state can be discharged onto the photosensitive drum as long as the applied voltage is more on the positive polarity side than −350 V.

As described above, in the second operation, the photosensitive drum 1 is rotated while alternately applying a voltage of the same polarity as the normal polarity of the toner and a voltage of a polarity opposite to the normal polarity to the charging roller 2 and applying a voltage of a polarity opposite to the normal polarity of toner to the developing roller 4.

In the preliminary operation of the present example, an operation including the first operation and the second operation is performed for about 80 seconds. As a result of performing this preliminary operation, even in the first time in the morning in a high-humidity environment in which charges of the toner have attenuated, the charges of toner can be raised up to suppress fogging toner, and thus the charging roller 2 to which fogging toner is attached can be cleaned. As a result of this, change in the surface potential of the photosensitive drum 1 caused by a secondary factor is suppressed, and thus the halftone density of the region B of the determination pattern TP more appropriately reflects the state of toner in the developing container 8. Therefore, more appropriate determination can be made in the comparing step.

In addition, the vertical streak checked in the print checking step of Example 2 is printed due to a charging failure of the charging roller 2 as described in Example 2, and therefore there is a tendency that the level of the vertical streak after the preliminary operation is improved as compared with that before the preliminary operation. Examples of the index of the level of the vertical streak include the width, number, and density of the vertical streak, and a case where the width is larger, a case where the number is larger, and a case where the density is higher correspond to worse levels. Therefore, only the print checking step is performed with the determination pattern TP on the first sheet, and thus whether or not different kinds of toner are mixed is determined.

Examples of a method for executing the preliminary operation include a method of displaying an operation screen for executing the preliminary operation on a display of a computer connected to the image forming apparatus 100 and clicking an execution button. In addition, examples of a method for executing the preliminary operation include a method of operating a button displayed on a display of a screen of the operation portion 300 of the image forming apparatus 100.

Determination Flow

The determination flow of the present example will be described with reference to FIG. 17. Similarly to Example 1, description will be given assuming that the present determination flow is executed by a service worker.

First, as a first output step (S21), the service worker causes the image forming apparatus 100 to execute a determination mode, and thus prints the determination pattern TP similar to that of Example 2 on the recording material P. The determination pattern TP output at this time is a determination pattern on the first sheet. The execution method of the determination mode is similar to that of Example 1. That is, in the first output step, the image forming apparatus 100 outputs, on a first recording material, a first pattern image including a boundary line indicating a boundary of a predetermined region in the main scanning direction of the image formation.

Next, as a first print checking step (S22, first checking step), whether or not there is a vertical streak on the inner side with respect to the two reference vertical lines L of the determination pattern of the first sheet is checked. In the case where there is a vertical streak on the inner side with respect to the two reference vertical lines L in S22, the process proceeds to a determination step S27 (different toner mixing determination step), and determines that different kinds of toner are mixed (S27A). In the case where there is no vertical streak on the inner side with respect to the two reference vertical lines L in S22, the process proceeds to a preliminary operation execution step (S23).

Next, in the preliminary operation execution step (S23), the image forming apparatus 100 executes the preliminary operation. When the preliminary operation is finished, as a second output step (S24), the image forming apparatus 100 executes the determination mode to print the determination pattern TP similar to that of Example 2 again on the recording material P. The determination pattern TP output at this time is a determination pattern on the second sheet. That is, in the second output step, after the preliminary operation, the image forming apparatus 100 outputs, on a second recording material, a second pattern image including a first region where a halftone image is formed and a second region where a halftone image constituted by dots having a smaller average dot size than in the first region.

Next, as a comparing step (S25), the density DA of the region A and the density DB of the region B in the determination pattern TP of the second sheet are visually compared. At this time, as a determination step (S27), it is determined that different kinds of toner are mixed (S27A) in the case of DA>DB (density of the region A is higher). In contrast, in the case other than DA>DB, the process proceeds to a second print checking step (S26, second checking step), and whether or not there is a vertical streak on the inner side with respect to the two reference vertical lines L of the determination pattern is checked similarly to Example 2 for the determination pattern TP of the second sheet. In the case where there is no vertical streak on the inner side with respect to the two reference vertical lines L in S26, the process proceeds to a determination step (S27), and it is determined that different kinds of toner are not mixed (S27B). In contrast, in the case where there is a vertical streak on the inner side with respect to the two reference vertical lines L in S26, the process proceeds to the determination step (S27), and it is determined that different kinds of toner are mixed (S27A). The same process as in Example 1 may be performed after the determination.

The determination flow described above is the same as determination made by preparing a table such as Table 2 that can be referred to for a determination result corresponding to the combination of results of the density comparing step and the print comparing step in advance and referring to the table to determine to which case in Table 2 the determination patterns TP on the first sheet and the second sheet correspond. Either of a method of sequentially making determination in accordance with the flowchart of FIG. 17 and a method of making determination in accordance with a determination table such as Table 2 may be used.

TABLE 2

| CASE | DA > DB? (SECOND SHEET) | VERTICAL STREAK ON INNER SIDE? (FIRST SHEET OR SECOND SHEET) | DETERMINATION RESULT |
|---|---|---|---|
| 1 | Yes | Yes | MIXED |
| 2 | Yes | No | MIXED |
| 3 | No | Yes | MIXED |
| 4 | No | No | NOT MIXED |

By performing the preliminary operation step in the determination flow described above, contamination of the charging roller 2 by the fogging toner can be reduced, and thus the precision of determination of mixture of different kinds of toner based on the density difference of halftone can be improved.

To be noted, in the case of the determination flow of FIG. 17, the regions A and B in the determination pattern TP of the first sheet are not used for the determination. Therefore, the determination pattern TP of the first sheet may be a pattern in which only the two reference vertical lines L added in Example 2 are printed. In addition, since the purpose of the preliminary operation is to improve the precision of the density comparison and improve the problem of vertical black streaks, determination on the mixing of different kinds of toner can be made also by performing only the comparing step S25 without performing the second print checking step S26. Therefore, the determination pattern TP of Example 1 not including the reference vertical line L may be used as the determination pattern TP of the second sheet.

As described above, by executing the determination flow of the present example, the precision of determination of whether or not different kinds of toner are mixed within the developing container 8 can be improved.

To be noted, although the preliminary operation of about 80 seconds is performed in the present example, the execution time of the preliminary operation may be changed in accordance with the detection result of temperature and humidity in the environment detection portion. For example, the determination precision can be improved in a minimum necessary time in accordance with the environment at the time of determination by employing a longer execution time for the preliminary operation for a higher humidity.

In addition, although a determination flow in which the preliminary operation is executed in a period between printing of the determination patterns TP on the two sheets is employed in the present example, the determination pattern TP may be printed after the preliminary operation is performed also in the case of the determination flow of Example 1. As a result of this, the determination precision can be improved also in the determination method of Example 1.

Modification Example

Figure 18:
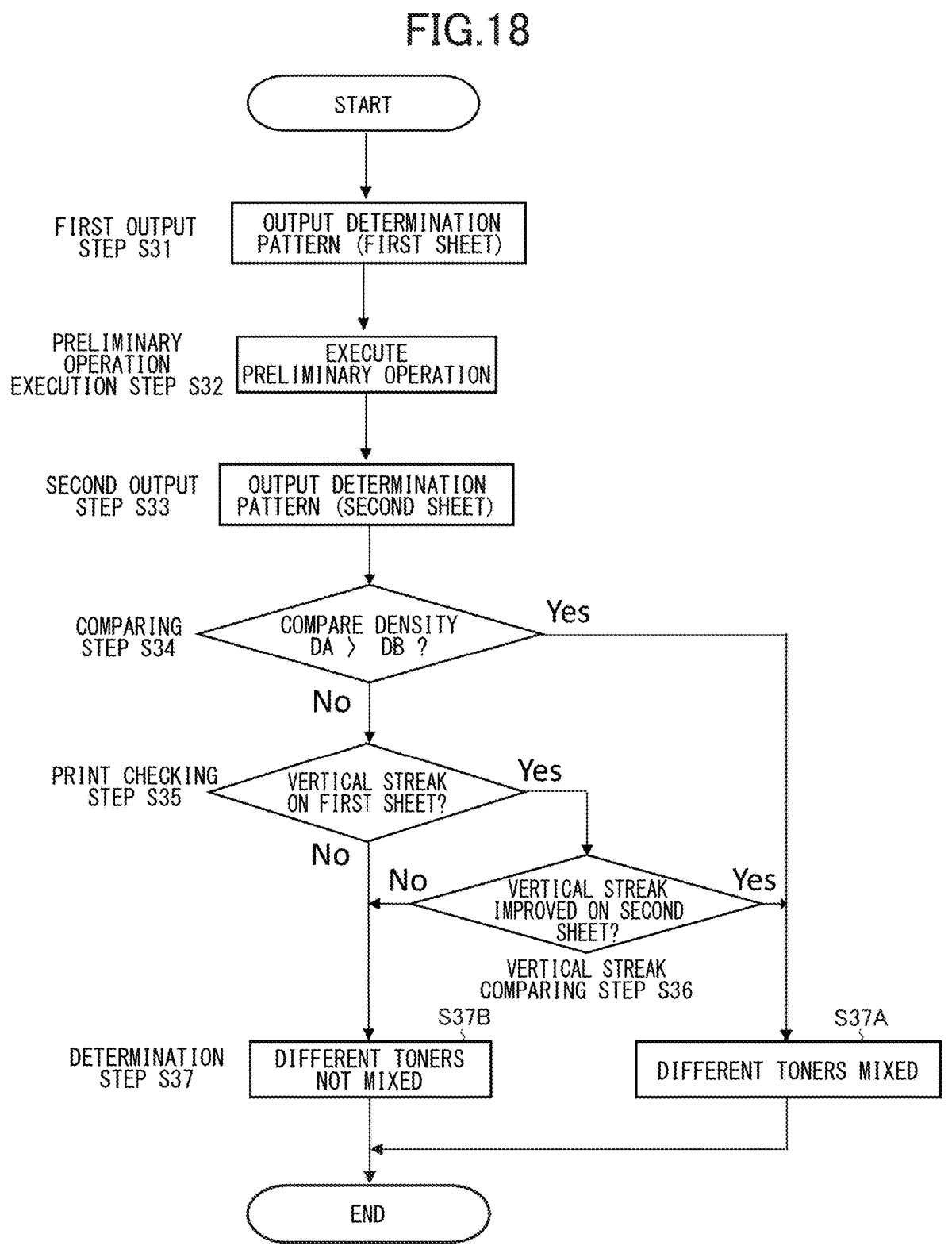

In Example 3, the print checking step is separately performed for the first sheet and the second sheet (S22, S26), and it is determined that different kinds of toner are mixed within the case where there is a vertical streak on the inner side with respect to the reference vertical lines L on at least one of the first sheet and the second sheet. Meanwhile, as described above, there is a tendency that the level of the vertical streak generated by the mixing of different kinds of toner changes between before and after the preliminary operation. Therefore, the level of vertical streak may be compared between the determination patterns TP of the first sheet and the second sheet as in the determination flow illustrated in FIG. 18.

A first output step S31, a preliminary operation execution step S32, a second output step S33, and a comparing step S34 in the present modification example are respectively the same as the first output step S21, the preliminary operation execution step S23, the second output step S24, and the comparing step S25 of Example 2 illustrated in FIG. 17. In contrast, in the present modification example, it is determined that different kinds of toner are mixed within the case where there is a vertical streak on the inner side with respect to the reference vertical lines L in the determination pattern TP of the first sheet (S35: Yes) and the level of the vertical streak in the determination pattern TP of the second sheet is improved as compared with the first sheet (S36: Yes). In the case where there is no vertical streak on the inner side with respect to the reference vertical lines L in the determination pattern TP of the first sheet (S35: No), it is determined that different kinds of toner are not mixed regardless of the level of the vertical streak in the determination pattern TP of the second sheet. In addition, even in the case where there is a vertical streak on the inner side with respect to the reference vertical lines L in the determination pattern TP of the first sheet (S35: Yes), it is determined that different kinds of toner are not mixed within the case where the level of the vertical streak in the determination pattern TP of the second sheet is not improved as compared with the first sheet (S36: No).

As described above, in the present example, determination on the mixing of different kinds of toner is made on the basis of the change in the level of the vertical streak between before and after the execution of the preliminary operation step. That is, it is determined that a plurality of kinds of toner are mixed within the toner storage portion in the case where the level of an image other than the pattern image generated in a predetermined region when the pattern image is output after the preliminary operation execution step is improved as compared with the image other than the pattern image generated in the predetermined region when the pattern image is output before the preliminary operation execution step.

As a result of this, determination on the mixing of different kinds of toner can be made more precisely on the basis of the occurrence mechanism of the vertical streak.

The determination flow of the present example is the same as determination made by preparing a determination table such as Table 3 shown below in advance and referring to the table to determine to which case the determination patterns TP on the first sheet and the second sheet correspond. "-" in the table indicates that the determination result on the right column is applied regardless of whether the result of the corresponding item is Yes or No. Either of a method of sequentially making determination in accordance with the flowchart of FIG. 18 and a method of making determination in accordance with a determination table such as Table 3 may be used.

Next, in the case where the comparison result in the comparing step (S2) is DA>DB (density of the region A is higher), as a recovery step (R3), the service worker attaches a new toner pack 40 to the mount portion 57 and performs toner replenishment (R3A). That is, in the case where it is determined that different kinds of toner are mixed within the developing container 8 in Example 1, (S2: Yes in FIG. 10), toner replenishment (R3A, replenishment step) is performed as the recovery step (R3) in the present example.

In the case where the comparison result in the comparing step (S2) is not DA>DB (density of the region B is higher or about the same), the service worker replaces the process unit 9 (R3B). That is, in the case where it is determined in Example 1 that different kinds of toner are not mixed within the developing container 8 (S2: No in FIG. 10), in the present example, the process unit 9 is replaced (R3B, replacement step) as the recovery step (R3).

TABLE 3

| CASE | DA > DB? (SECOND SHEET) | VERTICAL STREAK ON INNER SIDE? (FIRST SHEET) | VERTICAL STREAK IN SECOND SHEET IMPROVED COMPARED TO FIRST SHEET? | DETERMINATION RESULT |
|---|---|---|---|---|
| 1 | Yes | — | — | MIXED |
| 2 | No | Yes | Yes | MIXED |
| 3 | No | Yes | No | NOT MIXED |
| 4 | No | No | — | NOT MIXED |

Example 4

Next, Example 4 will be described. In Example 4, a series of processes (recovery flow) in which steps for recovering from an image defect are selectively executed in addition to the determination flow described in Example 1 will be described. In the description below, it is assumed that elements denoted by the same reference signs as in Example 1 basically have the same configurations and functions as those described in Example 1 unless otherwise described, and parts different from Example 1 will be mainly described.

In the present example, the process unit 9 is configured to be attachable to and detachable from the apparatus body M, and the service worker can replace the process unit 9. To be noted, the process unit 9 includes the photosensitive drum 1, the charging roller 2, the developing unit 20, the charge removing unit 11, and the brush member 12, and a member not related to the cause of an image defect can be collectively replaced as part of the process unit 9. Therefore, it is preferable that the frequency of the replacement of the process unit 9 is the minimum necessary.

Recovery Flow

The flow of the present example will be described with reference to FIG. 19. It is assumed that description will be given assuming that the present flow is executed by a service worker. To be noted, the person that executes the present determination flow is not limited to a service worker, and the user may execute the present flow.

First, as an output step (S1), the service worker prints the determination patter TP. Next, as a comparing step (S2), the density DA of the region A and the density DB of the region B in the determination pattern TP output on the recording material P are visually compared. That is, in the comparing step (S2), the density of the first region and the density of the second region in the pattern image output on the recording material P are compared. This process is the same as in Example 1 up to this point.

Recovery from Image Defect by Toner Replenishment

The reason why it is possible to recover from an image defect by replenishing toner in the case where the comparison result in the comparing step (S2) is DA>DB will be described.

As described in Example 1, in the case where a plurality of kinds of toner having different charging performance are mixed within the developing container 8, toner having a lower charging performance (second toner) can cause an image defect (fog image). In addition, as described in Example 1, the mixing of different kinds of toner having different charging performance in the developing container 8 can be visualized as a density difference between the regions A and B in the determination pattern TP.

Figure 19:
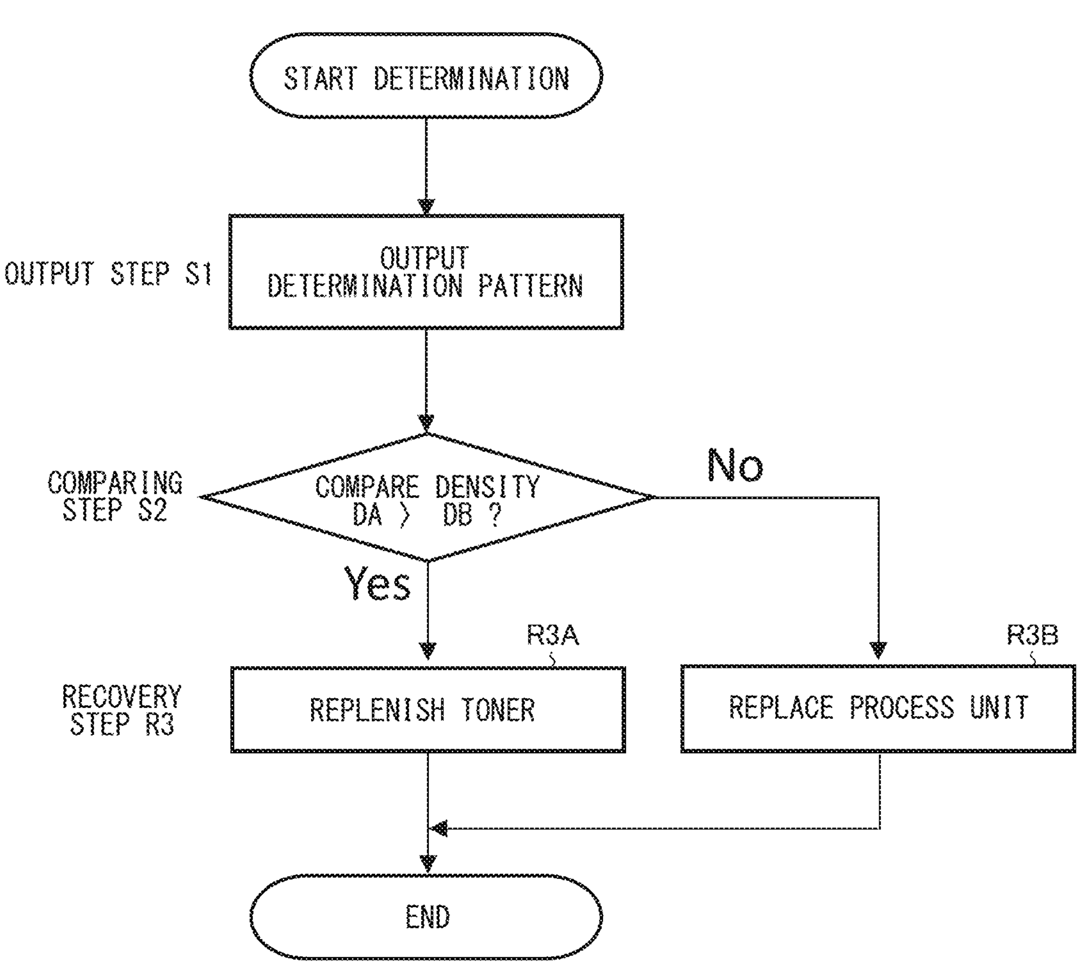
FIG. 19 illustrates a flowchart of a recovery method according to Example 4.

A case where an image defect has occurred due to the mixing of the first toner and the second toner in the developing container 8 and the flow of FIG. 19 is executed will be considered. In this case, the comparison result in the comparing step (S2) is DA>DB (density of the region A is higher), and as the recovery step (R3), the developing container 8 is replenished with toner by using the toner pack 40 (R3A). The replenished toner may be the first toner or the second toner as described below.

First, a case where the first toner is replenished in the recovery step (R3) will be described. When the first toner is supplied, the ratio of the first toner in all the toner in the developing container 8 increases. In addition, the ratio of the first toner in the toner borne on the developing roller 4 increases, and the ratio of the second toner that is likely to become a fogging toner decreases. Therefore, by replenishing the first toner, the fogging toner can be reduced, and recovery from the image defect (fog image) can be achieved at least partially.

Next, a case where the second toner is replenished in the recovery step (R3) will be described. When the second toner is replenished, the ratio of the second toner in all the toner in the developing container 8 increases. In addition, while the ratio of the second toner in the toner borne on the developing roller 4 increases, the ratio of the first toner decreases. In this case, for each toner particle of the second toner, the opportunity of transfer of charges to and from toner particles of the first toner decreases. As a result of this, the ratio of toner having a small charge amount that is likely to be a fogging toner decreases. In other words, when the second toner is replenished in the state of FIG. 12B, the peak p2' on the smaller charge amount side shifts toward the negative polarity side (high charge side), and the ratio of toner particles having a charge amount closer to 0 decreases. Therefore, by replenishing the second toner, the fogging toner can be reduced as a result, and recovery from the image defect (fog image) can be achieved at least partially.

Summary of Present Example

As described above, in the present example, in the case where an image defect has occurred and it can be determined that the image defect has been caused by the mixing of different kinds of toner, replenishment with new toner (R3A) is performed as the recovery step (R3). In other words, in the case where it can be visually recognized that the density DA of the region A (first region) is higher than the density DB of the region B (second region) in a condition of an illuminance of 30 lux or higher in the comparing step (S2) similarly to Example 1, the replenishment step (R3A) of replenishing the developing container 8 (toner storage portion) with toner is executed. As a result of this, recovery from the image defect (fog image) caused by the mixing of different kinds of toner can be achieved.

That is, according to the present example, a recovery method with which recovery from an image defect caused by the mixing of a plurality of kinds of toner can be achieved can be provided. In addition, recovery from the image defect can be achieved without replacement of the process unit 9, which is a common way to address the occurrence of an image defect.

To be noted, the method of comparison in the comparing step (S2) is not limited to visual observation as described in Example 1, and may be performed by comparison with a standard image of a determination chart prepared in advance, or by density measurement by a density meter. That is, the replenishment step (R3A) may be executed in the case where the density DA of the region A (first region) is higher than the density DB of the region B (second region) in the comparing step (S2) and the difference between the densities DA and DB satisfies a predetermined condition. As a result of this, the apparatus can be recovered from the image defect (fog image) caused by the mixing of different kinds of toner.

In addition, according to the present example, in the case where it cannot be determined that the cause of the image defect is the mixing of different kinds of toner, replacement of the process unit 9 (R3B) is performed as the recovery step (R3). That is, in the case where it cannot be visually recognized in the comparing step (S2) that the density DA of the region A (first region) is higher than the density DB of the region B (second region), a replacement step (R3B) of replacing at least part of the image forming mechanism included in the image forming apparatus 100 is executed. As a result of this, recovery from the image defect caused by a cause other than the mixing of different kinds of toner can be achieved.

Modification Example

Although the process unit 9 is replaced in the case other than DA>DB in the comparing step (S2), the subject of replacement in the replacement step (R3B) can be changed in accordance with the specific configuration of the image forming apparatus 100. That is, in the replacement step (R3B), the recovery from the image defect may be attempted by replacing at least part of the image forming mechanism included in the image forming apparatus 100 in a unit different from the process unit 9. The "image forming mechanism" is a collection of apparatuses, units, and parts for executing any step of the electrophotographic process. The image forming mechanism in the present example includes the process unit 9, the scanner unit 10, the transfer roller 13, and the fixing unit 14. For example, in the case where the developing unit 20 can be attached to and detached from the apparatus body M independently from other units, just the developing unit 20 may be replaced in the case other than DA>DB in the comparing step (S2). In addition, in the case where the part serving as the cause of the image defect can be identified, just that part may be replaced (for example, just the photosensitive drum 1 or just the charging roller 2).

In addition, in the case other than DA>DB in the comparing step (S2), that is, in the case where it cannot be determined that the cause of the image defect is the mixing of different kinds of toner and the cause of the image defect can be identified, a measure other than the replacement step (S3B) may be taken in accordance with the cause. For example, in the case where the soiling of the surface of the photosensitive drum 1 is the cause of the image defect and the soiling can be removed by cleaning, the service worker may clean the photosensitive drum 1.

In addition, depending on the mixture ratio of toners at the time of occurrence of the image defect, there can be a case where it is not possible to sufficiently recover from the image defect by just one cycle of toner replenishment. In this case, it is possible to further recover from the image defect by supplying the same kind of toner again to increase the ratio of the same kind of toner in the developing container 8.

In addition, although either of the first toner and the second toner may be replenished in the recovery step (R3) in the present example, it is more preferable to replenish the first toner in consideration of sustainability of the effect to suppress the image defect. This is because there is a tendency that, in the case where deterioration of the toner progresses while repetitively performing the image forming operation after the toner replenishment, the image defect (fog image) is more likely to occur when the ratio of the second toner in the developing container 8 is higher. In contrast, in the case where the first toner is replenished in the recovery step (R3), the ratio of toner particles having a charge amount close to 0, which is likely to be a fogging toner, is not likely to increase even in the case where the deterioration of the toner has progressed and the charging performance thereof is lowered to some extent, and thus the image defect (fog image) is relatively less likely to occur.

In addition, although the toner is immediately replenished in the case of DA>DB in the comparing step (S2) in the present example, the toner replenishment may be performed after reducing the toner amount in the developing container 8 in the case of DA>DB in the comparing step (S2). Examples of the method for reducing the toner amount in the developing container 8 includes a physical method of detaching and flipping over the process unit 9 to drop toner from the replenishment port 32*a*. In addition, the method for reducing the toner amount in the developing container 8 may be a method of continuously performing printing at a high image coverage (for example, a solid image of a density of 100%). By performing the toner replenishment after reducing the toner amount in the developing container 8, the mixture ratio of different kinds of toner is lowered, and the image defect can be further improved in some cases.

Modification Example Related to Locking Mechanism

Incidentally, in an image forming apparatus of a toner replenishment type in which toner is replenished from the outside by using a toner pack 40 (replenishment container) as in the present example, a locking mechanism 57L (FIG. 1) for restricting the toner replenishment may be provided. Toner replenishment by the user is restricted in the case where the locking mechanism 57L is in a locking state, and toner replenishment by the user is allowed in the case where the locking mechanism 57L is in a lock release state. The controller 90 sets the locking mechanism 57L to the locking state until the toner remainder amount in the developing container 8 is equal to or less than a predetermined amount on the basis of a detection signal of the toner remainder amount sensor 51, and sets the locking mechanism 57L to the lock release state in the case where the toner remainder amount is equal to or less than the predetermined amount.

For example, the locking mechanism 57L includes a locking member that moves to a position to engage with the toner pack 40 attached to the mount portion 57 to restrict the rotation of the toner pack 40 and a position to allow the rotation of the toner pack 40, and an actuator such as a solenoid that moves the locking member. In addition, another example of the locking mechanism 57L includes a cover member movable to an open position to expose the mount portion 57 and a closed position to cover the mount portion 57, and a latch member that restricts the opening and closing of the cover member. This is merely an example, and any form may be employed as long as the locking mechanism 57L can take the locking state to restrict toner replenishment and the lock release state to allow toner replenishment.

In the case of the image forming apparatus 100 including the locking mechanism 57L, there is a case where it is demanded to perform toner replenishment to recover from the image defect regardless of the toner remainder amount in the developing container 8. Therefore, as a modification example, the image forming apparatus 100 having a function of setting the locking mechanism 57L to the lock release state regardless of the toner remainder amount in the developing container 8 will be described.

Figure 20:
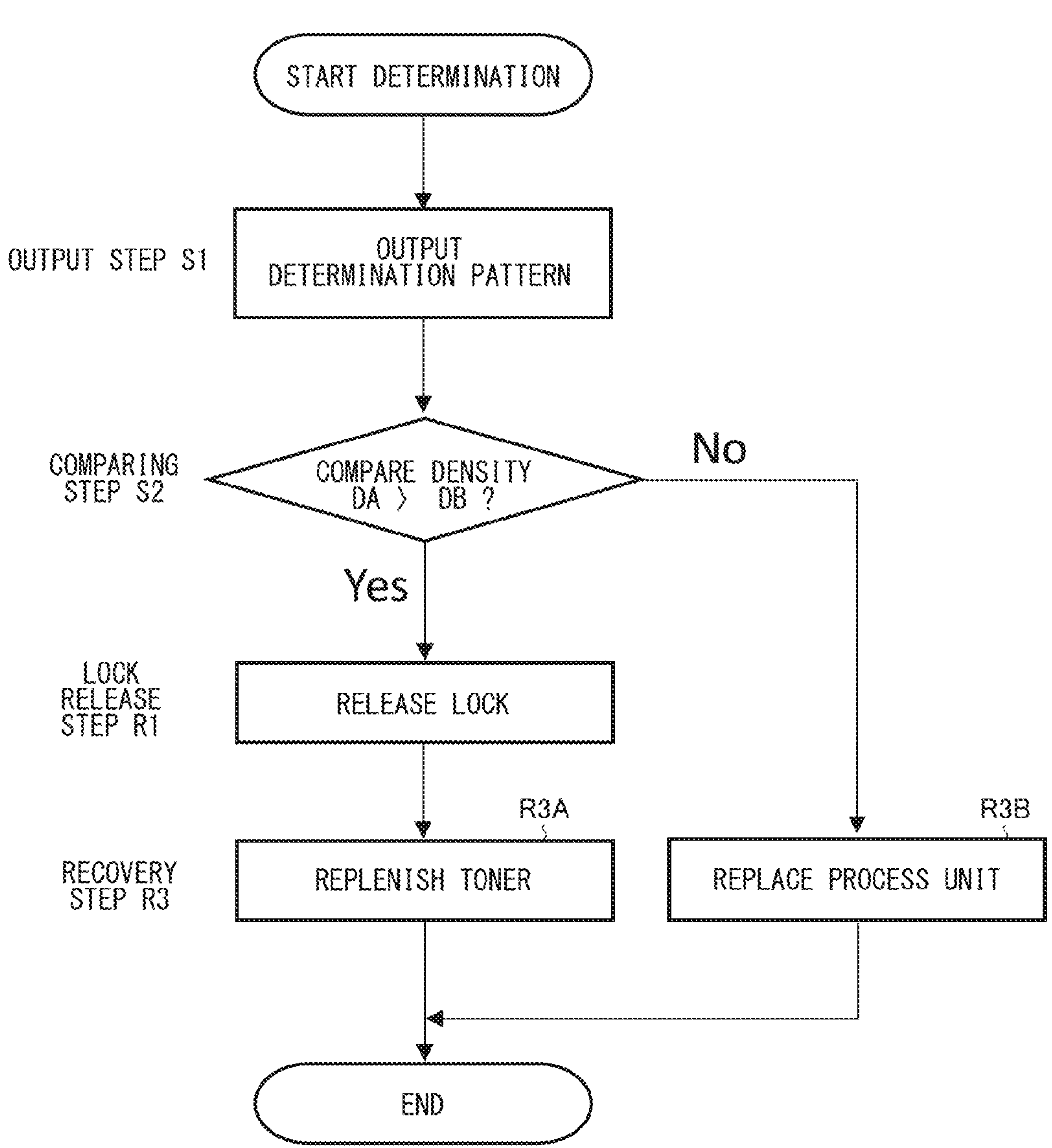
FIG. 20 illustrates a flowchart of a recovery method according to a modification example of Example 4.

FIG. 20 is a flowchart illustrating a recovery flow related to the present modification example. As compared with the flow of Example 4 (FIG. 19), the present flow is different in that a lock release step (R1) is performed in the case where the comparison result of the comparing step (S2) is DA>DB (density of the region A is higher). That is, in the present example, the lock release step (R1) is performed in the case of performing the replenishment step (R3A).

In the lock release step (R1), the service worker instructs the image forming apparatus 100 to set the locking mechanism 57L to the lock release state. The method for the instruction to the image forming apparatus 100 may be, for example, a method of displaying an operation screen on a display of a computer connected to the image forming apparatus 100 and clicking a lock release button on the screen. In addition, the method for the instruction to the image forming apparatus 100 may be a button operation on an operation screen of the operation portion 300 of the image forming apparatus 100. To be noted, the lock release of the locking mechanism 57L may be performed at any stage of the flow (for example, may be performed before the comparing step (S2)) as long as the stage is before the toner replenishment (R3A). In addition, in the case where the lock release (R1) is performed after the comparing step (S2) as illustrated in FIG. 20 and the comparison result of the comparing step (S2) is different from DA>DB, the lock release of the locking mechanism 57L does not have to be performed.

According to the present modification example, in the case where an image defect caused by mixing of different kinds of toner has occurred in the image forming apparatus 100 including the locking mechanism 57L, recover from the image defect can be achieved by toner replenishment.

Modification Example Related to Voltage Control

In the present example, although toner replenishment has been described as an example of the recovery step (R3) executed in the case of DA>DB in the comparing step (S2), further improvement regarding the image defect (fog image) can be attempted by switching the execution condition of the image forming operation in addition to performing the toner replenishment. Here, as a modification example of Example 4, the image forming apparatus 100 capable of switching the execution mode (print mode) of the image forming operation between a plurality of modes will be described.

FIG. 21A is a flowchart illustrating a recovery flow according to the present modification example. As compared with the flow of Example 4 (FIG. 19), the present flow is different in that a mode switching step (R2) is performed in the case where the comparison result of the comparing step (S2) is DA>DB (density of the region A is higher). That is, the recovery method of the present modification example includes a mode switching step of switching the mode of the image forming operation between a plurality of modes having different execution conditions for the image forming operation in the image forming apparatus 100, and executes the mode switching step (R2) in the case of executing the replenishment step (R3A).

The switching of the print mode changes at least part of the execution conditions of the image forming operation. The switching of the print mode in the present modification example refers to, for example, increasing (the absolute value of) the direct current component of the charging voltage applied to the charging roller 2 (charging member) from −1350 V, which is the value in Example 1, to −1450 V. The method for instruction of mode switching to the image forming apparatus 100 may be, for example, a method of displaying an operation screen on a display of a computer connected to the image forming apparatus 100 and clicking a mode switching button on the screen. In addition, the method for the instruction to the image forming apparatus 100 may be a button operation on an operation screen of the operation portion 300 of the image forming apparatus 100. To be noted, the print mode is not switched in the case where the comparison result in the comparing step (S2) is other than DA>DB.

When the charging voltage is switched from −1350 V to −1450 V, the (absolute value of) surface potential of the photosensitive drum 1 subjected to a charging process by the charging roller 2 increases. In this case, a potential difference Vback between the potential (developing potential Vdc) of the developing roller 4 in the developing portion N3 and the potential (dark potential VD) of the non-exposed region on the photosensitive drum 1 increases. The developing potential Vdc is a direct current component of the developing voltage applied to the developing roller 4. The potential difference Vback has a function of suppressing attachment of toner having a relatively smaller charge amount on the developing roller 4 to the non-exposed region on the photosensitive drum 1 as a fogging toner, and is also referred to as a fog-removal contrast. Therefore, in the case where it is determined that the cause of the image defect is the mixing of different kinds of toner (S2: Yes), the potential difference Vback is increased by increasing the charging voltage (R2) in addition to performing the toner replenishment (R3A), and thus further improvement regarding the image defect (fog image) can be achieved.

Here, although an example of increasing the charging voltage has been described, a similar advantage can be obtained also in the case where the potential difference Vback is increased by increasing the direct current component of the developing voltage applied to the developing roller 4 (developing member). In addition, both the charging voltage and the developing voltage may be changed.

In addition, the controller 90 may perform control such that the mode switching step (R2) of the present modification example and the lock release step (R1 of FIG. 20) of the modification example described above are interlocked with each other. In addition, as illustrated in FIG. 21B, the mode switching step (R4) may be performed after performing toner replenishment (R3A).

In addition, in the present modification example, an example in which the print mode is switched in addition to performing the toner replenishment in the case of DA>DB in the comparing step (S2) has been described. The configuration is not limited to this, and the print mode may be switched (R2) without performing toner replenishment in the case of DA>DB in the comparing step (S2). In this case, although the effect of improvement regarding the image defect (fog image) by the toner replenishment described in Example 4 cannot be obtained, the fogging toner is reduced by changing the charging voltage, and therefore recovery from the image defect can be achieved at least partially.

Modification Example Related to Sheet Passage Check

Figure 22:
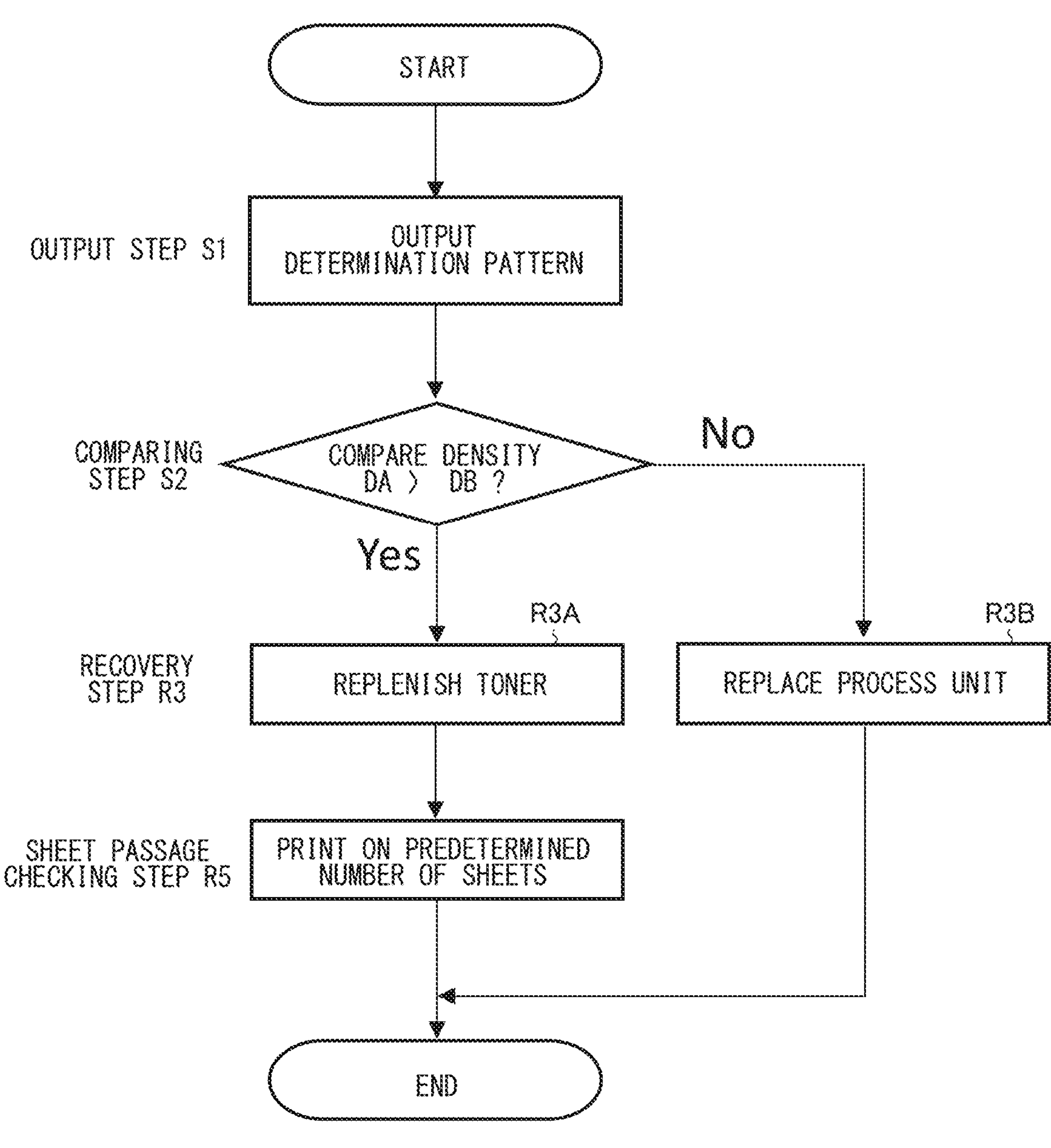
FIG. 22 illustrates a flowchart of a recovery method according to a modification example of Example 4.

As another modification example, as illustrated in FIG. 22, a sheet passage checking step (R5) may be performed after the toner replenishment (R3A) in the case of DA>DB in the comparing step (S2). In the sheet passage checking step (R5), after causing the image forming apparatus 100 to perform the idling operation, the image forming apparatus 100 is caused to print a predetermined test image on a predetermined number of sheets, and thus whether or not the apparatus has recovered from the image defect is checked. The idling operation is an operation of rotationally driving the agitation member 7, the developing roller 4, and the photosensitive drum 1 without forming an image. When the idling operation is performed after the toner replenishment, most of the different kinds of toner mixed within the developing container 8 is a specific kind of toner (toner of the same kind as the replenished toner), and the frictional charging of newly replenished toner progresses in a state in which the opportunities of charge transfer between different kinds of toner are reduced. Therefore, the polarization of the charge amount distribution (see FIG. 12B) is relieved during the idling operation. The predetermined number is set to, for example, 30, but the configuration is not limited to this. In addition, the test image may be a solid white (blank) image in the case of checking the occurrence of a fog image.

In the case where it is determined in a sheet passage checking step (R5) that the apparatus has not sufficiently recovered from the image defect, the service worker may wait for improvement regarding the image defect by executing an additional sheet passage checking step (R5). In addition, in the case described above, the service worker may attempt improvement regarding the image defect by, for example, causing the image forming apparatus 100 to perform the preliminary operation described in Example 3.

Other Modification Examples

In addition, the toner supplied for replenishment in the toner replenishment (R3A) serving as the recovery step may be a toner different from all of the plurality of kinds of toner mixed within in the developing container 8. This is because the image defect caused by the mixing of different kinds of toner can be suppressed if the ratio of the newly supplied toner in all the toner in the developing container 8 is sufficiently high.

Example 5

Next, Example 5 will be described. In Example 5, a series of processes in which steps for recovering from an image defect are selectively executed in addition to the determination flow described in Example 2 will be described. In the description below, it is assumed that elements denoted by the same reference signs as in Example 2 basically have the same configurations and functions as those described in Example 2 unless otherwise described, and parts different from Example 2 will be mainly described.

Recovery Flow

The flow of the present example will be described with reference to FIG. 23. It is assumed that description will be given assuming that the present flow is executed by a service worker. To be noted, the person that executes the present determination flow is not limited to a service worker, and the user may execute the present flow.

First, as an output step (S11), the service worker prints the determination patter TP. Next, as a comparing step (S12), the density DA of the region A and the density DB of the region B in the determination pattern TP output on the recording material P are visually compared. That is, in the comparing step (S12), the density of the first region and the density of the second region in the pattern image output on the recording material P are compared. In the case where the comparison result in the comparing step (S12) is DA>DB (density of the region A is higher), as a recovery step (R14), the service worker attaches a new toner pack 40 to the mount portion 57 and performs toner replenishment (R14A). This process is the same as in Example 2 up to this point.

In the case where the comparison result in the comparing step (S12) is not DA>DB, the service worker proceeds to a print checking step (S13). The print checking step (S13) is substantially the same as in Example 2. That is, the service worker checks whether or not an image other than the determination pattern is formed on the inner side with respect to the two reference vertical lines L of the determination pattern TP output on the recording material P.

In the case where there is a vertical streak on the inner side with respect to the two reference vertical lines L in the print checking step (S13) as illustrated in FIG. 15A, the service worker attaches a new toner pack 40 to the mount portion 57 and performs toner replenishment (R14A) as a recovery step (R14). That is, in the case where it is determined that different kinds of toner are mixed within the developing container 8 in Example 2 (S13: Yes in FIG. 14), the toner replenishment (R14A) is performed as the recovery step (R14) in the present example.

In contrast, in the case where the vertical streak is on the outer side with respect to the two reference vertical lines L as illustrated in FIG. 15B or the vertical streak is not present, the service worker performs replacement of the process unit 9 (R14B) as the recovery step (R14). That is, in the case where it is not determined that different kinds of toner are mixed within the developing container 8 in Example 2 (S13: No in FIG. 14), the replacement of the process unit 9 (R14B) is performed as the recovery step (R14) in the present example.

Recovery from Image Defect by Toner Replenishment

The reason why it is possible to recover from an image defect by replenishing toner in the case where there is an image on the inner side with respect to the reference vertical lines L in the print checking step (S13) will be described.

As described in Example 2, in the case where the first toner having high circularity and the third toner having low circularity (that is, having a more uneven shape) are mixed within the developing container 8, the third toner is bitten by the developing blade 6, and therefore an image defect of a vertical streak can occur on the inner side with respect to the reference vertical lines L.

Figure 23:
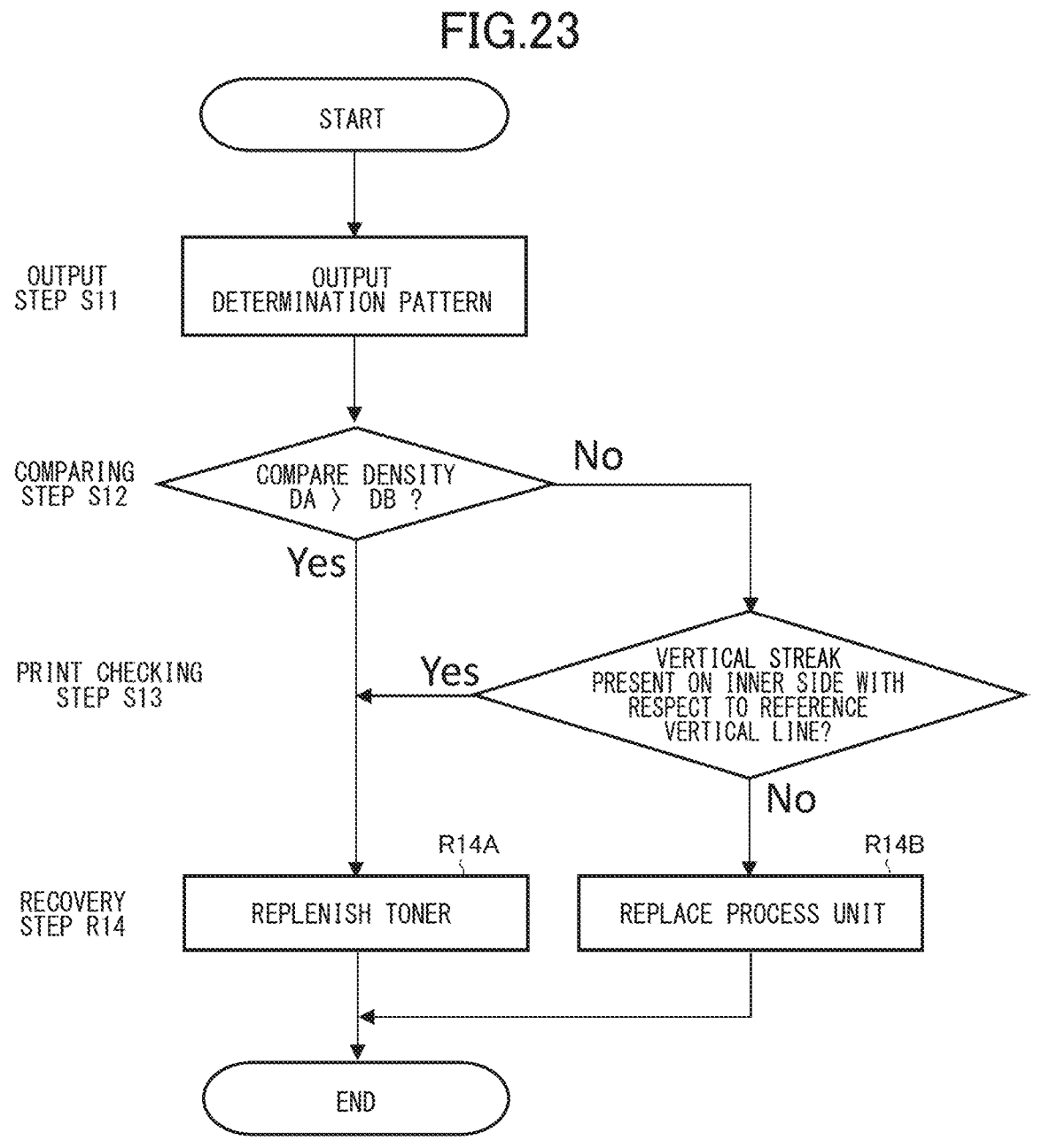

In the description below, a case where an image defect of a vertical streak has occurred due to the mixing of the first toner and third toner in the developing container 8, and the flow of FIG. 23 is executed will be considered. In this case, the comparison result in the comparing step (S12) is other than DA>DB, the checking result in the print checking step (S13) is that a vertical streak is present on the inner side (S13: Yes), and toner replenishment (R14A) is performed as the recovery step (R14). The replenished toner is preferably the first toner as will be described below.

First, a case where the first toner is replenished in the recovery step (R14) will be described. When the first toner is replenished, the ratio of the first toner in all the toner in the developing container 8 increases. In addition, the ratio of the first toner in the toner borne on the developing roller 4 increases. The third toner bitten by the developing blade 6 is gradually removed from the opposing portion between the developing blade 6 and the developing roller 4 in accordance with the rotation of the developing roller 4. When the amount of the third toner on the developing roller 4 has sufficiently decreased and the first toner has become dominant on the developing roller 4, the image defect of a vertical streak caused by the biting of toner by the developing blade 6 is resolved or suppressed.

Next, a case where the third toner is replenished in the recovery step (R14) will be described. When the third toner is replenished, the ratio of the third toner in all the toner in the developing container 8 increases. In addition, the ratio of the third toner in the toner borne on the developing roller 4 increases. In this case, the biting of toner by the developing blade 6 is not addressed, and therefore it can be considered that the image defect of a vertical streak caused by the biting of toner cannot be resolved.

To be noted, the toner replenished in the recovery step (R14) is not limited to the first toner. It suffices as long as the toner is a toner that is not likely bitten by the developing blade 6, that is, a toner having high circularity. The toner replenished in the recovery step (R14) has, for example, an average circularity of 0.96 or more as defined in the formula described above.

Modification Examples

Figure 24:
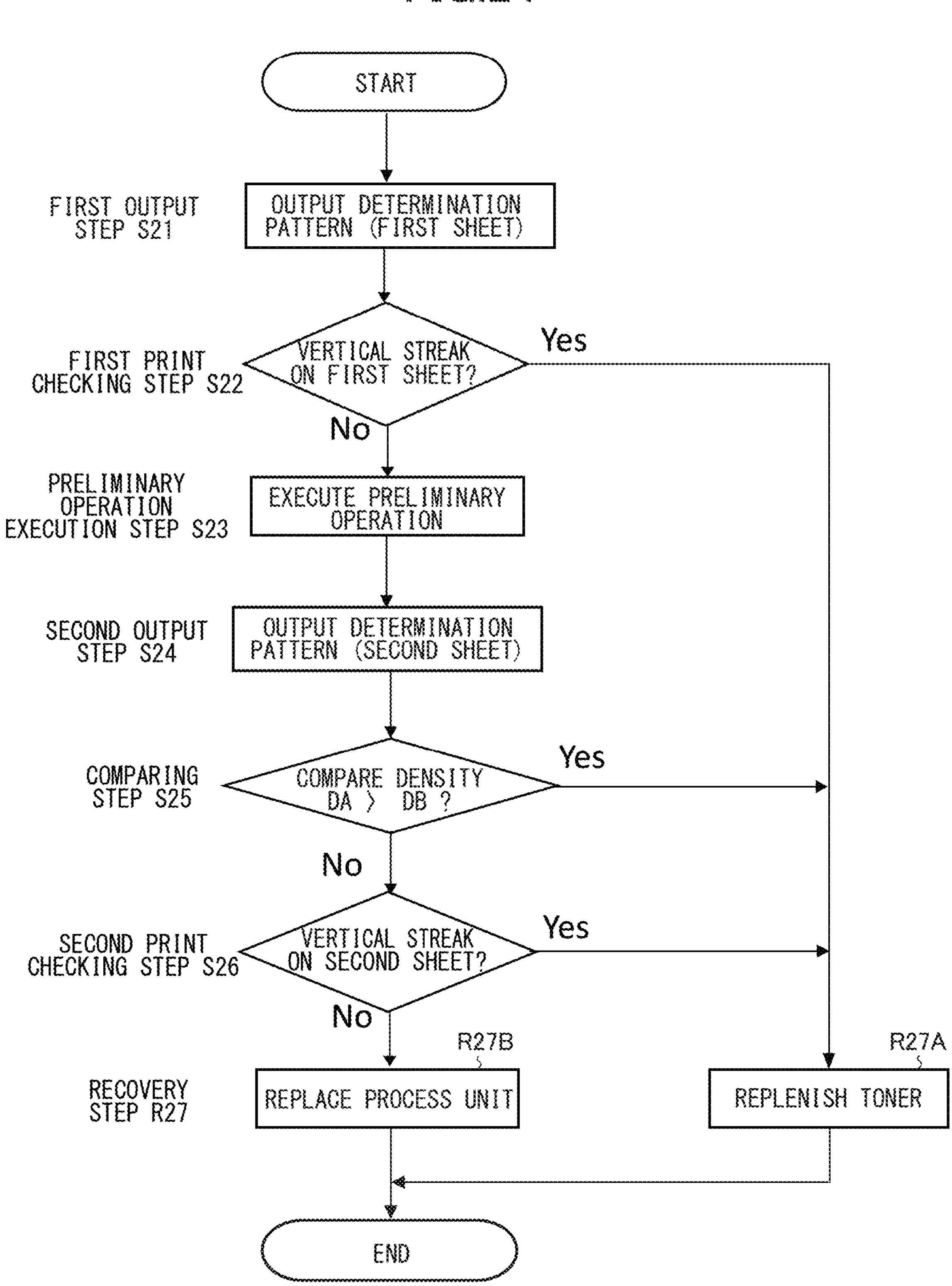
FIG. 24 illustrates a flowchart of a recovery method according to a modification example of Example 5.

Although a series of flow including the recovery step from the image defect has been described on the basis of Example 2, the series of flow including the recovery step from the image defect may be performed on the basis of Example 3. The flow in this case is as illustrated in FIG. 24. In the case where it is determined in Example 3 that different kinds of toner are mixed within the developing container 8 (S22: Yes, S25: Yes, or S26: Yes), the service worker performs toner replenishment (R27A) as the recovery step (R27). In the case where it is not determined in Example 3 that different kinds of toner are mixed within the developing container 8 (S26: No), the service worker performs replacement of the process unit 9 (R27B) as the recovery step (R27).

As a result of this, an advantage similar to Example 3 such as improvement in the determination precision can be obtained, and recovery from an image defect can be achieved by an appropriate method in accordance with the cause of the image defect.

In addition, the lock release step, the mode switching step, and the sheet passage checking step described in the modification examples of Example 4 may be combined with Example 5 or the modification example described above. As an example, a flow in which the mode switching step and the sheet passage checking step are combined with the flow of the modification example described above (FIG. 24) is illustrated in FIG. 25. In the present flow, in the case where it is determined that different kinds of toner are mixed within the developing container 8 (S22: Yes, S25: Yes, or S26: Yes), the mode switching step (R26), the toner replenishment (R27A) serving as the recovery step (R27), and the sheet passage checking step (R28) are executed. The controller 90 may perform control such that the mode switching step (R26) and the lock release step (R1 of FIG. 20) of the modification example described above are interlocked with each other.

As a result of this, recovery from an image defect can be achieved by an appropriate method corresponding to the cause of the image defect while obtaining the advantage of each modification example.

Other Modification Examples

In the examples described above, the image forming apparatus 100 that is a monochromatic laser beam printer that is of a direct transfer type has been described as an example. The configuration is not limited to this, and the image forming apparatus may be of an intermediate transfer type that transfers the toner image formed on the photosensitive drum 1 onto the recording material via an intermediate transfer member such as an intermediate transfer belt. In addition, the image forming apparatus may be a color printer that forms a color image by using toners of a plurality of colors. To be noted, in the case of a color printer, the determination pattern TP is generated for each color of toner, and determination on the mixing/non-mixing of different kinds of toner is also made for each color of toner. In this case, the amount compared in the comparing step by visual observation or using a measurement device is not limited to the density of the image, and may be color information. For example, the brightness or the coordinates in the color space (such as the L*a*b* color space) of the halftone in the regions A and B may be obtained, and the brightness or the color coordinates may be compared between the regions A and B.

In addition, although description has been given in the examples described above on the premise that the image forming apparatus 100 has a cleanerless configuration, the determination method of the present disclosure may be applied to an image forming apparatus including a cleaning unit that collects the transfer residual toner from the photosensitive drum 1.

In addition, although description has been given assuming that the service worker (that is, a person) executes each step of the determination method described in each flowchart, the determination method may be partially or entirely executed by the image forming apparatus 100. For example, a density meter capable of measuring the density of the halftone image may be provided in the image forming apparatus 100, and the image forming apparatus 100 may automatically execute the comparing step (S2, S12, S25, S34) when executing the determination mode.

In addition, in the examples described above, a configuration of an external replenishment system capable of replenishing the developing container 8 (toner storage portion) in the image forming apparatus with toner from the outside of the image forming apparatus by using the toner pack 40 (replenishment container) has been described as an example. The configuration is not limited to this, and the image forming apparatus may have a configuration in which a replenishment container (may be also referred to as a toner cartridge or a toner bottle) accommodating toner for replenishment is attachable to and detachable from the image forming apparatus body. In this case, the developing container 8 is replenished with toner from the replenishment container attached to the image forming apparatus body. Also in this case, an image defect caused by the mixing of different kinds of toner can occur when the kind of toner already accommodated in the developing container 8 is different from the kind of toner newly supplied from the replenishment container or when the toner in the developing container 8 has deteriorated. Therefore, whether or not the image defect is caused by mixing of different kinds of toner can be determined by the determination flow described in each example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2024-022814, filed Feb. 19, 2024, and 2024-042752, filed Mar. 18, 2024, which are hereby incorporated by reference herein in their entirety.

What is claimed is:

1. A determination method for determining whether or not a plurality of kinds of toner are mixed within a toner storage portion in an image forming apparatus which is capable of being replenished with toner by using a replenishment container, the determination method comprising:

outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region;

comparing a density of the first region with a density of the second region in the pattern image output on the recording material; and determining that the plurality of kinds of toner are mixed within the toner storage portion in a case where a visual density of the halftone image of the first region is higher than a visual density of the halftone image of the second region in the comparing in a condition of an illuminance of 30 lux or more.

2. The determination method according to claim 1, wherein the first region and the second region are adjacent to each other in the pattern image.

3. The determination method according to claim 1, wherein one of the first region and the second region is sandwiched by another of the first region and the second region in the pattern image.

4. The determination method according to claim 1, wherein the halftone image of the first region is constituted by dots of an average dot size of 3×3 pixels or more, and the halftone image of the second region is constituted by dots of an average dot size of 2×2 pixels or less.

5. The determination method according to claim 1, wherein a ratio of pixels where dots are formed in the first region to all pixels of the first region is equal to or higher than a ratio of pixels where dots are formed in the second region to all pixels of the second region.

6. The determination method according to claim 1, wherein the pattern image is formed at a center portion of the recording material in a main scanning direction of image formation.

7. The determination method according to claim 1, wherein the plurality of kinds of toner include a first toner and a second toner having a lower charging performance than that of the first toner.

8. The determination method according to claim 7, wherein toner particles of the first toner include core particles and a surface layer containing an organic silicon polymer and covering a surface of the core particles, and wherein toner particles of the second toner do not include a surface layer containing an organic silicon polymer.

9. The determination method according to claim 1, further comprising:

checking whether or not there is an image other than the pattern image in a predetermined region on the recording material in a main scanning direction of image formation, wherein the pattern image includes a boundary line indicating a boundary of the predetermined region, and wherein in the checking, it is determined that a plurality of kinds of toner are mixed within the toner storage portion in a case where there is the image other than the pattern image in the predetermined region.

10. The determination method according to claim 9, wherein the predetermined region is a largest region in the main scanning direction where the image forming apparatus is capable of forming an image, or a region inside the largest region.

11. The determination method according to claim 9, wherein the plurality of kinds of toner include a first toner and a second toner having a lower average circularity than the first toner.

12. The determination method according to claim 11, wherein the first toner is a polymerized toner, and wherein the second toner is a pulverized toner.

13. A determination method for determining whether or not a plurality of kinds of toner are mixed within a toner storage portion in an image forming apparatus which is capable of being replenished with toner by using a replenishment container, the determination method comprising:

outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region;

comparing a density of the first region with a density of the second region in the pattern image output on the recording material; and determining that the plurality of kinds of toner are mixed within the toner storage portion in a case where, in the comparing, the density of the first region is higher than the density of the second region and a difference between the density of the first region and the density of the second region satisfies a predetermined condition in a condition of an illuminance of 30 lux or more.

14. The determination method according to claim 13, wherein in the comparing, the density of the first region and the density of the second region that are measured by using a density meter are compared.

15. The determination method according to claim 14, wherein the predetermined condition is that a difference between the density of the first region and the density of the second region that are measured by using the density meter is 0.01 or more.

16. The determination method according to claim 13, wherein in the comparing, a determination chart that is prepared in advance and that includes a plurality of standard images having different density levels is used for comparing a standard image having a density closest to the density of the first region among the plurality of standard images and a standard image having a density closest to the density of the second region among the plurality of standard images.

17. The determination method according to claim 16, wherein the predetermined condition is that there is at least one-level difference between a density level of the standard image having the density closest to the density of the first region among the plurality of standard images and a density level of the standard image having the density closest to the density of the second region among the plurality of standard images in the determination chart.

18. The determination method according to claim 1, further comprising:

causing the image forming apparatus to perform a preliminary operation for removing a fogging toner attached to a charging roller configured to charge a photosensitive drum, wherein the outputting is performed after the preliminary operation.

19. The determination method according to claim 18, wherein the preliminary operation includes an operation of rotating the charging roller and the photosensitive drum such that the charging roller and the photosensitive drum rub each other, while applying a voltage of a same polarity as a normal polarity of toner to the charging roller and a voltage of a polarity opposite to the normal polarity of toner to a developing roller.

20. The determination method according to claim 18, wherein the preliminary operation includes an operation of rotating the photosensitive drum while alternately applying a voltage of a same polarity as a normal polarity of toner and a voltage of a polarity opposite to the normal polarity of toner to the charging roller and while applying a voltage of a polarity opposite to the normal polarity of toner to a developing roller.

21. The determination method according to claim 18, wherein it is determined that the plurality of kinds of toner are mixed within the toner storage portion in a case where a level of an image other than the pattern image generated in a predetermined region when the pattern image is output after the preliminary operation is improved as compared with an image other than the pattern image generated in the predetermined region when the pattern image is output before the preliminary operation.

22. A determination method for determining whether or not a plurality of kinds of toner are mixed within a toner storage portion in an image forming apparatus which is capable of being replenished with toner by using a replenishment container, the determination method comprising:

outputting a first pattern image on a first recording material by using the image forming apparatus, the first pattern image including a boundary Line indicating a boundary of a predetermined region in a main scanning direction of image formation;

checking whether or not there is an image other than the first pattern image in the predetermined region on the first recording material; and determining, on a basis of a result of the checking, whether or not the plurality of kinds of toner are mixed within the toner storage portion in a condition of an illuminance of 30 lux or more.

23. The determination method according to claim 22, further comprising:

causing the image forming apparatus to, after the outputting, perform a preliminary operation for removing a fogging toner attached to a charging roller configured to charge a photosensitive drum;

outputting, after the preliminary operation, a second pattern image on a second recording material by using the image forming apparatus, the second pattern image including a first region where a halftone image is formed, a second region where a halftone image constituted by dots having a smaller average dot size than dots constituting the halftone image of the first region is formed, and the boundary line;

checking whether or not there is an image other than the second pattern image in the predetermined region on the second recording material; and comparing a density of the first region and the density of the second region in the second pattern image output on the second recording material, wherein, in the determining, whether or not the plurality of kinds of toner are mixed within the toner storage portion is determined on a basis of results of the checking whether or not there is the image other than the first pattern image in the predetermined region on the first recording material, the checking whether or not there is the image other than the second pattern image in the predetermined region on the second recording material, and the comparing.

24. The determination method according to claim 23, wherein it is determined, in the determining, that the plurality of kinds of toner are mixed within the toner storage portion in a case where there is the image other than the first pattern image in the predetermined region on the first recording material, a case where there is the image other than the second pattern image in the predetermined region on the second recording material, and a case where the density of the first region is higher than the density of the second region in the comparing.

25. The determination method according to claim 22, further comprising:

causing the image forming apparatus to, after the outputting, perform a preliminary operation for removing a fogging toner attached to a charging roller configured to charge a photosensitive drum;

outputting, after the preliminary operation, a second pattern image including the boundary line on a second recording material by using the image forming apparatus; and checking whether or not there is an image other than the second pattern image in the predetermined region on the second recording material, wherein in a case where there is the image other than the first pattern image in the predetermined region on the first recording material, (i) it is determined, in the determining, that the plurality of kinds of toner are mixed within the toner storage portion when a level of the image other than the second pattern image generated in the predetermined region on the second recording material is improved as compared with the image other than the first pattern image generated in the predetermined region on the first recording material, and (ii) it is determined, in the determining, that the plurality of kinds of toner are not mixed within the toner storage portion when the level of the image other than the second pattern image generated in the predetermined region on the second recording material is not improved as compared with the image other than the first pattern image generated in the predetermined region on the first recording material.

26. A recovery method for causing an image forming apparatus to recover from an image defect, the image forming apparatus including a toner storage portion capable of being replenished with toner by using a replenishment container, the recovery method comprising:

outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region;

comparing a density of the first region with a density of the second region in the pattern image output on the recording material; and replenishing the toner storage portion with toner, wherein the replenishing is executed in a case where a visual density of the halftone image of the first region is higher than a visual density of the halftone image of the second region in the comparing in a condition of an illuminance of 30 lux or more.

27. The recovery method according to claim 26, further comprising:

replacing at least part of an image forming mechanism included in the image forming apparatus, wherein the replacing is executed in a case where it is not recognized in the comparing that the visual density of the first region is higher than the visual density of the second region in the condition.

28. The recovery method according to claim 26, wherein in a case of executing the replenishing in a state in which a first toner and a second toner having a lower charging performance than the first toner are mixed within the toner storage portion, the toner storage portion is replenished with the first toner or the second toner.

29. The recovery method according to claim 26, further comprising:

checking whether or not there is an image other than the pattern image in a predetermined region on the recording material in a main scanning direction of image formation, wherein the pattern image includes a boundary line indicating a boundary of the predetermined region, and wherein the replenishing is executed in a case where there is the image other than the pattern image in the predetermined region in the checking.

30. The recovery method according to claim 29, wherein in a case of executing the replenishing in a state in which a first toner and a second toner having a lower average circularity than the first toner are mixed within the toner storage portion, the toner storage portion is replenished with the first toner.

31. The recovery method according to claim 29, wherein the image forming apparatus includes a locking mechanism capable of taking a locking state to restrict toner replenishment of the toner storage portion using the replenishment container, and a lock release state to allow the toner replenishment, and wherein the recovery method further comprises:

switching the locking mechanism from the locking state to the lock release state in a case of executing the replenishing.

32. The recovery method according to claim 29, further comprising:

switching a mode of an image forming operation in the image forming apparatus between a plurality of modes having different execution conditions for the image forming operation, wherein the switching is executed in a case of executing the replenishing.

33. The recovery method according to claim 32, wherein the image forming apparatus includes a photosensitive member, a charging member configured to charge a surface of the photosensitive member, and a developing member configured to supply toner to the photosensitive member to develop a latent image on the surface of the photosensitive member into a toner image, and wherein in the switching, an absolute value of a direct current component of a voltage applied to the charging member is increased and/or an absolute value of a direct current component of a voltage applied to the developing member is reduced.

34. The recovery method according to claim 29, further comprising:

forming, after the replenishing, a predetermined test image on a recording material by using the image forming apparatus to check improvement regarding the image defect.

35. A recovery method for causing an image forming apparatus to recover from an image defect, the image forming apparatus including a toner storage portion capable of being replenished with toner by using a replenishment container, the recovery method comprising:

outputting a pattern image on a recording material by using the image forming apparatus, the pattern image including a first region where a halftone image is formed and a second region where another halftone image is formed, the halftone image of the second region being constituted by dots of an average dot size smaller than an average dot size of dots constituting the halftone image of the first region;

comparing a density of the first region with a density of the second region in the pattern image output on the recording material; and replenishing the toner storage portion with toner, wherein the replenishing is executed in a case where, in the comparing, the density of the first region is higher than the density of the second region and a difference between the density of the first region and the density of the second region satisfies a predetermined condition in a condition of an illuminance of 30 lux or more.

36. A recovery method for causing an image forming apparatus to recover from an image defect, the image forming apparatus including a toner storage portion capable of being replenished with toner by using a replenishment container, the recovery method comprising:

outputting a first pattern image on a first recording material by using the image forming apparatus, the first pattern image including a boundary fine indicating a boundary of a predetermined region in a main scanning direction of image formation;

checking whether or not there is an image other than the first pattern image in the predetermined region on the first recording material; and replenishing the toner storage portion with toner, wherein the replenishing is executed in a case where there is the image other than the first pattern image in the predetermined region in the checking in a condition of an illuminance of 30 lux or more.

37. The recovery method according to claim 36, further comprising:

causing the image forming apparatus to, after the outputting, perform a preliminary operation for removing a fogging toner attached to a charging roller configured to charge a photosensitive drum;

outputting, after the preliminary operation, a second pattern image on a second recording material by using the image forming apparatus, the second pattern image including a first region where a halftone image is formed, a second region where another halftone image is formed, and the boundary line, the halftone image of the second region being constituted by dots of an average dot size smaller than an average dot size of dots constituting the halftone image of the first region;

checking whether or not there is an image other than the second pattern image in the predetermined region on the second recording material; and comparing a density of the first region and a density of the second region in the second pattern image output on the second recording material, wherein the replenishing is executed in a case where there is the image other than the first pattern image in the predetermined region on the first recording material, a case where there is the image other than the second pattern image in the predetermined region on the second recording material, and a case where a visual density of the halftone image of the first region is higher than a visual density of the halftone image of the second region in the comparing.

* * * * *